US012751574B2

(12) United States Patent
Anthony et al.

(10) Patent No.: US 12,751,574 B2
(45) Date of Patent: Oct. 6, 2026

(54) COOKING DEVICE AND COMPONENTS THEREOF

(71) Applicant: SharkNinja Operating LLC, Needham, MA (US)

(72) Inventors: Joshua D. Anthony, Billerica, MA (US); Christopher T. Martin, Concord, MA (US); Thomas Guerin, Boston, MA (US); John M. Steinmetz, Boston, MA (US); Ethan T. Brown, Cambridge, MA (US); Chad P. Woodrow, Somerville, MA (US); Michaela Dubeau, Uxbridge, MA (US); Jennifer Kathryn Marsden, London (GB); Roger Neil Jackson, Cornwall (GB); Christina J. Crowley, London (GB); Rupert Elliston, London (GB); Andrew John Roy Tattersfield, London (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/408,190

(22) Filed: Jan. 9, 2024

(65) Prior Publication Data

US 2024/0206676 A1 Jun. 27, 2024

Related U.S. Application Data

(63) Continuation of application No. 16/402,023, filed on May 2, 2019, now abandoned.

(Continued)

(51) Int. Cl.

| | |
|---|---|
| ***A47J 37/06*** | (2006.01) |
| ***A47J 27/00*** | (2006.01) |

(Continued)

(52) U.S. Cl.

CPC ....... *A47J 37/0641* (2013.01); *A47J 37/0623* (2013.01); *A47J 37/0629* (2013.01);

(Continued)

(58) Field of Classification Search

CPC ................ A47J 2202/00; A47J 37/0623; A47J 37/0629; A47J 37/0641; A47J 37/0664; A47J 37/067; A47J 37/0676

See application file for complete search history.

(56) References Cited

U.S. PATENT DOCUMENTS

| | | | |
|---|---|---|---|
| 472,002 | A | 3/1892 | Ross et al. |
| 1,254,384 | A | 1/1918 | Albro |

(Continued)

FOREIGN PATENT DOCUMENTS

| | | | |
|---|---|---|---|
| CN | 1139304 | A | 1/1997 |
| CN | 2253170 | Y | 4/1997 |

(Continued)

OTHER PUBLICATIONS

U.S. Appl. No. 16/402,023, filed May 2, 2019, Cooking Device and Components Thereof.

(Continued)

*Primary Examiner* — Michael G Hoang
*Assistant Examiner* — Logan P Jones
(74) *Attorney, Agent, or Firm* — Mintz, Levin, Cohn, Ferris, Glovsky and Popeo, P.C.

(57) ABSTRACT

A cooking system includes a housing having a hollow interior including a cooking zone for receiving food to be cooked, a heating element associated with said housing, and a grill plate having a support surface for supporting food within said hollow interior. The grill plate has a thermal mass sufficient to maintain a temperature required to achieve a Maillard reaction of said food At least a portion of said cooking zone is disposed between said support surface and (Continued)

said heating element. Said heating element is operable to heat said support body to impart contact cooking from said support surface to food supported thereby in said cooking zone.

24 Claims, 18 Drawing Sheets

Related U.S. Application Data

(60) Provisional application No. 62/810,249, filed on Feb. 25, 2019.

(51) Int. Cl.
*A47J 36/24* (2006.01)
*A47J 36/32* (2006.01)

(52) U.S. Cl.
CPC ......... *A47J 37/0664* (2013.01); *A47J 37/067* (2013.01); *A47J 37/0676* (2013.01); *A47J 2202/00* (2013.01)

(56) References Cited

U.S. PATENT DOCUMENTS

| | | | | |
|---|---|---|---|---|
| 1,986,088 | A | 1/1935 | Wild | |
| 2,055,972 | A | 9/1936 | John | |
| 2,188,757 | A | 1/1940 | Moon | |
| 2,235,911 | A | 3/1941 | Wilcox | |
| 2,253,833 | A | 8/1941 | Herbert | |
| 2,313,968 | A | 3/1943 | Ernest | |
| 2,378,950 | A | 6/1945 | Ernest | |
| 2,429,282 | A | 10/1947 | Ness | |
| 2,430,582 | A | 11/1947 | Ernest | |
| 2,462,287 | A | 2/1949 | Richeson et al. | |
| 2,609,476 | A * | 9/1952 | Ackemann | F24C 7/082 200/5 E |
| 2,622,591 | A | 12/1952 | Bramberry, Jr. | |
| 2,745,913 | A * | 5/1956 | Welch | F24C 7/082 200/5 E |
| 2,952,764 | A | 9/1960 | Yoshitada | |
| 3,076,405 | A | 2/1963 | Lang | |
| 3,122,134 | A | 2/1964 | Reeves | |
| 3,514,301 | A | 5/1970 | Berger | |
| 3,529,582 | A | 9/1970 | Hurko et al. | |
| 3,610,885 | A | 10/1971 | Zingg | |
| 3,760,156 | A | 9/1973 | Kehl et al. | |
| 3,821,454 | A | 6/1974 | Lobel | |
| 3,828,760 | A | 8/1974 | Farber et al. | |
| 3,850,331 | A | 11/1974 | Oxel | |
| 4,071,739 | A | 1/1978 | Jenn et al. | |
| 4,106,486 | A | 8/1978 | Lee | |
| 4,148,250 | A | 4/1979 | Miki et al. | |
| 4,162,741 | A | 7/1979 | Walker et al. | |
| 4,210,072 | A | 7/1980 | Pedrini | |
| 4,241,288 | A | 12/1980 | Aoshima et al. | |
| 4,268,741 | A | 5/1981 | O'Brien | |
| 4,313,051 | A | 1/1982 | Aoshima | |
| 4,315,138 | A | 2/1982 | Miwa | |
| 4,374,318 | A * | 2/1983 | Gilliom | G07F 17/0078 219/400 |
| 4,374,319 | A | 2/1983 | Guibert | |
| 4,397,875 | A | 8/1983 | Gilliom | |
| 4,410,030 | A | 10/1983 | Skala | |
| 4,430,557 | A | 2/1984 | Eichelberger et al. | |
| 4,484,063 | A | 11/1984 | Whittenburg et al. | |
| 4,509,412 | A | 4/1985 | Whittenburg et al. | |
| 4,528,975 | A | 7/1985 | Wang | |
| 4,591,698 | A | 5/1986 | Chang | |
| 4,625,097 | A | 11/1986 | Miwa | |
| 4,670,282 | A | 6/1987 | Onishi et al. | |
| 4,728,762 | A | 3/1988 | Roth et al. | |
| 4,771,162 | A | 9/1988 | Schatz et al. | |
| 4,829,158 | A | 5/1989 | Burnham | |
| 4,848,217 | A | 7/1989 | Koziol | |
| 4,889,972 | A | 12/1989 | Chang | |
| 4,995,313 | A | 2/1991 | Delau et al. | |
| 5,000,085 | A | 3/1991 | Archer | |
| 5,012,071 | A | 4/1991 | Henke | |
| 5,029,519 | A | 7/1991 | Boyen | |
| 5,031,519 | A | 7/1991 | Toida et al. | |
| 5,036,179 | A | 7/1991 | Westerberg et al. | |
| 5,048,400 | A | 9/1991 | Ueda et al. | |
| 5,067,396 | A | 11/1991 | Sorensen et al. | |
| 5,092,229 | A | 3/1992 | Chen | |
| 5,105,725 | A | 4/1992 | Haglund | |
| 5,205,274 | A | 4/1993 | Smith et al. | |
| 5,239,917 | A | 8/1993 | Lutkie et al. | |
| 5,251,542 | A | 10/1993 | Itoh et al. | |
| 5,280,749 | A | 1/1994 | Smit | |
| 5,329,919 | A | 7/1994 | Chang | |
| 5,355,777 | A | 10/1994 | Chen et al. | |
| 5,355,779 | A | 10/1994 | Obrien et al. | |
| 5,416,950 | A | 5/1995 | Dornbush et al. | |
| 5,445,061 | A | 8/1995 | Barradas | |
| 5,466,912 | A | 11/1995 | Dornbush et al. | |
| 5,485,780 | A | 1/1996 | Koether et al. | |
| 5,513,558 | A | 5/1996 | Erickson et al. | |
| 5,526,734 | A | 6/1996 | Harrison | |
| 5,549,039 | A | 8/1996 | Ito et al. | |
| 5,567,458 | A | 10/1996 | Wu | |
| 5,582,094 | A | 12/1996 | Peterson et al. | |
| 5,586,352 | A | 12/1996 | Obrien et al. | |
| 5,588,352 | A | 12/1996 | Harrison | |
| 5,590,583 | A | 1/1997 | Harrison | |
| 5,615,607 | A | 4/1997 | Delaquis et al. | |
| 5,619,983 | A | 4/1997 | Smith | |
| 5,632,403 | A | 5/1997 | Deng | |
| 5,649,476 | A | 7/1997 | Montagnino et al. | |
| 5,676,044 | A | 10/1997 | Lara, Jr. | |
| 5,699,722 | A | 12/1997 | Erickson et al. | |
| 5,701,804 | A | 12/1997 | Liebermann | |
| 5,740,721 | A | 4/1998 | Bizard et al. | |
| 5,768,976 | A | 6/1998 | Suk | |
| 5,839,357 | A | 11/1998 | Ha et al. | |
| 5,896,808 | A | 4/1999 | Graur | |
| 5,932,130 | A | 8/1999 | Taino | |
| 5,967,021 | A | 10/1999 | Yung | |
| 5,970,858 | A | 10/1999 | Boehm et al. | |
| 6,006,939 | A | 12/1999 | Wai | |
| 6,014,986 | A | 1/2000 | Baumgarten | |
| 6,016,797 | A | 1/2000 | Nowicke, Jr. | |
| 6,019,029 | A | 2/2000 | Chan | |
| 6,023,050 | A | 2/2000 | Violi | |
| 6,060,698 | A | 5/2000 | Petrides et al. | |
| 6,066,837 | A | 5/2000 | McCormick et al. | |
| 6,067,896 | A | 5/2000 | Elorza | |
| 6,070,518 | A | 6/2000 | Kao | |
| 6,082,249 | A | 7/2000 | Su | |
| 6,083,543 | A | 7/2000 | Kim et al. | |
| 6,088,249 | A | 7/2000 | Adamson | |
| 6,097,016 | A | 8/2000 | Hirata et al. | |
| 6,097,106 | A | 8/2000 | Roddy et al. | |
| 6,104,004 | A | 8/2000 | Ragland et al. | |
| 6,105,808 | A | 8/2000 | Mendonca | |
| 6,116,151 | A | 9/2000 | Fickert et al. | |
| 6,125,737 | A | 10/2000 | Chang | |
| 6,135,012 | A | 10/2000 | Kao | |
| 6,135,013 | A | 10/2000 | Barrena | |
| 6,137,091 | A * | 10/2000 | Kikuoka | H01H 9/56 219/486 |
| 6,158,606 | A | 12/2000 | Oliver | |
| 6,173,643 | B1 | 1/2001 | Qian et al. | |
| 6,178,876 | B1 | 1/2001 | Kao | |
| 6,191,393 | B1 | 2/2001 | Park | |
| 6,201,217 | B1 | 3/2001 | Moon et al. | |
| 6,242,025 | B1 | 6/2001 | Lesky et al. | |
| 6,252,206 | B1 | 6/2001 | Leukhardt, III et al. | |
| 6,255,630 | B1 | 7/2001 | Barnes et al. | |
| 6,257,124 | B1 | 7/2001 | Chen | |
| 6,262,396 | B1 * | 7/2001 | Witt | A47J 37/0623 219/409 |
| 6,262,399 | B1 | 7/2001 | Lau et al. | |

(56) References Cited

U.S. PATENT DOCUMENTS

| | | | |
|---|---|---|---|
| 6,267,046 | B1 | 7/2001 | Wanat |
| 6,268,592 | B1 | 7/2001 | Hu et al. |
| 6,269,737 | B1 | 8/2001 | Rigney et al. |
| 6,271,504 | B1 | 8/2001 | Barritt |
| 6,283,014 | B1 | 9/2001 | Ng et al. |
| 6,283,015 | B1 | 9/2001 | Kwon et al. |
| 6,320,166 | B1 | 11/2001 | Park |
| 6,355,914 | B1 | 3/2002 | Stockley |
| 6,384,381 | B2 | 5/2002 | Witt et al. |
| 6,393,969 | B1 | 5/2002 | Kim |
| D458,078 | S | 6/2002 | Lin |
| 6,399,925 | B1 | 6/2002 | Pickering et al. |
| 6,414,254 | B1 | 7/2002 | McNair |
| 6,425,320 | B1 | 7/2002 | Chameroy et al. |
| 6,450,085 | B1 | 9/2002 | Riesselmann |
| 6,450,361 | B1 | 9/2002 | Mendelson et al. |
| 6,455,085 | B1 | 9/2002 | Duta |
| 6,467,645 | B2 | 10/2002 | Park |
| 6,486,453 | B1 | 11/2002 | Bales et al. |
| 6,494,337 | B1 | 12/2002 | Moroni |
| 6,505,545 | B2 | 1/2003 | Kennedy et al. |
| 6,509,550 | B1 | 1/2003 | Li |
| 6,513,420 | B1 | 2/2003 | Park |
| 6,523,459 | B1 | 2/2003 | Chameroy et al. |
| 6,528,772 | B1 | 3/2003 | Graves et al. |
| 6,540,097 | B1 | 4/2003 | Beck et al. |
| 6,545,252 | B2 | 4/2003 | Wang |
| 6,552,309 | B1 | 4/2003 | Kish et al. |
| 6,559,427 | B1 | 5/2003 | Barnes et al. |
| 6,565,903 | B2 | 5/2003 | Ng et al. |
| 6,568,314 | B1 | 5/2003 | Stepanova |
| 6,573,483 | B1 | 6/2003 | Decobert et al. |
| 6,602,530 | B1 | 8/2003 | Weber et al. |
| 6,603,099 | B2 | 8/2003 | Gouthiere |
| 6,604,453 | B2 | 8/2003 | Niese |
| 6,615,706 | B1 | 9/2003 | Wu |
| 6,615,708 | B1 | 9/2003 | Lin |
| 6,617,554 | B2 | 9/2003 | Moon et al. |
| 6,631,824 | B2 | 10/2003 | Park |
| 6,648,162 | B1 | 11/2003 | Wooderson et al. |
| 6,657,167 | B2 | 12/2003 | Loveless |
| 6,669,047 | B2 | 12/2003 | Wooderson et al. |
| 6,695,319 | B1 | 2/2004 | Anota et al. |
| D487,212 | S | 3/2004 | Park |
| 6,698,337 | B1 | 3/2004 | Park |
| 6,703,061 | B2 | 3/2004 | Kennedy et al. |
| 6,705,209 | B2 | 3/2004 | Yang et al. |
| 6,723,963 | B2 | 4/2004 | Ronda |
| 6,730,881 | B1 | 5/2004 | Arntz et al. |
| 6,730,882 | B2 | 5/2004 | Atkinson |
| 6,730,889 | B1 | 5/2004 | Jones-Lawlor |
| 6,736,131 | B2 | 5/2004 | Yamamoto et al. |
| 6,740,855 | B1 | 5/2004 | Decobert et al. |
| 6,742,445 | B2 | 6/2004 | Backus et al. |
| 6,747,250 | B1 | 6/2004 | Cha |
| 6,755,319 | B2 | 6/2004 | Park |
| 6,758,132 | B1 | 7/2004 | Kuo et al. |
| 6,777,651 | B1 | 8/2004 | Boyer |
| 6,782,805 | B2 | 8/2004 | Backus et al. |
| 6,782,806 | B2 | 8/2004 | Backus et al. |
| 6,802,429 | B1 | 10/2004 | Wildman |
| 6,809,297 | B2 | 10/2004 | Moon et al. |
| 6,812,433 | B1 | 11/2004 | Barritt |
| 6,815,644 | B1 | 11/2004 | Muegge et al. |
| 6,831,254 | B2 | 12/2004 | Barritt |
| 6,833,534 | B2 | 12/2004 | Bellassai et al. |
| 6,837,150 | B2 | 1/2005 | Backus et al. |
| 6,841,762 | B2 | 1/2005 | Suzuki |
| 6,845,707 | B1 | 1/2005 | Xu et al. |
| 6,846,504 | B1 | 1/2005 | Yarnell |
| 6,851,351 | B2 | 2/2005 | Payen et al. |
| 6,872,921 | B1 | 3/2005 | Decobert et al. |
| 6,874,408 | B2 | 4/2005 | Backus et al. |
| 6,877,633 | B2 | 4/2005 | Niese |
| 6,903,310 | B1 | 6/2005 | Lee et al. |
| 6,917,017 | B2 | 7/2005 | Moon et al. |
| 6,930,286 | B2 | 8/2005 | Kim |
| 6,933,477 | B2 | 8/2005 | Becker et al. |
| 6,935,223 | B2 | 8/2005 | Kobayashi |
| 6,936,795 | B1 | 8/2005 | Moon et al. |
| 6,936,801 | B1 | 8/2005 | Head |
| 6,941,857 | B2 | 9/2005 | McLemore |
| 6,972,397 | B2 | 12/2005 | Ha |
| 7,009,147 | B1 | 3/2006 | Schulte |
| 7,012,220 | B2 | 3/2006 | Boyer et al. |
| 7,012,221 | B2 | 3/2006 | Li |
| 7,021,203 | B2 | 4/2006 | Backus et al. |
| 7,021,204 | B2 | 4/2006 | Backus et al. |
| 7,024,104 | B2 | 4/2006 | Moore, Jr. et al. |
| 7,045,745 | B2 | 5/2006 | Kim |
| 7,053,337 | B2 | 5/2006 | Ragan et al. |
| 7,060,941 | B1 | 6/2006 | Embury et al. |
| 7,060,943 | B2 | 6/2006 | Hwang |
| 7,081,601 | B2 | 7/2006 | Boyer et al. |
| 7,082,871 | B2 | 8/2006 | Schultz |
| 7,086,326 | B2 | 8/2006 | Yokoyama |
| 7,087,873 | B2 | 8/2006 | Hayakawa et al. |
| 7,091,454 | B2 | 8/2006 | Cho et al. |
| 7,105,780 | B2 | 9/2006 | De'Longhi |
| 7,126,088 | B2 | 10/2006 | Horton et al. |
| 7,148,451 | B2 | 12/2006 | Miyake et al. |
| 7,154,069 | B1 | 12/2006 | Gordon |
| 7,156,087 | B1 | 1/2007 | Churchill et al. |
| 7,157,675 | B2 | 1/2007 | Imura |
| 7,166,822 | B1 | 1/2007 | Chang et al. |
| 7,171,923 | B2 | 2/2007 | Hayakawa et al. |
| 7,208,701 | B2 | 4/2007 | Fraccon et al. |
| 7,208,702 | B2 | 4/2007 | Choi |
| 7,238,921 | B2 | 7/2007 | Beesley et al. |
| 7,250,587 | B2 | 7/2007 | Ely et al. |
| 7,250,588 | B2 | 7/2007 | Ely et al. |
| 7,261,101 | B2 | 8/2007 | Kim |
| 7,274,003 | B2 | 9/2007 | Baumann |
| 7,276,677 | B1 | 10/2007 | Shelton |
| 7,285,751 | B2 | 10/2007 | Li |
| 7,304,271 | B2 | 12/2007 | Cho et al. |
| 7,317,173 | B2 | 1/2008 | Bartelick et al. |
| 7,322,279 | B2 | 1/2008 | Cartigny et al. |
| 7,322,280 | B2 | 1/2008 | Seurat Guiochet et al. |
| 7,325,481 | B2 | 2/2008 | Helm |
| 7,368,688 | B2 | 5/2008 | Kim et al. |
| 7,373,874 | B2 | 5/2008 | Seurat Guiochet et al. |
| 7,377,208 | B2 | 5/2008 | Ho et al. |
| 7,389,721 | B2 | 6/2008 | Wanat |
| 7,411,159 | B2 | 8/2008 | Oosterling |
| 7,412,922 | B2 | 8/2008 | McLemore |
| 7,418,960 | B2 | 9/2008 | Saksena |
| 7,451,691 | B2 | 11/2008 | Robertson |
| 7,451,692 | B2 | 11/2008 | Baraille et al. |
| 7,468,495 | B2 | 12/2008 | Carbone et al. |
| 7,523,696 | B2 | 4/2009 | Seurat Guiochet et al. |
| 7,530,302 | B2 | 5/2009 | Stephanou |
| 7,537,004 | B2 | 5/2009 | Reay |
| 7,565,862 | B2 | 7/2009 | Cartigny et al. |
| 7,605,349 | B2 | 10/2009 | Gaynor et al. |
| D604,098 | S | 11/2009 | Hamlin |
| 7,619,186 | B2 | 11/2009 | Cavada et al. |
| 7,624,674 | B2 | 12/2009 | Chameroy et al. |
| 7,637,206 | B2 | 12/2009 | Seurat Guiochet et al. |
| 7,669,521 | B2 | 3/2010 | Cartigny et al. |
| 7,669,591 | B2 | 3/2010 | Fossati et al. |
| 7,677,160 | B2 | 3/2010 | Tippmann, Sr. et al. |
| 7,703,385 | B2 | 4/2010 | Seurat et al. |
| 7,718,928 | B2 | 5/2010 | He et al. |
| 7,726,508 | B2 | 6/2010 | Hasegawa |
| 7,745,763 | B2 | 6/2010 | Fraccon et al. |
| 7,759,615 | B2 | 7/2010 | Ando et al. |
| 7,762,420 | B2 | 7/2010 | Auwaerter et al. |
| 7,766,003 | B2 | 8/2010 | Kim et al. |
| 7,775,390 | B2 | 8/2010 | De Bastos Reis Portugal et al. |
| 7,800,022 | B2 | 9/2010 | Kim |
| 7,810,488 | B2 | 10/2010 | Manganiello et al. |
| 7,838,799 | B2 | 11/2010 | Freedman |
| 7,856,875 | B2 | 12/2010 | Jeon et al. |

(56) References Cited

U.S. PATENT DOCUMENTS

| | | | |
|---|---|---|---|
| 7,875,836 | B2 | 1/2011 | Imura et al. |
| 7,915,568 | B2 | 3/2011 | Wang |
| D635,393 | S | 4/2011 | Nakatani |
| 7,921,768 | B2 | 4/2011 | Fernandez et al. |
| 7,935,914 | B2 | 5/2011 | Imura |
| 7,943,888 | B2 | 5/2011 | Barnes et al. |
| 7,964,824 | B2 | 6/2011 | Moon |
| 7,968,824 | B2 | 6/2011 | Lee et al. |
| 7,980,171 | B2 | 7/2011 | Groll |
| 8,006,684 | B2 | 8/2011 | Lee et al. |
| 8,006,685 | B2 | 8/2011 | Bolton et al. |
| 8,011,293 | B2 | 9/2011 | McFadden et al. |
| 8,042,533 | B2 | 10/2011 | Dobie et al. |
| 8,080,766 | B2 | 12/2011 | Frock et al. |
| 8,096,436 | B2 | 1/2012 | Rhetat et al. |
| 8,096,440 | B2 | 1/2012 | Rhetat et al. |
| 8,152,083 | B2 | 4/2012 | Bower et al. |
| 8,166,871 | B2 | 5/2012 | Veltrop et al. |
| 8,205,543 | B2 | 6/2012 | Rhetat et al. |
| 8,247,751 | B2 | 8/2012 | Jagannathan |
| 8,258,435 | B2 | 9/2012 | Bonuso et al. |
| 8,267,008 | B2 | 9/2012 | Yasuhara |
| D669,730 | S | 10/2012 | Mandil |
| 8,276,507 | B1 | 10/2012 | Walker |
| 8,286,548 | B2 | 10/2012 | Krishnan et al. |
| 8,299,404 | B2 | 10/2012 | Van Der Weij |
| 8,302,800 | B2 | 11/2012 | Hasegawa |
| 8,304,695 | B2 | 11/2012 | Bonuso et al. |
| 8,330,083 | B2 | 12/2012 | Moon et al. |
| 8,338,757 | B2 | 12/2012 | Isoda et al. |
| 8,369,695 | B2 | 2/2013 | Lee et al. |
| 8,378,265 | B2 | 2/2013 | Greenwood et al. |
| 8,381,712 | B1 | 2/2013 | Simms, II |
| 8,393,262 | B1 | 3/2013 | Molayem |
| 8,420,983 | B2 | 4/2013 | Ohashi et al. |
| 8,461,488 | B2 | 6/2013 | Jeong et al. |
| 8,517,006 | B2 | 8/2013 | Frock et al. |
| 8,517,205 | B2 | 8/2013 | Thelen |
| 8,525,081 | B2 | 9/2013 | Colburn et al. |
| 8,544,381 | B2 | 10/2013 | Cartigny et al. |
| 8,546,731 | B2 | 10/2013 | Pellerin et al. |
| 8,561,525 | B2 | 10/2013 | Bauchot et al. |
| 8,578,293 | B2 | 11/2013 | Breunig et al. |
| 8,581,137 | B2 | 11/2013 | Egenter |
| 8,601,939 | B2 | 12/2013 | Saksena et al. |
| 8,604,394 | B2 | 12/2013 | Wu et al. |
| 8,618,447 | B2 | 12/2013 | De'Longhi |
| 8,637,797 | B2 | 1/2014 | Imura |
| D699,514 | S | 2/2014 | Lovley et al. |
| 8,640,908 | B2 | 2/2014 | Yang et al. |
| 8,674,270 | B2 | 3/2014 | Anderson et al. |
| 8,689,680 | B2 | 4/2014 | Park |
| 8,695,487 | B2 | 4/2014 | Sakane et al. |
| 8,709,905 | B2 | 4/2014 | Crayfourd |
| 8,714,391 | B2 | 5/2014 | Milanesi |
| 8,726,792 | B2 | 5/2014 | Shealy et al. |
| 8,733,574 | B2 | 5/2014 | Heidrich et al. |
| D707,078 | S | 6/2014 | Rivera et al. |
| 8,739,690 | B2 | 6/2014 | Chameroy et al. |
| 8,747,933 | B1 | 6/2014 | McGinn |
| 8,766,144 | B2 | 7/2014 | McLoughlin et al. |
| 8,777,038 | B2 | 7/2014 | Wen |
| 8,783,498 | B2 | 7/2014 | Li |
| 8,783,947 | B2 | 7/2014 | Ferron et al. |
| D710,647 | S | 8/2014 | Mandil et al. |
| 8,800,803 | B2 | 8/2014 | Stellwag |
| 8,808,772 | B2 | 8/2014 | Lubrina et al. |
| 8,813,635 | B2 | 8/2014 | Dragan |
| 8,813,989 | B2 | 8/2014 | Hoffmann et al. |
| 8,820,220 | B2 | 9/2014 | Thelen et al. |
| 8,847,129 | B2 | 9/2014 | Kim et al. |
| 8,869,829 | B2 | 10/2014 | Hasegawa |
| 8,887,939 | B2 | 11/2014 | Chameroy et al. |
| D719,398 | S | 12/2014 | Deters |
| D720,571 | S | 1/2015 | Deters |
| 8,931,402 | B2 | 1/2015 | Chameroy et al. |
| 8,931,659 | B2 | 1/2015 | Rhetat et al. |
| 8,944,272 | B2 | 2/2015 | Chameroy et al. |
| 8,944,273 | B2 | 2/2015 | Chameroy et al. |
| 8,946,604 | B2 | 2/2015 | Kaiser et al. |
| 8,960,081 | B2 | 2/2015 | Beard et al. |
| 8,973,770 | B2 | 3/2015 | He et al. |
| 8,985,372 | B2 | 3/2015 | Yang et al. |
| 8,991,307 | B2 | 3/2015 | Grözinger et al. |
| 8,993,934 | B2 | 3/2015 | Giazzon et al. |
| D727,095 | S | 4/2015 | Bak |
| 9,018,566 | B2 | 4/2015 | Wang |
| 9,027,468 | B2 | 5/2015 | Rhetat et al. |
| 9,035,223 | B2 | 5/2015 | Noguchi et al. |
| 9,055,618 | B2 | 6/2015 | Bunzel et al. |
| 9,057,526 | B2 | 6/2015 | Barritt |
| 9,066,523 | B2 | 6/2015 | Seitz et al. |
| 9,115,905 | B2 | 8/2015 | Giazzon et al. |
| 9,119,501 | B2 | 9/2015 | Xie |
| 9,125,513 | B2 | 9/2015 | Kim |
| 9,127,849 | B2 | 9/2015 | Kang et al. |
| 9,138,106 | B2 | 9/2015 | Walker |
| 9,173,408 | B2 | 11/2015 | Yamamoto et al. |
| 9,177,460 | B2 | 11/2015 | Fissler |
| 9,182,126 | B2 | 11/2015 | Cartwright et al. |
| 9,191,998 | B2 | 11/2015 | Hegedis et al. |
| 9,220,362 | B2 | 12/2015 | Eades et al. |
| 9,237,829 | B2 | 1/2016 | Alet Vidal et al. |
| D749,906 | S | 2/2016 | Lee |
| 9,247,842 | B2 | 2/2016 | Cheung et al. |
| 9,271,595 | B2 | 3/2016 | Lee |
| 9,295,354 | B2 | 3/2016 | Sloot et al. |
| 9,295,355 | B2 | 3/2016 | Kwag et al. |
| D754,469 | S | 4/2016 | Deters |
| 9,301,644 | B2 | 4/2016 | Payen et al. |
| 9,314,134 | B2 | 4/2016 | Molnar |
| 9,320,381 | B2 | 4/2016 | Chameroy et al. |
| 9,326,633 | B2 | 5/2016 | Lin |
| 9,339,145 | B1 | 5/2016 | Owczarzak |
| 9,341,382 | B2 | 5/2016 | Kim |
| 9,345,358 | B2 | 5/2016 | Zhang et al. |
| 9,351,495 | B2 | 5/2016 | McFadden |
| 9,353,954 | B2 | 5/2016 | Linnewiel |
| 9,375,021 | B2 | 6/2016 | Raghavan et al. |
| 9,414,713 | B2 | 8/2016 | Jinzhao |
| 9,433,036 | B2 | 8/2016 | Kurimoto et al. |
| 9,439,530 | B2 | 9/2016 | Logan et al. |
| D769,058 | S | 10/2016 | Lee |
| 9,456,713 | B2 | 10/2016 | Backaert et al. |
| 9,470,423 | B2 | 10/2016 | Jacob et al. |
| 9,474,412 | B2 | 10/2016 | Fung et al. |
| D772,648 | S | 11/2016 | Palermo |
| 9,480,364 | B2 | 11/2016 | McKee et al. |
| D774,350 | S | 12/2016 | Mandil |
| D774,356 | S | 12/2016 | Maiorana et al. |
| 9,526,367 | B2 | 12/2016 | Anota et al. |
| 9,545,168 | B2 | 1/2017 | Gabara |
| 9,565,963 | B2 | 2/2017 | Jeon et al. |
| 9,565,964 | B2 | 2/2017 | Yang et al. |
| 9,585,509 | B2 | 3/2017 | Wassmus et al. |
| 9,596,954 | B2 | 3/2017 | Park |
| 9,615,408 | B2 | 4/2017 | Metz et al. |
| 9,615,688 | B2 | 4/2017 | Shibuya et al. |
| 9,615,691 | B2 | 4/2017 | Xiao |
| 9,615,692 | B2 | 4/2017 | Hoffmann et al. |
| 9,615,694 | B2 | 4/2017 | Yoshidome |
| 9,629,499 | B2 | 4/2017 | Kim |
| 9,629,500 | B2 | 4/2017 | Chance |
| 9,636,618 | B2 | 5/2017 | Fung et al. |
| 9,642,487 | B1 | 5/2017 | McGinn |
| 9,648,975 | B2 | 5/2017 | Imura |
| 9,648,985 | B2 | 5/2017 | Huang et al. |
| 9,675,197 | B2 | 6/2017 | Schobloch et al. |
| 9,681,770 | B2 | 6/2017 | Backaert et al. |
| 9,681,773 | B2 | 6/2017 | McKee et al. |
| 9,683,747 | B2 | 6/2017 | Raghavan et al. |
| 9,700,172 | B2 | 7/2017 | Tanaka et al. |
| 9,706,870 | B2 | 7/2017 | Hoehn et al. |
| 9,706,871 | B2 | 7/2017 | Matthijs |

(56) References Cited

U.S. PATENT DOCUMENTS

| | | | |
|---|---|---|---|
| 9,717,363 | B2 | 8/2017 | Pan |
| 9,717,364 | B2 | 8/2017 | Sladecek |
| 9,737,936 | B2 | 8/2017 | Linglin et al. |
| 9,743,794 | B2 | 8/2017 | Shibuya et al. |
| 9,750,089 | B2 | 8/2017 | Wiedemann et al. |
| 9,756,980 | B1 | 9/2017 | Li et al. |
| 9,756,981 | B2 | 9/2017 | Fung |
| 9,763,531 | B2 | 9/2017 | Baraille et al. |
| D801,106 | S | 10/2017 | Mirchandani et al. |
| D801,166 | S | 10/2017 | Baiz et al. |
| 9,775,461 | B2 | 10/2017 | Yang et al. |
| 9,788,678 | B2 | 10/2017 | Abe et al. |
| 9,795,250 | B2 | 10/2017 | Huang |
| 9,801,487 | B2 | 10/2017 | Park et al. |
| 9,801,491 | B2 | 10/2017 | Cohade et al. |
| 9,814,355 | B2 | 11/2017 | Winter et al. |
| 9,841,261 | B2 | 12/2017 | Raghavan et al. |
| 9,854,931 | B2 | 1/2018 | Rocklinger et al. |
| 9,854,932 | B2 | 1/2018 | Tiruvallur |
| 9,854,941 | B2 | 1/2018 | Bonaccorso |
| 9,861,231 | B2 | 1/2018 | Kim |
| 9,867,234 | B2 | 1/2018 | Thomann et al. |
| 9,872,581 | B2 | 1/2018 | Braden et al. |
| 9,872,582 | B2 | 1/2018 | Song et al. |
| 9,877,610 | B2 | 1/2018 | Bucher et al. |
| 9,883,768 | B2 | 2/2018 | Starflinger |
| 9,888,811 | B2 | 2/2018 | Zwanenburg et al. |
| 9,890,946 | B2 | 2/2018 | Shibuya et al. |
| 9,895,028 | B2 | 2/2018 | Gerard et al. |
| 9,900,936 | B2 | 2/2018 | Imm et al. |
| 9,903,597 | B2 | 2/2018 | Nishijima et al. |
| 9,907,435 | B2 | 3/2018 | Kohler et al. |
| 9,909,764 | B2 | 3/2018 | Bach |
| 9,924,825 | B2 | 3/2018 | Zakowski et al. |
| 9,924,830 | B1 | 3/2018 | Glucksman et al. |
| D815,491 | S | 4/2018 | Hollinger |
| 9,930,990 | B1 | 4/2018 | Gupta et al. |
| 9,936,837 | B1 | 4/2018 | Granberry |
| D817,697 | S | 5/2018 | Zhao |
| 9,961,721 | B2 | 5/2018 | Guilleminot et al. |
| 9,961,929 | B2 | 5/2018 | Olsson |
| 9,962,029 | B2 | 5/2018 | Baraille et al. |
| 9,980,605 | B2 | 5/2018 | De Haas et al. |
| 10,016,085 | B2 | 7/2018 | Sapire |
| 10,021,889 | B2 | 7/2018 | Vinett |
| 10,022,015 | B2 | 7/2018 | Marco et al. |
| 10,022,021 | B2 | 7/2018 | Sudhir |
| 10,034,578 | B2 | 7/2018 | Ahmed |
| D824,717 | S | 8/2018 | Allen |
| D826,638 | S | 8/2018 | Zhang |
| 10,045,651 | B2 | 8/2018 | Huang |
| 10,047,961 | B2 | 8/2018 | Choi |
| 10,051,986 | B2 | 8/2018 | Schultz et al. |
| 10,051,995 | B2 | 8/2018 | Buckley et al. |
| 10,054,317 | B2 | 8/2018 | Franzolin |
| 10,057,946 | B2 | 8/2018 | Mills et al. |
| 10,058,210 | B2 | 8/2018 | Palermo |
| 10,060,632 | B2 | 8/2018 | Lim et al. |
| 10,064,518 | B2 | 9/2018 | Xiao et al. |
| 10,076,206 | B2 | 9/2018 | Chameroy et al. |
| D832,023 | S | 10/2018 | Barberi et al. |
| D832,030 | S | 10/2018 | Veldeman |
| 10,088,371 | B2 | 10/2018 | Kaiser et al. |
| 10,092,128 | B2 | 10/2018 | Seitz et al. |
| 10,094,576 | B2 | 10/2018 | Kim et al. |
| 10,098,354 | B2 | 10/2018 | Faraldi et al. |
| D833,204 | S | 11/2018 | Lee |
| 10,117,546 | B2 | 11/2018 | Le Grand |
| 10,119,708 | B2 | 11/2018 | Bartelick et al. |
| 10,123,556 | B2 | 11/2018 | Distaso et al. |
| 10,123,656 | B2 | 11/2018 | Shanmugam |
| 10,125,978 | B2 | 11/2018 | Shibuya et al. |
| 10,130,205 | B2 | 11/2018 | Fung et al. |
| D834,889 | S | 12/2018 | Moon et al. |
| 10,143,324 | B2 | 12/2018 | Kataoka et al. |
| 10,143,327 | B2 | 12/2018 | Freeman et al. |
| 10,154,750 | B2 | 12/2018 | Allemand et al. |
| D838,548 | S | 1/2019 | Meller |
| 10,172,494 | B2 | 1/2019 | Long |
| 10,178,924 | B2 | 1/2019 | French et al. |
| 10,208,964 | B2 | 2/2019 | Cupp et al. |
| D842,649 | S | 3/2019 | Mishan |
| 10,231,292 | B2 | 3/2019 | Kim et al. |
| 10,231,565 | B2 | 3/2019 | Song et al. |
| 10,231,574 | B2 | 3/2019 | Strang |
| 10,244,883 | B2 | 4/2019 | Chameroy et al. |
| 10,253,989 | B2 | 4/2019 | Helm et al. |
| 10,258,049 | B2 | 4/2019 | Engstrom |
| 10,260,755 | B2 | 4/2019 | Bach |
| 10,260,758 | B2 | 4/2019 | Colozzo et al. |
| 10,260,759 | B2 | 4/2019 | Colozzo et al. |
| 10,271,686 | B2 | 4/2019 | Roy |
| 10,274,206 | B2 | 4/2019 | Chen |
| 10,278,241 | B2 | 4/2019 | Shibuya et al. |
| 10,278,532 | B2 | 5/2019 | Metz |
| 10,281,159 | B2 | 5/2019 | Park et al. |
| 10,288,311 | B2 | 5/2019 | Cho et al. |
| 10,295,192 | B2 | 5/2019 | Yoshimura et al. |
| 10,299,621 | B1 | 5/2019 | Bourgeois et al. |
| 10,327,587 | B2 | 6/2019 | Liao |
| 10,330,323 | B2 | 6/2019 | Kim et al. |
| 10,342,375 | B2 | 7/2019 | Chen |
| 10,344,988 | B2 | 7/2019 | Gattei |
| 10,349,775 | B2 | 7/2019 | Lego et al. |
| 10,360,812 | B2 | 7/2019 | Koennings et al. |
| 10,368,395 | B1 | 7/2019 | Norman et al. |
| 10,368,403 | B2 | 7/2019 | Hayashi et al. |
| 10,368,681 | B2 | 8/2019 | Kataoka et al. |
| 10,376,087 | B2 | 8/2019 | Cornelissen |
| 10,390,656 | B2 | 8/2019 | Gill et al. |
| 10,398,249 | B2 | 9/2019 | Becker et al. |
| 10,405,686 | B2 | 9/2019 | Patel et al. |
| 10,413,109 | B2 | 9/2019 | Krebs et al. |
| 10,448,785 | B2 | 10/2019 | Van Der Weij |
| 10,451,290 | B2 | 10/2019 | Mayberry |
| 10,463,186 | B2 | 11/2019 | Di Ronco et al. |
| 10,470,609 | B2 | 11/2019 | Gerard et al. |
| 10,470,614 | B2 | 11/2019 | Lang et al. |
| 10,492,637 | B2 | 12/2019 | Abe et al. |
| 10,492,638 | B2 | 12/2019 | Guegan et al. |
| 10,499,760 | B2 | 12/2019 | Blond |
| 10,512,359 | B2 | 12/2019 | Xu et al. |
| 10,517,306 | B1 | 12/2019 | Meirav |
| 10,524,317 | B2 | 12/2019 | Kondo et al. |
| 10,524,604 | B2 | 1/2020 | Bjork et al. |
| 10,533,752 | B2 | 1/2020 | Faraldi et al. |
| 10,561,273 | B2 | 2/2020 | Patel et al. |
| 10,561,274 | B2 | 2/2020 | Huang |
| 10,561,277 | B1 | 2/2020 | Swayne et al. |
| 10,578,310 | B2 | 3/2020 | Joo et al. |
| 10,588,445 | B2 | 3/2020 | Gustavsson |
| 10,602,869 | B2 | 3/2020 | Yu et al. |
| D883,014 | S | 5/2020 | Varjabedian et al. |
| D883,015 | S | 5/2020 | Deng et al. |
| 10,638,868 | B1 | 5/2020 | Straight |
| 10,638,869 | B2 | 5/2020 | Kataoka et al. |
| 10,638,882 | B1 | 5/2020 | He et al. |
| 10,645,765 | B2 | 5/2020 | Shibuya et al. |
| 10,667,639 | B2 | 6/2020 | Mederer |
| 10,674,855 | B2 | 6/2020 | Rosalia et al. |
| 10,674,864 | B2 | 6/2020 | Trtic |
| 10,690,352 | B2 | 6/2020 | Smith et al. |
| 10,694,753 | B2 | 6/2020 | Reese et al. |
| 10,729,282 | B2 | 8/2020 | Bonaccorso |
| 10,746,412 | B1 | 8/2020 | Artt |
| D903,413 | S | 12/2020 | Guerin et al. |
| 10,893,776 | B1 | 1/2021 | Norman et al. |
| D914,447 | S | 3/2021 | Gill et al. |
| 11,033,146 | B2 | 6/2021 | Anthony et al. |
| 11,051,654 | B2 | 7/2021 | Anthony et al. |
| D934,027 | S | 10/2021 | Gill et al. |
| 11,147,415 | B2 | 10/2021 | Anthony et al. |
| 11,363,911 | B2 | 6/2022 | Anthony et al. |
| 2001/0023641 | A1 | 9/2001 | Borner |

(56) References Cited

U.S. PATENT DOCUMENTS

2002/0179587 A1 12/2002 Hui
2002/0185012 A1 12/2002 Yokoyama
2003/0034027 A1 2/2003 Yamamoto et al.
2003/0127447 A1 7/2003 Lin
2004/0035845 A1 2/2004 Moon et al.
2004/0045446 A1 3/2004 Park
2004/0055474 A1 3/2004 Lekic et al.
2004/0112362 A1 6/2004 Bruno et al.
2004/0124197 A1 7/2004 Hasegawa
2004/0216731 A1 11/2004 Personnettaz et al.
2004/0222208 A1 11/2004 Ko
2004/0253348 A1 12/2004 Woodward et al.
2005/0011370 A1 1/2005 Xu et al.
2005/0034716 A1 2/2005 Harbin
2005/0089318 A1 4/2005 Lai et al.
2005/0189341 A1 9/2005 Lin et al.
2005/0223906 A1* 10/2005 Xu ........................ A47J 27/004 99/348
2005/0284305 A1 12/2005 Angue
2006/0081235 A1 4/2006 Lundh et al.
2007/0045284 A1 3/2007 Balk et al.
2007/0095215 A1 5/2007 Ho et al.
2007/0125768 A1 6/2007 Kim et al.
2007/0158335 A1 7/2007 Mansbery
2007/0199557 A1 8/2007 Von Kaenel, Jr.
2007/0295221 A1 12/2007 Seurat Guiochet et al.
2008/0022861 A1 1/2008 Ferron
2008/0078371 A1 4/2008 Boscaino
2008/0078755 A1 4/2008 Jeon et al.
2008/0083730 A1 4/2008 Dolgov et al.
2008/0095905 A1 4/2008 Sells et al.
2008/0099008 A1 5/2008 Bolto et al.
2008/0105135 A1 5/2008 McFadden et al.
2008/0105137 A1 5/2008 Genslak et al.
2008/0142498 A1 6/2008 He et al.
2008/0163764 A1 7/2008 Payen et al.
2008/0173631 A1 7/2008 Gagas et al.
2008/0206420 A1 8/2008 McFadden
2008/0213447 A1 9/2008 Payen et al.
2008/0223224 A1 9/2008 Martin
2008/0290090 A1 11/2008 Kindler et al.
2008/0314258 A1 12/2008 Martin
2009/0011101 A1 1/2009 Doherty et al.
2009/0013988 A1 1/2009 Kim et al.
2009/0064868 A1 3/2009 Cartossi
2009/0095166 A1 4/2009 Jian
2009/0134140 A1 5/2009 Van Der Weij
2009/0223380 A1 9/2009 Van
2009/0223386 A1 9/2009 Edwards et al.
2009/0250452 A1 10/2009 Tse
2010/0089248 A1 4/2010 Jones
2010/0136194 A1 6/2010 Schutte
2010/0147159 A1 6/2010 Fossati
2010/0147824 A1 6/2010 Bonus et al.
2010/0206289 A1 8/2010 Larsen et al.
2010/0282097 A1 11/2010 Schulte
2011/0003048 A1 1/2011 Sugimoto et al.
2011/0095015 A1 4/2011 Kao
2011/0120319 A1 5/2011 Chang
2011/0126719 A1 6/2011 Valance
2011/0146653 A1 6/2011 Kitatani
2011/0147376 A1 6/2011 Ueda et al.
2011/0168158 A1 7/2011 Barkhouse
2011/0248020 A1 10/2011 Yuan
2011/0268153 A1 11/2011 He et al.
2012/0003364 A1 1/2012 Kling et al.
2012/0009317 A1 1/2012 McLemore
2012/0012584 A1 1/2012 Chameroy et al.
2012/0024164 A1 2/2012 Park et al.
2012/0024169 A1 2/2012 Hsu
2012/0040067 A1 2/2012 Baraille et al.
2012/0048843 A1 3/2012 Feng et al.
2012/0125313 A1 5/2012 Van Der Weij
2012/0174797 A1 7/2012 Froza
2012/0181363 A1 7/2012 Huang
2012/0192722 A1 8/2012 Foster
2012/0192726 A1 8/2012 Clearman et al.
2012/0217236 A1 8/2012 Takagi
2012/0217252 A1 8/2012 Jung
2012/0222665 A1 9/2012 Ahmed
2012/0318149 A1 12/2012 Ahmed
2013/0019759 A1 1/2013 Tumenbatur et al.
2013/0061765 A1 3/2013 Reinhart
2013/0074702 A1 3/2013 Difante
2013/0092145 A1 4/2013 Murphy et al.
2013/0104875 A1 5/2013 Schultz et al.
2013/0156906 A1 6/2013 Raghavan et al.
2013/0180413 A1* 7/2013 Tjerkgaast .............. A47J 37/06 99/447
2013/0180986 A1 7/2013 He et al.
2013/0196038 A1 8/2013 Liu
2013/0247779 A1 9/2013 Hong et al.
2013/0255509 A1 10/2013 He et al.
2013/0276643 A1 10/2013 Krolick et al.
2013/0298781 A1 11/2013 Ganuza et al.
2013/0305933 A1 11/2013 Heidrich et al.
2013/0333685 A1 12/2013 Jeong et al.
2014/0021191 A1 1/2014 Moon et al.
2014/0044851 A1 2/2014 Kennedy
2014/0083306 A1 3/2014 Lee
2014/0083992 A1 3/2014 Linnewiel
2014/0102315 A1 4/2014 Park
2014/0157994 A1 6/2014 Ryan et al.
2014/0175085 A1 6/2014 Yang et al.
2014/0199454 A1 7/2014 Storek et al.
2014/0199459 A1 7/2014 Jackson et al.
2014/0201688 A1 7/2014 Guilleminot et al.
2014/0220196 A1 8/2014 Veloo
2014/0227411 A1 8/2014 Popeil et al.
2014/0245898 A1 9/2014 Froza
2014/0246419 A1 9/2014 Li
2014/0251158 A1 9/2014 Yang et al.
2014/0251162 A1 9/2014 Zhou
2014/0318385 A1 10/2014 Kim
2014/0318386 A1 10/2014 Kim
2014/0318387 A1 10/2014 Kim
2014/0318388 A1 10/2014 Kim
2014/0318389 A1 10/2014 Kim
2014/0322417 A1 10/2014 Kim
2014/0348987 A1 11/2014 Cheng et al.
2014/0353316 A1 12/2014 Lin
2014/0360384 A1 12/2014 Kim
2014/0366746 A1 12/2014 Tsai
2014/0370176 A1 12/2014 Imura et al.
2014/0373729 A1 12/2014 Kim et al.
2014/0377411 A1 12/2014 Hadasz
2014/0377417 A1 12/2014 Martinez
2015/0000535 A1 1/2015 Yoshidome et al.
2015/0059595 A1 3/2015 Rand et al.
2015/0083107 A1 3/2015 Busch et al.
2015/0114238 A1 4/2015 Palermo
2015/0122137 A1 5/2015 Chang
2015/0136769 A1 5/2015 Quinn et al.
2015/0173551 A1 6/2015 Carbone et al.
2015/0192289 A1 7/2015 Gattei et al.
2015/0201788 A1 7/2015 Douma et al.
2015/0201806 A1 7/2015 Yoshidome
2015/0208845 A1 7/2015 Robbins et al.
2015/0208858 A1 7/2015 Robbins et al.
2015/0223627 A1 8/2015 Li et al.
2015/0226438 A1 8/2015 Ozyurt et al.
2015/0250187 A1 9/2015 Sakane et al.
2015/0265097 A1 9/2015 Poon
2015/0292750 A1 10/2015 Delrue et al.
2015/0305093 A1 10/2015 Smith et al.
2015/0312964 A1 10/2015 Sorenson et al.
2015/0313399 A1 11/2015 Park
2015/0351578 A1 12/2015 Song et al.
2015/0354827 A1 12/2015 Faraldi et al.
2015/0366402 A1 12/2015 Wu et al.
2016/0007644 A1 1/2016 Hack et al.
2016/0007789 A1 1/2016 Tiruvallur
2016/0029829 A1* 2/2016 Klein ...................... A47J 37/08 99/332

(56) References Cited

U.S. PATENT DOCUMENTS

2016/0033141 A1 2/2016 Rizzuto
2016/0037955 A1 2/2016 Kim
2016/0045067 A1 2/2016 Liao
2016/0051077 A1 2/2016 Sloot et al.
2016/0051078 A1 2/2016 Jenkins et al.
2016/0051086 A1 2/2016 De'Longhi
2016/0066738 A1 3/2016 Shibuya et al.
2016/0073814 A1 3/2016 Kiriishi et al.
2016/0081509 A1 3/2016 Delrue et al.
2016/0100707 A1 4/2016 Huang
2016/0100713 A1 4/2016 De Haas et al.
2016/0113432 A1 4/2016 Cornelissen
2016/0113442 A1 4/2016 De Haas et al.
2016/0120363 A1* 5/2016 Zwanenburg ......... A47J 37/108
426/523
2016/0120364 A1 5/2016 De Haas et al.
2016/0123660 A1 5/2016 Peng
2016/0150906 A1 6/2016 Lee et al.
2016/0165676 A1 6/2016 Imm et al.
2016/0174749 A1 6/2016 Eades et al.
2016/0174764 A1 6/2016 Xiao
2016/0174771 A1 6/2016 Benoit et al.
2016/0183722 A1 6/2016 Fisher
2016/0192808 A1* 7/2016 Van Der Burg ...... A47J 37/049
99/443 C
2016/0198882 A1 7/2016 Linglin
2016/0198883 A1 7/2016 Wang et al.
2016/0206131 A1 7/2016 Chien
2016/0206139 A1 7/2016 Johnson
2016/0206140 A1 7/2016 Johnson et al.
2016/0219653 A1 7/2016 Kim et al.
2016/0220057 A1 8/2016 Smith et al.
2016/0235078 A1 8/2016 Farina et al.
2016/0235239 A1 8/2016 Patadia
2016/0253080 A1 9/2016 Ban et al.
2016/0270596 A1 9/2016 Allemand et al.
2016/0278563 A1 9/2016 Choudhary
2016/0278565 A1 9/2016 Chameroy et al.
2016/0281994 A1 9/2016 Nuessler
2016/0309940 A1 10/2016 Valance et al.
2016/0309956 A1 10/2016 Glucksman
2016/0316525 A1 10/2016 Vainionpaa
2016/0316968 A1 11/2016 Linglin
2016/0324359 A1 11/2016 Aboujassoum et al.
2016/0327280 A1 11/2016 Smith et al.
2016/0345766 A1 12/2016 Sapire
2016/0353913 A1 12/2016 Chameroy et al.
2016/0353914 A1 12/2016 Chameroy et al.
2016/0353915 A1 12/2016 Chameroy et al.
2016/0353916 A1 12/2016 Chameroy et al.
2016/0360922 A1 12/2016 Xiao et al.
2016/0367061 A1 12/2016 Chou
2016/0374510 A1 12/2016 Albizuri Landazabal
2017/0000293 A1 1/2017 Sladecek et al.
2017/0016623 A1 1/2017 Rabie et al.
2017/0020334 A1 1/2017 Sorenson et al.
2017/0055770 A1 3/2017 Case
2017/0065127 A1 3/2017 Bonaccorso
2017/0071034 A1 3/2017 Metz
2017/0079475 A1 3/2017 Buckley et al.
2017/0089590 A1 3/2017 Bruin-Slot et al.
2017/0095105 A1 4/2017 Clark et al.
2017/0099977 A1 4/2017 Liu
2017/0099984 A1 4/2017 Koetz
2017/0099990 A1 4/2017 Magnouloux et al.
2017/0099995 A1 4/2017 Magnouloux
2017/0119192 A1 5/2017 Sanseverino
2017/0127871 A1 5/2017 Leung
2017/0135159 A1 5/2017 Sorenson et al.
2017/0172335 A1 6/2017 Colas et al.
2017/0181564 A1 6/2017 He et al.
2017/0199658 A1 7/2017 Stoufer et al.
2017/0224157 A1 8/2017 Rummel et al.
2017/0231257 A1 8/2017 Thul et al.
2017/0231415 A1 8/2017 Cheng et al.
2017/0231430 A1 8/2017 Moon et al.
2017/0245328 A1* 8/2017 Moon .................... H05B 6/062
2017/0245674 A1 8/2017 Imura
2017/0245683 A1 8/2017 Chen et al.
2017/0245686 A1 8/2017 Man
2017/0251872 A1 9/2017 Li et al.
2017/0251874 A1 9/2017 Sladecek
2017/0258268 A1 9/2017 Kazanas et al.
2017/0276378 A1 9/2017 Faraldi et al.
2017/0280914 A1 10/2017 Kumar et al.
2017/0290452 A1 10/2017 Guillaume et al.
2017/0295993 A1 10/2017 Li et al.
2017/0303740 A1 10/2017 Bonaccorso
2017/0319006 A1 11/2017 Niizumi
2017/0332823 A1 11/2017 Sanseverino
2017/0343221 A1 11/2017 Swayne et al.
2017/0360238 A1 12/2017 Bogazzi
2017/0360254 A1 12/2017 Muhr et al.
2017/0360255 A1 12/2017 Karau
2017/0367514 A1 12/2017 In't Groen et al.
2017/0370595 A1 12/2017 Yang et al.
2018/0000285 A1 1/2018 Backus et al.
2018/0007744 A1 1/2018 Nonaka et al.
2018/0014683 A1 1/2018 Glucksman
2018/0028017 A1 2/2018 Wu
2018/0035696 A1 2/2018 Bartlett et al.
2018/0035698 A1 2/2018 McNerney et al.
2018/0070596 A1 3/2018 Kim et al.
2018/0073739 A1 3/2018 Dumenil
2018/0078089 A1 3/2018 Sauer et al.
2018/0103796 A1 4/2018 Park
2018/0110355 A1 4/2018 Huang et al.
2018/0110373 A1 4/2018 Zhang et al.
2018/0116264 A1 5/2018 De Winter et al.
2018/0116438 A1 5/2018 He et al.
2018/0125293 A1 5/2018 McNerney et al.
2018/0125294 A1 5/2018 Conte et al.
2018/0140126 A1 5/2018 Van Dillen
2018/0143086 A1 5/2018 Stoufer et al.
2018/0146812 A1 5/2018 Choi
2018/0153329 A1 6/2018 Glucksman et al.
2018/0160840 A1 6/2018 De'Longhi
2018/0160849 A1 6/2018 Hebert, Jr. et al.
2018/0177322 A1 6/2018 Kim
2018/0177343 A1 6/2018 Bonaccorso
2018/0184843 A1 7/2018 Kim et al.
2018/0184848 A1 7/2018 De'Longhi
2018/0192825 A1 7/2018 Popeil et al.
2018/0199615 A1 7/2018 Zhang et al.
2018/0199756 A1 7/2018 Huang
2018/0206672 A1 7/2018 Grace et al.
2018/0206677 A1 7/2018 Ivarsson et al.
2018/0220498 A1 8/2018 Jeon et al.
2018/0220842 A1 8/2018 Delrue et al.
2018/0228318 A1 8/2018 Zwanenburg et al.
2018/0235396 A1 8/2018 Schönenberger
2018/0238560 A1 8/2018 Deng et al.
2018/0255967 A1 9/2018 Haas et al.
2018/0255971 A1 9/2018 Moon et al.
2018/0263084 A1 9/2018 Yoshino et al.
2018/0266697 A1* 9/2018 Dash ................... A47J 37/0623
2018/0270915 A1 9/2018 Koetz
2018/0271321 A1 9/2018 Delrue et al.
2018/0271322 A1 9/2018 Thai et al.
2018/0271323 A1 9/2018 Zhang et al.
2018/0279832 A1 10/2018 Ohta et al.
2018/0289212 A1 10/2018 Sladecek et al.
2018/0296019 A1 10/2018 Kim et al.
2018/0299138 A1 10/2018 Faraldi et al.
2018/0303285 A1 10/2018 Cheng
2018/0317691 A1 11/2018 Huang
2018/0317692 A1 11/2018 Huang
2018/0317693 A1 11/2018 Huang
2018/0325311 A1 11/2018 Feldman et al.
2018/0325313 A1 11/2018 De'Longhi et al.
2018/0325318 A1 11/2018 De'Longhi et al.
2018/0325322 A1 11/2018 De'Longhi et al.
2018/0332993 A1 11/2018 Cho et al.
2018/0332999 A1 11/2018 Nie

(56) References Cited

U.S. PATENT DOCUMENTS

2018/0333004 A1* 11/2018 De'Longhi ......... A47J 37/1261
2018/0333005 A1 11/2018 Fritz et al.
2018/0338636 A1 11/2018 Ceccoli
2018/0340695 A1 11/2018 Park et al.
2018/0344085 A1 12/2018 Dutter
2018/0347829 A1 12/2018 Martini et al.
2018/0353007 A1 12/2018 Eberhart et al.
2018/0353010 A1 12/2018 Delrue et al.
2018/0359823 A1 12/2018 Shin et al.
2018/0363915 A1 12/2018 Bu
2019/0000267 A1 1/2019 Li et al.
2019/0003718 A1 1/2019 Lee et al.
2019/0008316 A1 1/2019 Kim et al.
2019/0014940 A1 1/2019 Cheung et al.
2019/0014943 A1 1/2019 Gill et al.
2019/0021142 A1 1/2019 Mizuta et al.
2019/0021546 A1 1/2019 Tan et al.
2019/0024904 A1 1/2019 Ueda et al.
2019/0045964 A1 2/2019 Gill et al.
2019/0045973 A1 2/2019 Gill et al.
2019/0053521 A1 2/2019 Tian et al.
2019/0053655 A1 2/2019 Panasik et al.
2019/0059627 A1 2/2019 Kitatani et al.
2019/0059647 A1 2/2019 Floessholzer
2019/0069719 A1* 3/2019 Huang ................ A47J 37/0664
2019/0075956 A1 3/2019 Bang et al.
2019/0075971 A1 3/2019 Noca et al.
2019/0082876 A1 3/2019 Shi et al.
2019/0086075 A1 3/2019 Albert
2019/0099039 A1 4/2019 Li et al.
2019/0110629 A1 4/2019 Truong et al.
2019/0110638 A1 4/2019 Li et al.
2019/0110640 A1 4/2019 Te Velde et al.
2019/0117005 A1 4/2019 Kettavong et al.
2019/0120504 A1 4/2019 Lee et al.
2019/0137112 A1 5/2019 Lego et al.
2019/0142215 A1 5/2019 Popeil et al.
2019/0142217 A1 5/2019 Sladecek
2019/0142220 A1 5/2019 Shirali et al.
2019/0167038 A1 6/2019 De'Longhi et al.
2019/0170361 A1 6/2019 Ha et al.
2019/0174945 A1 6/2019 Oti
2019/0203944 A1 7/2019 Cho et al.
2019/0215916 A1 7/2019 Yang et al.
2019/0223658 A1 7/2019 He
2019/0231125 A1 8/2019 Gill et al.
2019/0231126 A1 8/2019 Gill et al.
2019/0231127 A1 8/2019 Gill et al.
2019/0231128 A1 8/2019 Gill et al.
2019/0231129 A1 8/2019 Gill et al.
2019/0231130 A1 8/2019 Gill et al.
2019/0231131 A1 8/2019 Gill et al.
2019/0231132 A1 8/2019 Gill et al.
2019/0231133 A1 8/2019 Gill et al.
2019/0231134 A1 8/2019 Gill et al.
2019/0231135 A1 8/2019 Gill et al.
2019/0231136 A1 8/2019 Gill et al.
2019/0231137 A1 8/2019 Gill et al.
2019/0231138 A1 8/2019 Gill et al.
2019/0231139 A1 8/2019 Gill et al.
2019/0231140 A1 8/2019 Gill et al.
2019/0231141 A1 8/2019 Gill et al.
2019/0231142 A1 8/2019 Gill et al.
2019/0231143 A1 8/2019 Gill et al.
2019/0239518 A1 8/2019 McKee et al.
2019/0246830 A1 8/2019 Ametepe et al.
2019/0246835 A1 8/2019 Tsai
2019/0254473 A1 8/2019 Anthony et al.
2019/0254474 A1 8/2019 Anthony et al.
2019/0254476 A1 8/2019 Anthony et al.
2019/0269272 A1 9/2019 Itzkowitz
2019/0269276 A1 9/2019 Gvili
2019/0282021 A1 9/2019 Dion et al.
2019/0282029 A1 9/2019 Goldberg
2019/0290062 A1 9/2019 Prieto et al.
2019/0290072 A1 9/2019 Prieto et al.
2019/0298100 A1 10/2019 Li et al.
2019/0298105 A1 10/2019 Floessholzer
2019/0309955 A1 10/2019 Castillo et al.
2019/0309956 A1 10/2019 Buschman et al.
2019/0313832 A1 10/2019 Lee et al.
2019/0313844 A1 10/2019 Nadendla et al.
2019/0316783 A1 10/2019 Lee et al.
2019/0327979 A1 10/2019 Yang et al.
2019/0328175 A1 10/2019 Bancroft
2019/0335934 A1 11/2019 Delrue et al.
2019/0374058 A1 12/2019 Blond et al.
2019/0380524 A1 12/2019 Guegan et al.
2019/0381654 A1 12/2019 Oleynik
2019/0387913 A1 12/2019 Lee et al.
2019/0387921 A1 12/2019 Lemberger et al.
2019/0387922 A1 12/2019 Jin et al.
2019/0387923 A1 12/2019 Anthony et al.
2020/0000262 A1 1/2020 Delrue et al.
2020/0008601 A1 1/2020 Cao
2020/0008616 A1 1/2020 Moon
2020/0018475 A1 1/2020 Sim et al.
2020/0029721 A1 1/2020 Kang et al.
2020/0029731 A1 1/2020 Hunt
2020/0033009 A1 1/2020 Lee et al.
2020/0046157 A1 2/2020 Leung
2020/0053842 A1 2/2020 Jeon et al.
2020/0054024 A1 2/2020 Sun et al.
2020/0069113 A1 3/2020 Anthony et al.
2020/0080726 A1 3/2020 Polster
2020/0088415 A1 3/2020 Lee et al.
2020/0113380 A1 4/2020 Lu
2020/0121129 A1 4/2020 Wittig
2020/0128995 A1 4/2020 Patel et al.
2020/0138043 A1 5/2020 Hoerter
2020/0138229 A1 5/2020 Kweon et al.
2020/0138239 A1 5/2020 Gromowski et al.
2020/0146496 A1 5/2020 Patadia
2020/0146497 A1 5/2020 Shi et al.
2020/0170437 A1 6/2020 Anthony et al.
2020/0178583 A1 6/2020 Chen et al.
2020/0182485 A1 6/2020 Ball et al.
2020/0187315 A1 6/2020 Carcano et al.
2020/0187697 A1 6/2020 Stewart et al.
2020/0187710 A1 6/2020 Guo et al.
2020/0191404 A1 6/2020 Song
2020/0205245 A1 6/2020 Ma et al.
2020/0205595 A1 7/2020 He
2020/0214500 A1 7/2020 Popeil et al.
2020/0229637 A1 7/2020 Han et al.
2020/0229638 A1 7/2020 Lu
2020/0229640 A1 7/2020 Han et al.
2020/0240647 A1 7/2020 Itzkowitz et al.
2020/0253420 A1 8/2020 He et al.
2020/0260907 A1 8/2020 Lu et al.
2020/0278116 A1 9/2020 Kobayashi et al.
2020/0329909 A1 10/2020 Conrad et al.
2020/0337497 A1 10/2020 Anthony et al.
2020/0405086 A1 12/2020 Dos Santos et al.
2021/0000292 A1 1/2021 Siu et al.
2021/0000296 A1 1/2021 Kennedy et al.
2021/0274969 A1 9/2021 Anthony et al.
2022/0257053 A1 8/2022 Bate

FOREIGN PATENT DOCUMENTS

CN 1231153 A 10/1999
CN 2389593 Y 8/2000
CN 2450993 Y 10/2001
CN 2469839 Y 1/2002
CN 2479871 Y 3/2002
CN 1139352 C 2/2004
CN 1148142 C 5/2004
CN 1158963 C 7/2004
CN 2719176 Y 8/2005
CN 1218653 C 9/2005
CN 1820685 A 8/2006
CN 1883351 A 12/2006
CN 2855256 Y 1/2007

(56) References Cited

FOREIGN PATENT DOCUMENTS

| | | | | |
|---|---|---|---|---|
| CN | 2904903 | Y | | 5/2007 |
| CN | 1981682 | A | | 6/2007 |
| CN | 1985727 | A | | 6/2007 |
| CN | 1989884 | A | | 7/2007 |
| CN | 100998476 | A | | 7/2007 |
| CN | 101023842 | A | | 8/2007 |
| CN | 101053485 | A | | 10/2007 |
| CN | 200987595 | Y | | 12/2007 |
| CN | 101099635 | A | | 1/2008 |
| CN | 101108064 | A | | 1/2008 |
| CN | 101112291 | A | | 1/2008 |
| CN | 101112292 | A | | 1/2008 |
| CN | 101112293 | A | | 1/2008 |
| CN | 101142448 | A | | 3/2008 |
| CN | 101185556 | A | | 5/2008 |
| CN | 100401957 | C | | 7/2008 |
| CN | 101209179 | A | | 7/2008 |
| CN | 101209180 | A | | 7/2008 |
| CN | 201079267 | Y | | 7/2008 |
| CN | 100425186 | C | | 10/2008 |
| CN | 100428906 | C | | 10/2008 |
| CN | 101273834 | A | | 10/2008 |
| CN | 201139427 | Y | | 10/2008 |
| CN | 101317741 | A | | 12/2008 |
| CN | 101322614 | A | | 12/2008 |
| CN | 201197609 | Y | | 2/2009 |
| CN | 100464682 | C | | 3/2009 |
| CN | 100469289 | C | | 3/2009 |
| CN | 201201144 | Y | | 3/2009 |
| CN | 201207144 | Y | | 3/2009 |
| CN | 101420893 | A | | 4/2009 |
| CN | 201223313 | Y | | 4/2009 |
| CN | 101432608 | A | | 5/2009 |
| CN | 101438929 | A | | 5/2009 |
| CN | 100496350 | C | | 6/2009 |
| CN | 101493236 | A | | 7/2009 |
| CN | 100522018 | C | | 8/2009 |
| CN | 100531628 | C | | 8/2009 |
| CN | 100534363 | C | | 9/2009 |
| CN | 101518409 | A | | 9/2009 |
| CN | 100559999 | C | | 11/2009 |
| CN | 201365839 | Y | | 12/2009 |
| CN | 100588351 | C | | 2/2010 |
| CN | 101669761 | A | | 3/2010 |
| CN | 201445402 | U | | 5/2010 |
| CN | 101766439 | A | | 7/2010 |
| CN | 101766443 | A | | 7/2010 |
| CN | 101791190 | A | | 8/2010 |
| CN | 101828856 | A | | 9/2010 |
| CN | 101856086 | A | | 10/2010 |
| CN | 201602600 | U | | 10/2010 |
| CN | 201624512 | U | | 11/2010 |
| CN | 101936550 | A | | 1/2011 |
| CN | 101940273 | A | | 1/2011 |
| CN | 101977536 | A | | 2/2011 |
| CN | 201888709 | U | | 7/2011 |
| CN | 102155120 | A | | 8/2011 |
| CN | 201929758 | U | | 8/2011 |
| CN | 201932876 | U | | 8/2011 |
| CN | 201932878 | U | | 8/2011 |
| CN | 201948771 | U | | 8/2011 |
| CN | 102178443 | A | | 9/2011 |
| CN | 102178445 | A | | 9/2011 |
| CN | 102178464 | A | | 9/2011 |
| CN | 201958652 | U | | 9/2011 |
| CN | 201996364 | U | | 10/2011 |
| CN | 101305890 | B | | 11/2011 |
| CN | 102240164 | A | | 11/2011 |
| CN | 102307500 | A | | 1/2012 |
| CN | 102313306 | A | | 1/2012 |
| CN | 102349791 | A | | 2/2012 |
| CN | 202151310 | U | | 2/2012 |
| CN | 102368936 | A | | 3/2012 |
| CN | 202184614 | U | | 4/2012 |
| CN | 101692958 | B | | 5/2012 |
| CN | 202207075 | U | | 5/2012 |
| CN | 202234720 | U | | 5/2012 |
| CN | 202234761 | U | | 5/2012 |
| CN | 102578928 | A | | 7/2012 |
| CN | 202312886 | U | | 7/2012 |
| CN | 102670079 | A | | 9/2012 |
| CN | 202408428 | U | | 9/2012 |
| CN | 202408455 | U | | 9/2012 |
| CN | 102755120 | A | | 10/2012 |
| CN | 102824120 | A | | 12/2012 |
| CN | 202589327 | U | * | 12/2012 |
| CN | 202619362 | U | | 12/2012 |
| CN | 102100481 | B | | 1/2013 |
| CN | 102883641 | A | | 1/2013 |
| CN | 202636678 | U | | 1/2013 |
| CN | 202698888 | U | | 1/2013 |
| CN | 102920355 | A | | 2/2013 |
| CN | 103006045 | A | | 4/2013 |
| CN | 103006092 | A | | 4/2013 |
| CN | 202858889 | U | | 4/2013 |
| CN | 103142128 | A | | 6/2013 |
| CN | 103142151 | A | | 6/2013 |
| CN | 103156532 | A | | 6/2013 |
| CN | 103169371 | A | | 6/2013 |
| CN | 103179884 | A | | 6/2013 |
| CN | 202960194 | U | | 6/2013 |
| CN | 202981662 | U | | 6/2013 |
| CN | 202981682 | U | | 6/2013 |
| CN | 203000535 | U | | 6/2013 |
| CN | 103188947 | A | | 7/2013 |
| CN | 103188970 | A | | 7/2013 |
| CN | 103220947 | A | | 7/2013 |
| CN | 103222807 | A | | 7/2013 |
| CN | 203041954 | U | | 7/2013 |
| CN | 203041955 | U | | 7/2013 |
| CN | 102342739 | B | | 8/2013 |
| CN | 203122175 | U | | 8/2013 |
| CN | 103299132 | A | | 9/2013 |
| CN | 203195497 | U | | 9/2013 |
| CN | 203195499 | U | | 9/2013 |
| CN | 103375826 | A | | 10/2013 |
| CN | 203234602 | U | | 10/2013 |
| CN | 203234613 | U | | 10/2013 |
| CN | 102319018 | B | | 11/2013 |
| CN | 203302847 | U | * | 11/2013 |
| CN | 203302862 | U | | 11/2013 |
| CN | 203302892 | U | | 11/2013 |
| CN | 103445669 | A | | 12/2013 |
| CN | 102397005 | B | | 1/2014 |
| CN | 103491830 | A | | 1/2014 |
| CN | 103536188 | A | * | 1/2014 |
| CN | 203407931 | U | | 1/2014 |
| CN | 103649643 | A | | 3/2014 |
| CN | 203483269 | U | | 3/2014 |
| CN | 103690065 | A | * | 4/2014 .......... A47J 37/0641 |
| CN | 103750730 | A | | 4/2014 |
| CN | 203539138 | U | | 4/2014 |
| CN | 203539141 | U | | 4/2014 |
| CN | 103813738 | A | | 5/2014 |
| CN | 203597772 | U | | 5/2014 |
| CN | 203615383 | U | | 5/2014 |
| CN | 203634023 | U | | 6/2014 |
| CN | 203647141 | U | | 6/2014 |
| CN | 203662545 | U | | 6/2014 |
| CN | 103892696 | A | | 7/2014 |
| CN | 103948308 | A | | 7/2014 |
| CN | 203693372 | U | | 7/2014 |
| CN | 203723888 | U | | 7/2014 |
| CN | 104000478 | A | | 8/2014 |
| CN | 203762926 | U | | 8/2014 |
| CN | 203776718 | U | | 8/2014 |
| CN | 203776719 | U | | 8/2014 |
| CN | 203776729 | U | | 8/2014 |
| CN | 203789747 | U | | 8/2014 |
| CN | 203828675 | U | | 9/2014 |
| CN | 203873601 | U | | 10/2014 |
| CN | 203873602 | U | | 10/2014 |
| CN | 203885286 | U | | 10/2014 |
| CN | 203885342 | U | | 10/2014 |

(56) References Cited

FOREIGN PATENT DOCUMENTS

| | | | | |
|---|---|---|---|---|
| CN | 203914511 | U | | 11/2014 |
| CN | 203953373 | U | | 11/2014 |
| CN | 203970073 | U | | 12/2014 |
| CN | 203970160 | U | | 12/2014 |
| CN | 203987492 | U | | 12/2014 |
| CN | 203987520 | U | | 12/2014 |
| CN | 203987550 | U | | 12/2014 |
| CN | 203987551 | U | | 12/2014 |
| CN | 204015964 | U | | 12/2014 |
| CN | 204016055 | U | | 12/2014 |
| CN | 204016056 | U | | 12/2014 |
| CN | 204049362 | U | | 12/2014 |
| CN | 204091768 | U | | 1/2015 |
| CN | 104323708 | A | | 2/2015 |
| CN | 104337407 | A | | 2/2015 |
| CN | 104367182 | A | | 2/2015 |
| CN | 104367252 | A | | 2/2015 |
| CN | 204133165 | U | | 2/2015 |
| CN | 204133291 | U | | 2/2015 |
| CN | 204158183 | U | | 2/2015 |
| CN | 104433841 | A | | 3/2015 |
| CN | 204192406 | U | | 3/2015 |
| CN | 104490294 | A | | 4/2015 |
| CN | 102917623 | B | | 5/2015 |
| CN | 104586233 | A | | 5/2015 |
| CN | 104605727 | A | | 5/2015 |
| CN | 104613515 | A | | 5/2015 |
| CN | 104622274 | A | | 5/2015 |
| CN | 104676681 | A | | 6/2015 |
| CN | 104688019 | A | | 6/2015 |
| CN | 104706212 | A | | 6/2015 |
| CN | 103284618 | B | | 7/2015 |
| CN | 104754992 | A | | 7/2015 |
| CN | 104757872 | A | | 7/2015 |
| CN | 204427799 | U | | 7/2015 |
| CN | 204427801 | U | | 7/2015 |
| CN | 204467861 | U | | 7/2015 |
| CN | 204500391 | U | | 7/2015 |
| CN | 104814665 | A | | 8/2015 |
| CN | 104856561 | A | | 8/2015 |
| CN | 104856563 | A | | 8/2015 |
| CN | 204520386 | U | | 8/2015 |
| CN | 204580991 | U | | 8/2015 |
| CN | 104873098 | A | | 9/2015 |
| CN | 104887063 | A | | 9/2015 |
| CN | 204636063 | U | | 9/2015 |
| CN | 104983318 | A | | 10/2015 |
| CN | 104997394 | A | | 10/2015 |
| CN | 204697804 | U | | 10/2015 |
| CN | 105011741 | A | | 11/2015 |
| CN | 105030035 | A | | 11/2015 |
| CN | 204734374 | U | | 11/2015 |
| CN | 204743846 | U | | 11/2015 |
| CN | 204765165 | U | | 11/2015 |
| CN | 204765167 | U | | 11/2015 |
| CN | 204765168 | U | * | 11/2015 |
| CN | 204765197 | U | | 11/2015 |
| CN | 204765198 | U | * | 11/2015 |
| CN | 204797615 | U | | 11/2015 |
| CN | 204797616 | U | | 11/2015 |
| CN | 103813738 | B | | 12/2015 |
| CN | 105105624 | A | | 12/2015 |
| CN | 105105626 | A | | 12/2015 |
| CN | 105167592 | A | | 12/2015 |
| CN | 105193301 | A | | 12/2015 |
| CN | 204813499 | U | | 12/2015 |
| CN | 204839219 | U | | 12/2015 |
| CN | 204889693 | U | | 12/2015 |
| CN | 105212730 | A | | 1/2016 |
| CN | 105231802 | A | | 1/2016 |
| CN | 105231811 | A | | 1/2016 |
| CN | 105231812 | A | | 1/2016 |
| CN | 105231813 | A | | 1/2016 |
| CN | 105265565 | A | | 1/2016 |
| CN | 105266565 | A | | 1/2016 |
| CN | 105266577 | A | | 1/2016 |
| CN | 204995259 | U | | 1/2016 |
| CN | 105286491 | A | | 2/2016 |
| CN | 105286496 | A | | 2/2016 |
| CN | 105286498 | A | | 2/2016 |
| CN | 105286627 | A | | 2/2016 |
| CN | 105326332 | A | | 2/2016 |
| CN | 105342454 | A | | 2/2016 |
| CN | 205018872 | U | | 2/2016 |
| CN | 205018878 | U | | 2/2016 |
| CN | 103649643 | B | | 3/2016 |
| CN | 105380512 | A | | 3/2016 |
| CN | 105380513 | A | | 3/2016 |
| CN | 105380514 | A | | 3/2016 |
| CN | 105411378 | A | | 3/2016 |
| CN | 105411379 | A | | 3/2016 |
| CN | 105433778 | A | | 3/2016 |
| CN | 105433779 | A | | 3/2016 |
| CN | 105451610 | A | | 3/2016 |
| CN | 205053851 | U | | 3/2016 |
| CN | 105455628 | A | | 4/2016 |
| CN | 105455664 | A | | 4/2016 |
| CN | 105455671 | A | | 4/2016 |
| CN | 105476461 | A | | 4/2016 |
| CN | 105476464 | A | | 4/2016 |
| CN | 105476472 | A | | 4/2016 |
| CN | 105476491 | A | | 4/2016 |
| CN | 105496184 | A | | 4/2016 |
| CN | 105496185 | A | | 4/2016 |
| CN | 105496224 | A | | 4/2016 |
| CN | 205126014 | U | | 4/2016 |
| CN | 105534269 | A | | 5/2016 |
| CN | 105552125 | A | | 5/2016 |
| CN | 105559571 | A | | 5/2016 |
| CN | 105595792 | A | | 5/2016 |
| CN | 105595803 | A | | 5/2016 |
| CN | 205197727 | U | | 5/2016 |
| CN | 205197819 | U | | 5/2016 |
| CN | 205214967 | U | | 5/2016 |
| CN | 205215045 | U | | 5/2016 |
| CN | 102440681 | B | | 6/2016 |
| CN | 102783908 | B | | 6/2016 |
| CN | 103648337 | B | | 6/2016 |
| CN | 105615638 | A | | 6/2016 |
| CN | 105615639 | A | | 6/2016 |
| CN | 105615686 | A | | 6/2016 |
| CN | 105640299 | A | | 6/2016 |
| CN | 105640302 | A | | 6/2016 |
| CN | 105640308 | A | | 6/2016 |
| CN | 105640309 | A | | 6/2016 |
| CN | 105640351 | A | | 6/2016 |
| CN | 105662112 | A | | 6/2016 |
| CN | 105662125 | A | | 6/2016 |
| CN | 105662126 | A | | 6/2016 |
| CN | 105662127 | A | | 6/2016 |
| CN | 105708312 | A | | 6/2016 |
| CN | 205286098 | U | | 6/2016 |
| CN | 205322075 | U | | 6/2016 |
| CN | 205338709 | U | | 6/2016 |
| CN | 104068757 | B | | 7/2016 |
| CN | 105725730 | A | | 7/2016 |
| CN | 105725829 | A | | 7/2016 |
| CN | 105768859 | A | | 7/2016 |
| CN | 105768860 | A | | 7/2016 |
| CN | 103908166 | B | | 8/2016 |
| CN | 105816023 | A | | 8/2016 |
| CN | 105832176 | A | | 8/2016 |
| CN | 105852667 | A | | 8/2016 |
| CN | 105852668 | A | | 8/2016 |
| CN | 105902144 | A | | 8/2016 |
| CN | 105902150 | A | | 8/2016 |
| CN | 205410811 | U | | 8/2016 |
| CN | 205425108 | U | | 8/2016 |
| CN | 205433281 | U | | 8/2016 |
| CN | 205433317 | U | | 8/2016 |
| CN | 205433320 | U | | 8/2016 |
| CN | 205493513 | U | | 8/2016 |
| CN | 205493586 | U | | 8/2016 |
| CN | 205493593 | U | | 8/2016 |

(56) References Cited

FOREIGN PATENT DOCUMENTS

CN 105919411 A 9/2016
CN 105919417 A 9/2016
CN 105919448 A * 9/2016
CN 105935244 A 9/2016
CN 105935258 A 9/2016
CN 105943000 A 9/2016
CN 105972653 A 9/2016
CN 205568641 U 9/2016
CN 205568772 U 9/2016
CN 205597052 U 9/2016
CN 105982529 A 10/2016
CN 105996737 A 10/2016
CN 105996752 A 10/2016
CN 105996753 A 10/2016
CN 106037448 A 10/2016
CN 106037457 A 10/2016
CN 106037458 A 10/2016
CN 106073481 A 11/2016
CN 106073517 A 11/2016
CN 106108621 A 11/2016
CN 106108627 A 11/2016
CN 106108631 A 11/2016
CN 106166030 A 11/2016
CN 205671926 U 11/2016
CN 205671927 U 11/2016
CN 106175412 A 12/2016
CN 106175423 A 12/2016
CN 106175476 A 12/2016
CN 106175477 A 12/2016
CN 106213979 A 12/2016
CN 106235878 A 12/2016
CN 205831665 U 12/2016
CN 106264085 A 1/2017
CN 106264095 A 1/2017
CN 106292340 A 1/2017
CN 106343895 A 1/2017
CN 205849309 U 1/2017
CN 205860134 U 1/2017
CN 106377158 A 2/2017
CN 106377159 A 2/2017
CN 106388565 A 2/2017
CN 106388572 A 2/2017
CN 106419486 A 2/2017
CN 106419521 A 2/2017
CN 106419524 A 2/2017
CN 106419620 A 2/2017
CN 205923803 U 2/2017
CN 102805554 B 3/2017
CN 106473623 A 3/2017
CN 106490967 A 3/2017
CN 106510449 A 3/2017
CN 206007050 U 3/2017
CN 206026097 U 3/2017
CN 206026100 U 3/2017
CN 206044349 U 3/2017
CN 206044409 U 3/2017
CN 106551617 A 4/2017
CN 106580074 A 4/2017
CN 206062888 U 4/2017
CN 206062947 U 4/2017
CN 206102391 U 4/2017
CN 206119969 U 4/2017
CN 206119971 U 4/2017
CN 106618154 A 5/2017
CN 106667244 A 5/2017
CN 106691171 A 5/2017
CN 206166699 U 5/2017
CN 206166710 U 5/2017
CN 206166711 U 5/2017
CN 206166726 U 5/2017
CN 206183062 U 5/2017
CN 106802584 A 6/2017
CN 106805744 A 6/2017
CN 106805746 A 6/2017
CN 106805747 A 6/2017
CN 106805749 A 6/2017
CN 106805750 A 6/2017
CN 106805752 A 6/2017
CN 106820951 A 6/2017
CN 106820954 A 6/2017
CN 106821017 A 6/2017
CN 106852641 A 6/2017
CN 106859298 A 6/2017
CN 206239100 U 6/2017
CN 206252365 U 6/2017
CN 206261486 U 6/2017
CN 206261487 U 6/2017
CN 206284788 U 6/2017
CN 206284794 U 6/2017
CN 105054772 B 7/2017
CN 106913201 A 7/2017
CN 106923655 A 7/2017
CN 106943000 A 7/2017
CN 106943002 A 7/2017
CN 106955017 A 7/2017
CN 106974548 A 7/2017
CN 106983360 A 7/2017
CN 206303774 U 7/2017
CN 206324671 U 7/2017
CN 105212693 B 8/2017
CN 106998961 A 8/2017
CN 107019418 A 8/2017
CN 107019419 A 8/2017
CN 107019420 A 8/2017
CN 107019423 A 8/2017
CN 107040091 A 8/2017
CN 107048976 A 8/2017
CN 107048991 A 8/2017
CN 107048993 A 8/2017
CN 107049054 A 8/2017
CN 107049058 A 8/2017
CN 107105914 A 8/2017
CN 206371913 U 8/2017
CN 206371926 U 8/2017
CN 206371930 U * 8/2017
CN 206371931 U 8/2017
CN 206381064 U 8/2017
CN 206414178 U 8/2017
CN 104334066 B 9/2017
CN 107136910 A 9/2017
CN 107136911 A 9/2017
CN 107149395 A 9/2017
CN 107149398 A 9/2017
CN 206453694 U 9/2017
CN 206469994 U 9/2017
CN 206504577 U 9/2017
CN 206518479 U 9/2017
CN 105054773 B 10/2017
CN 105142473 B 10/2017
CN 107224188 A 10/2017
CN 107224197 A 10/2017
CN 107232962 A 10/2017
CN 107259978 A 10/2017
CN 107290094 A 10/2017
CN 107296485 A 10/2017
CN 107296486 A 10/2017
CN 107296487 A 10/2017
CN 107296488 A 10/2017
CN 107296489 A 10/2017
CN 107296490 A 10/2017
CN 107296493 A 10/2017
CN 107296494 A 10/2017
CN 206560353 U 10/2017
CN 206560354 U 10/2017
CN 206560359 U 10/2017
CN 206560361 U 10/2017
CN 104643954 B 11/2017
CN 107307729 A 11/2017
CN 107307730 A 11/2017
CN 107334388 A 11/2017
CN 107361637 A 11/2017
CN 107397431 A 11/2017
CN 206603656 U 11/2017
CN 107411540 A 12/2017

(56) References Cited

FOREIGN PATENT DOCUMENTS

| | | | |
|---|---|---|---|
| CN | 107440490 | A | 12/2017 |
| CN | 107468052 | A | 12/2017 |
| CN | 107495849 | A | 12/2017 |
| CN | 107495856 | A | 12/2017 |
| CN | 107510356 | A | 12/2017 |
| CN | 107510379 | A | 12/2017 |
| CN | 206687606 | U | 12/2017 |
| CN | 206687631 | U | 12/2017 |
| CN | 206700038 | U | 12/2017 |
| CN | 206777230 | U | 12/2017 |
| CN | 206807803 | U | 12/2017 |
| CN | 206807804 | U | 12/2017 |
| CN | 106213986 | B | 1/2018 |
| CN | 107550250 | A | 1/2018 |
| CN | 107550258 | A | 1/2018 |
| CN | 107595153 | A | 1/2018 |
| CN | 107616686 | A | 1/2018 |
| CN | 206867128 | U | 1/2018 |
| CN | 107647763 | A | 2/2018 |
| CN | 107647769 | A | 2/2018 |
| CN | 107647771 | A | 2/2018 |
| CN | 107647772 | A | 2/2018 |
| CN | 107647777 | A | 2/2018 |
| CN | 107660996 | A | 2/2018 |
| CN | 107660997 | A | 2/2018 |
| CN | 107684336 | A | 2/2018 |
| CN | 107684337 | A | 2/2018 |
| CN | 107684338 | A | 2/2018 |
| CN | 107684339 | A | 2/2018 |
| CN | 107684340 | A | 2/2018 |
| CN | 107684341 | A | 2/2018 |
| CN | 107684342 | A | 2/2018 |
| CN | 107684357 | A | 2/2018 |
| CN | 107692806 | A | 2/2018 |
| CN | 107702838 | A | 2/2018 |
| CN | 107713732 | A | 2/2018 |
| CN | 107713733 | A | 2/2018 |
| CN | 107713734 | A | 2/2018 |
| CN | 107726388 | A | 2/2018 |
| CN | 106419522 | B | 3/2018 |
| CN | 107752726 | A | 3/2018 |
| CN | 107752748 | A | 3/2018 |
| CN | 107752751 | A | 3/2018 |
| CN | 107752788 | A | 3/2018 |
| CN | 107773021 | A | 3/2018 |
| CN | 107773026 | A | 3/2018 |
| CN | 107773029 | A | 3/2018 |
| CN | 107773090 | A | 3/2018 |
| CN | 107788820 | A | 3/2018 |
| CN | 107788827 | A | 3/2018 |
| CN | 107811499 | A | 3/2018 |
| CN | 107811517 | A | 3/2018 |
| CN | 107811518 | A | 3/2018 |
| CN | 107822492 | A | 3/2018 |
| CN | 107822494 | A | 3/2018 |
| CN | 107822496 | A | 3/2018 |
| CN | 107822524 | A | 3/2018 |
| CN | 107836981 | A | 3/2018 |
| CN | 107836986 | A | 3/2018 |
| CN | 107836988 | A | 3/2018 |
| CN | 207084680 | U | 3/2018 |
| CN | 207101150 | U | 3/2018 |
| CN | 107874584 | A | 4/2018 |
| CN | 107874599 | A | 4/2018 |
| CN | 107874601 | A | 4/2018 |
| CN | 107874602 | A | 4/2018 |
| CN | 107898351 | A | 4/2018 |
| CN | 107928388 | A | 4/2018 |
| CN | 107928395 | A | 4/2018 |
| CN | 107951369 | A | 4/2018 |
| CN | 107951376 | A | 4/2018 |
| CN | 107951407 | A | 4/2018 |
| CN | 207202762 | U | 4/2018 |
| CN | 207253261 | U | 4/2018 |
| CN | 107969907 | A | 5/2018 |
| CN | 107969908 | A | 5/2018 |
| CN | 107981713 | A | 5/2018 |
| CN | 107997571 | A | 5/2018 |
| CN | 108013742 | A | 5/2018 |
| CN | 108013743 | A | 5/2018 |
| CN | 108030404 | A | 5/2018 |
| CN | 108041976 | A | 5/2018 |
| CN | 108056670 | A | 5/2018 |
| CN | 207355971 | U | 5/2018 |
| CN | 108095570 | A | 6/2018 |
| CN | 108113501 | A | 6/2018 |
| CN | 108143256 | A | 6/2018 |
| CN | 108143259 | A | 6/2018 |
| CN | 108143260 | A | 6/2018 |
| CN | 108143261 | A | 6/2018 |
| CN | 108143262 | A | 6/2018 |
| CN | 108143263 | A | 6/2018 |
| CN | 108143264 | A | 6/2018 |
| CN | 108158418 | A | 6/2018 |
| CN | 108158429 | A | 6/2018 |
| CN | 108209547 | A | 6/2018 |
| CN | 108220304 | A | 6/2018 |
| CN | 207429001 | U | 6/2018 |
| CN | 207492655 | U | 6/2018 |
| CN | 207506440 | U | 6/2018 |
| CN | 104207651 | B | 7/2018 |
| CN | 108244994 | A | 7/2018 |
| CN | 108244995 | A | 7/2018 |
| CN | 108244997 | A | 7/2018 |
| CN | 108244998 | A | 7/2018 |
| CN | 108244999 | A | 7/2018 |
| CN | 108245000 | A | 7/2018 |
| CN | 108245032 | A | 7/2018 |
| CN | 108261055 | A | 7/2018 |
| CN | 108261056 | A | 7/2018 |
| CN | 108261061 | A | 7/2018 |
| CN | 108272336 | A | 7/2018 |
| CN | 108272338 | A | 7/2018 |
| CN | 108273336 | A | 7/2018 |
| CN | 108294616 | A | 7/2018 |
| CN | 108294640 | A | 7/2018 |
| CN | 108309035 | A | 7/2018 |
| CN | 108324096 | A | 7/2018 |
| CN | 207575048 | U | 7/2018 |
| CN | 207604862 | U | 7/2018 |
| CN | 207627123 | U | 7/2018 |
| CN | 207627136 | U | 7/2018 |
| CN | 207640235 | U | 7/2018 |
| CN | 106388570 | B | 8/2018 |
| CN | 106419517 | B | 8/2018 |
| CN | 108354444 | A | 8/2018 |
| CN | 108354466 | A | 8/2018 |
| CN | 108378678 | A | 8/2018 |
| CN | 108378690 | A | 8/2018 |
| CN | 108402888 | A | 8/2018 |
| CN | 108402889 | A | 8/2018 |
| CN | 108402891 | A | 8/2018 |
| CN | 108402920 | A | 8/2018 |
| CN | 108420304 | A | 8/2018 |
| CN | 108433517 | A | 8/2018 |
| CN | 108433529 | A | 8/2018 |
| CN | 108451351 | A | 8/2018 |
| CN | 108451388 | A | 8/2018 |
| CN | 108464732 | A | 8/2018 |
| CN | 207745052 | U | 8/2018 |
| CN | 207754989 | U | 8/2018 |
| CN | 207755036 | U | 8/2018 |
| CN | 106539491 | B | 9/2018 |
| CN | 107019415 | B | 9/2018 |
| CN | 107019416 | B | 9/2018 |
| CN | 108477987 | A | 9/2018 |
| CN | 108497908 | A | 9/2018 |
| CN | 108497914 | A | 9/2018 |
| CN | 108497918 | A | 9/2018 |
| CN | 108497942 | A | 9/2018 |
| CN | 108523647 | A | 9/2018 |
| CN | 108523649 | A | 9/2018 |
| CN | 108542272 | A | 9/2018 |
| CN | 108552969 | A | 9/2018 |

(56) References Cited

FOREIGN PATENT DOCUMENTS

| | | | |
|---|---|---|---|
| CN | 108552989 | A | 9/2018 |
| CN | 108567309 | A | 9/2018 |
| CN | 108567321 | A | 9/2018 |
| CN | 108567322 | A | 9/2018 |
| CN | 108577514 | A | 9/2018 |
| CN | 108577580 | A | 9/2018 |
| CN | 207804077 | U | 9/2018 |
| CN | 207804095 | U | 9/2018 |
| CN | 207855533 | U | 9/2018 |
| CN | 207855579 | U | 9/2018 |
| CN | 105167591 | B | 10/2018 |
| CN | 106264094 | B | 10/2018 |
| CN | 108606627 | A | 10/2018 |
| CN | 108618592 | A | 10/2018 |
| CN | 108618593 | A | 10/2018 |
| CN | 108618594 | A | 10/2018 |
| CN | 108618595 | A | 10/2018 |
| CN | 108618597 | A | 10/2018 |
| CN | 108618651 | A | 10/2018 |
| CN | 108634771 | A | 10/2018 |
| CN | 108634777 | A | 10/2018 |
| CN | 108634807 | A | 10/2018 |
| CN | 108652431 | A | 10/2018 |
| CN | 108652432 | A | 10/2018 |
| CN | 108653431 | A | 10/2018 |
| CN | 108670021 | A | 10/2018 |
| CN | 108670023 | A | 10/2018 |
| CN | 108670048 | A | 10/2018 |
| CN | 108703644 | A | 10/2018 |
| CN | 108703645 | A | 10/2018 |
| CN | 108703675 | A | 10/2018 |
| CN | 207940738 | U | 10/2018 |
| CN | 207940739 | U | 10/2018 |
| CN | 207940743 | U | 10/2018 |
| CN | 207940754 | U | 10/2018 |
| CN | 106580073 | B | 11/2018 |
| CN | 108720548 | A | 11/2018 |
| CN | 108720577 | A | 11/2018 |
| CN | 108720581 | A | 11/2018 |
| CN | 108720584 | A | 11/2018 |
| CN | 108720585 | A | 11/2018 |
| CN | 108720586 | A | 11/2018 |
| CN | 108720633 | A | 11/2018 |
| CN | 108720650 | A | 11/2018 |
| CN | 108732958 | A | 11/2018 |
| CN | 108771466 | A | 11/2018 |
| CN | 108771488 | A | 11/2018 |
| CN | 108771489 | A | 11/2018 |
| CN | 108784323 | A | 11/2018 |
| CN | 108784324 | A | 11/2018 |
| CN | 108784330 | A | 11/2018 |
| CN | 108784401 | A | 11/2018 |
| CN | 108814274 | A | 11/2018 |
| CN | 108836104 | A | 11/2018 |
| CN | 108836105 | A | 11/2018 |
| CN | 108836107 | A | 11/2018 |
| CN | 108836108 | A | 11/2018 |
| CN | 108836131 | A | 11/2018 |
| CN | 108851966 | A | 11/2018 |
| CN | 108851969 | A | 11/2018 |
| CN | 108888087 | A | 11/2018 |
| CN | 108888089 | A | 11/2018 |
| CN | 108888099 | A | 11/2018 |
| CN | 108903620 | A | 11/2018 |
| CN | 108903621 | A | 11/2018 |
| CN | 208031026 | U | 11/2018 |
| CN | 208031027 | U | 11/2018 |
| CN | 208031028 | U | 11/2018 |
| CN | 208081098 | U | 11/2018 |
| CN | 208081104 | U | 11/2018 |
| CN | 208081108 | U | 11/2018 |
| CN | 106419520 | B | 12/2018 |
| CN | 106419526 | B | 12/2018 |
| CN | 108926239 | A | 12/2018 |
| CN | 108926249 | A | 12/2018 |
| CN | 108937520 | A | 12/2018 |
| CN | 108937525 | A | 12/2018 |
| CN | 108937556 | A | 12/2018 |
| CN | 108937558 | A | 12/2018 |
| CN | 108937559 | A | 12/2018 |
| CN | 108937560 | A | 12/2018 |
| CN | 108937629 | A | 12/2018 |
| CN | 108955959 | A | 12/2018 |
| CN | 108958659 | A | 12/2018 |
| CN | 108968659 | A | 12/2018 |
| CN | 108968660 | A | 12/2018 |
| CN | 108968662 | A | 12/2018 |
| CN | 108968663 | A | 12/2018 |
| CN | 108968667 | A | 12/2018 |
| CN | 108968668 | A | 12/2018 |
| CN | 108968669 | A | 12/2018 |
| CN | 108968682 | A | 12/2018 |
| CN | 108991918 | A | 12/2018 |
| CN | 108991919 | A | 12/2018 |
| CN | 109008595 | A | 12/2018 |
| CN | 109008598 | A | 12/2018 |
| CN | 109008663 | A | 12/2018 |
| CN | 109008669 | A | 12/2018 |
| CN | 109077624 | A | 12/2018 |
| CN | 208192913 | U | 12/2018 |
| CN | 208192914 | U | 12/2018 |
| CN | 208192915 | U | 12/2018 |
| CN | 208192916 | U | 12/2018 |
| CN | 208192917 | U | 12/2018 |
| CN | 208192920 | U | 12/2018 |
| CN | 208192921 | U | 12/2018 |
| CN | 208211922 | U | 12/2018 |
| CN | 208228802 | U | 12/2018 |
| CN | 208259529 | U | 12/2018 |
| CN | 106562666 | B | 1/2019 |
| CN | 106606293 | B | 1/2019 |
| CN | 106724784 | B | 1/2019 |
| CN | 106820956 | B | 1/2019 |
| CN | 106820957 | B | 1/2019 |
| CN | 107019417 | B | 1/2019 |
| CN | 109106231 | A | 1/2019 |
| CN | 109247837 | A | 1/2019 |
| CN | 109276159 | A | 1/2019 |
| CN | 208300842 | U | 1/2019 |
| CN | 208319025 | U | 1/2019 |
| CN | 208319027 | U | 1/2019 |
| CN | 208371607 | U | 1/2019 |
| CN | 208435215 | U | 1/2019 |
| CN | 109363520 | A | 2/2019 |
| CN | 208463763 | U | 2/2019 |
| CN | 208510802 | U | 2/2019 |
| CN | 106388566 | B | 3/2019 |
| CN | 107174116 | B | 3/2019 |
| CN | 107174117 | B | 3/2019 |
| CN | 109393957 | A | 3/2019 |
| CN | 109394005 | A | 3/2019 |
| CN | 208551168 | U | 3/2019 |
| CN | 208551408 | U | 3/2019 |
| CN | 208610644 | U | 3/2019 |
| CN | 208610659 | U | 3/2019 |
| CN | 208625445 | U | 3/2019 |
| CN | 109567612 | A | 4/2019 |
| CN | 109567619 | A | 4/2019 |
| CN | 109589011 | A | 4/2019 |
| CN | 109602265 | A | 4/2019 |
| CN | 109605463 | A | 4/2019 |
| CN | 109662607 | A | 4/2019 |
| CN | 109674357 | A | 4/2019 |
| CN | 109681927 | A | 4/2019 |
| CN | 208709591 | U | 4/2019 |
| CN | 208740748 | U | 4/2019 |
| CN | 208755746 | U | 4/2019 |
| CN | 208755752 | U | 4/2019 |
| CN | 208755753 | U | 4/2019 |
| CN | 208755759 | U | 4/2019 |
| CN | 208784365 | U | 4/2019 |
| CN | 109744849 | A | 5/2019 |
| CN | 109793430 | A | 5/2019 |
| CN | 208837695 | U | 5/2019 |

(56) References Cited

FOREIGN PATENT DOCUMENTS

| | | | | | |
|---|---|---|---|---|---|
| CN | 208851291 | U | | 5/2019 | |
| CN | 208864113 | U | | 5/2019 | |
| CN | 208909747 | U | | 5/2019 | |
| CN | 208909882 | U | | 5/2019 | |
| CN | 208909883 | U | | 5/2019 | |
| CN | 105996805 | B | | 6/2019 | |
| CN | 109870938 | A | | 6/2019 | |
| CN | 208941868 | U | | 6/2019 | |
| CN | 208973499 | U | | 6/2019 | |
| CN | 208973501 | U | | 6/2019 | |
| CN | 208973502 | U | | 6/2019 | |
| CN | 208973503 | U | | 6/2019 | |
| CN | 208973504 | U | | 6/2019 | |
| CN | 208973507 | U | | 6/2019 | |
| CN | 208988575 | U | | 6/2019 | |
| CN | 209003634 | U | | 6/2019 | |
| CN | 106108697 | B | | 7/2019 | |
| CN | 110049699 | A | | 7/2019 | |
| CN | 209058897 | U | | 7/2019 | |
| CN | 209090836 | U | | 7/2019 | |
| CN | 209090929 | U | | 7/2019 | |
| CN | 209090938 | U | | 7/2019 | |
| CN | 209090939 | U | | 7/2019 | |
| CN | 209090943 | U | | 7/2019 | |
| CN | 209090950 | U | | 7/2019 | |
| CN | 209090955 | U | | 7/2019 | |
| CN | 209090956 | U | | 7/2019 | |
| CN | 209090957 | U | | 7/2019 | |
| CN | 106419618 | B | | 8/2019 | |
| CN | 209202775 | U | | 8/2019 | |
| CN | 209220022 | U | | 8/2019 | |
| CN | 209269447 | U | | 8/2019 | |
| CN | 209285276 | U | | 8/2019 | |
| CN | 209300780 | U | | 8/2019 | |
| CN | 209315656 | U | | 8/2019 | |
| CN | 209315657 | U | | 8/2019 | |
| CN | 209360444 | U | | 9/2019 | |
| CN | 209360464 | U | | 9/2019 | |
| CN | 209436923 | U | | 9/2019 | |
| CN | 209436924 | U | | 9/2019 | |
| CN | 209436925 | U | | 9/2019 | |
| CN | 209436942 | U | | 9/2019 | |
| CN | 209437002 | U | | 9/2019 | |
| CN | 209450331 | U | | 10/2019 | |
| CN | 209518767 | U | | 10/2019 | |
| CN | 209528876 | U | | 10/2019 | |
| CN | 209547775 | U | | 10/2019 | |
| CN | 209564018 | U | | 11/2019 | |
| CN | 209610822 | U | | 11/2019 | |
| CN | 209610824 | U | | 11/2019 | |
| CN | 209610827 | U | | 11/2019 | |
| CN | 209629508 | U | | 11/2019 | |
| CN | 209644658 | U | | 11/2019 | |
| CN | 209733609 | U | | 12/2019 | |
| CN | 209750794 | U | | 12/2019 | |
| CN | 209826266 | U | | 12/2019 | |
| CN | 209826275 | U | | 12/2019 | |
| CN | 209863297 | U | | 12/2019 | |
| CN | 110680203 | A | | 1/2020 | |
| CN | 107065634 | B | | 2/2020 | |
| CN | 110876559 | A | | 3/2020 | |
| CN | 210185391 | U | | 3/2020 | |
| CN | 111374527 | A | | 7/2020 | |
| CN | 111381503 | A | | 7/2020 | |
| CN | 210961472 | U | | 7/2020 | |
| DE | 2705168 | A1 | | 8/1978 | |
| DE | 2753827 | A1 | | 6/1979 | |
| DE | 102011002821 | A1 | | 7/2012 | |
| DE | 202017102536 | U1 | | 8/2018 | |
| EP | 0269629 | A1 | | 6/1988 | |
| EP | 0926293 | A1 | | 6/1999 | |
| EP | 1767860 | A1 | | 3/2007 | |
| EP | 2003400 | A2 | | 12/2008 | |
| EP | 2020574 | A2 | | 2/2009 | |
| EP | 2904953 | A1 | | 8/2015 | |
| EP | 2910856 | A1 | | 8/2015 | |
| EP | 2976977 | A1 | | 1/2016 | |
| EP | 3165134 | A1 | | 5/2017 | |
| EP | 3491980 | A1 | | 6/2019 | |
| FR | 2409736 | A1 | | 6/1979 | |
| GB | 0320607 | | | 10/2003 | |
| GB | 2398628 | A | | 8/2004 | |
| GB | 2479384 | A | | 10/2011 | |
| JP | S5827524 | A | | 2/1983 | |
| JP | H09164074 | A | | 6/1997 | |
| JP | H1028643 | A | | 2/1998 | |
| JP | 2001190405 | A | | 7/2001 | |
| JP | 2005147604 | A | | 6/2005 | |
| JP | 2007007027 | A | | 1/2007 | |
| JP | 2008018122 | A | | 1/2008 | |
| JP | 2009291417 | A | | 12/2009 | |
| JP | 2011010786 | A | | 1/2011 | |
| JP | 2013106850 | A | | 6/2013 | |
| JP | 3186023 | U | | 8/2013 | |
| JP | 3186474 | U | * | 10/2013 | |
| JP | 2014200627 | A | | 10/2014 | |
| JP | 2014204770 | A | | 10/2014 | |
| JP | 2015145778 | A | | 8/2015 | |
| KR | 101253705 | B1 | * | 4/2013 | .......... A47J 37/0641 |
| WO | 8911773 | A1 | | 11/1989 | |
| WO | 9837796 | A1 | | 9/1998 | |
| WO | 9930086 | A1 | | 6/1999 | |
| WO | 9952328 | A1 | | 10/1999 | |
| WO | 44096 | A2 | | 7/2000 | |
| WO | 49839 | A1 | | 8/2000 | |
| WO | 2006122643 | A1 | | 11/2006 | |
| WO | 2006132612 | A1 | | 12/2006 | |
| WO | 2009043812 | A1 | | 4/2009 | |
| WO | 2012051508 | A2 | | 4/2012 | |
| WO | 2015006891 | A1 | | 1/2015 | |
| WO | 2015028940 | A1 | | 3/2015 | |
| WO | 2015081549 | A1 | | 6/2015 | |
| WO | 2016007002 | A1 | | 1/2016 | |
| WO | 2016012908 | A1 | | 1/2016 | |
| WO | 2016028549 | A1 | | 2/2016 | |
| WO | 2016091063 | A1 | | 6/2016 | |
| WO | 2016141009 | A1 | | 9/2016 | |
| WO | 2016148492 | A1 | | 9/2016 | |
| WO | 2016154114 | A1 | | 9/2016 | |
| WO | 2016165198 | A1 | | 10/2016 | |
| WO | 2016171385 | A1 | | 10/2016 | |
| WO | 2016182975 | A1 | | 11/2016 | |
| WO | 2016189440 | A1 | | 12/2016 | |
| WO | 2016193008 | A1 | | 12/2016 | |
| WO | 2016193643 | A1 | | 12/2016 | |
| WO | 2016199086 | A1 | | 12/2016 | |
| WO | 2017005533 | A1 | | 1/2017 | |
| WO | 2017039091 | A1 | | 3/2017 | |
| WO | 2017045387 | A1 | | 3/2017 | |
| WO | 2017049635 | A1 | | 3/2017 | |
| WO | 2017049717 | A1 | | 3/2017 | |
| WO | 2017050693 | A2 | | 3/2017 | |
| WO | 2017063872 | A1 | | 4/2017 | |
| WO | 2017072068 | A1 | | 5/2017 | |
| WO | 2017074119 | A1 | | 5/2017 | |
| WO | 2017076797 | A1 | | 5/2017 | |
| WO | 2017081420 | A1 | | 5/2017 | |
| WO | 2017085026 | A1 | | 5/2017 | |
| WO | 2017085671 | A1 | | 5/2017 | |
| WO | 2017085673 | A1 | | 5/2017 | |
| WO | 2017086543 | A1 | | 5/2017 | |
| WO | 2017092062 | A1 | | 6/2017 | |
| WO | 2017092063 | A1 | | 6/2017 | |
| WO | 2017094968 | A1 | | 6/2017 | |
| WO | 2017097790 | A1 | | 6/2017 | |
| WO | 2017104892 | A1 | | 6/2017 | |
| WO | 2017104893 | A1 | | 6/2017 | |
| WO | 2017104894 | A1 | | 6/2017 | |
| WO | 2017104895 | A1 | | 6/2017 | |
| WO | 2017104896 | A1 | | 6/2017 | |
| WO | 2017104898 | A1 | | 6/2017 | |
| WO | 2017104900 | A1 | | 6/2017 | |
| WO | 2017105076 | A2 | | 6/2017 | |
| WO | 2017111425 | A1 | | 6/2017 | |

(56) References Cited

FOREIGN PATENT DOCUMENTS

| | | | |
|---|---|---|---|
| WO | 2017121691 | A1 | 7/2017 |
| WO | 2017127655 | A1 | 7/2017 |
| WO | 2017144795 | A1 | 8/2017 |
| WO | 2017149519 | A1 | 9/2017 |
| WO | 2017152518 | A1 | 9/2017 |
| WO | 2017153360 | A1 | 9/2017 |
| WO | 2017158068 | A1 | 9/2017 |
| WO | 2017166317 | A1 | 10/2017 |
| WO | 2017177007 | A1 | 10/2017 |
| WO | 2017177423 | A1 | 10/2017 |
| WO | 2017178229 | A1 | 10/2017 |
| WO | 2017178650 | A1 | 10/2017 |
| WO | 2017178739 | A1 | 10/2017 |
| WO | 2017179804 | A1 | 10/2017 |
| WO | 2017191377 | A1 | 11/2017 |
| WO | 2017191395 | A1 | 11/2017 |
| WO | 2017195777 | A1 | 11/2017 |
| WO | 2017197482 | A1 | 11/2017 |
| WO | 2017197842 | A1 | 11/2017 |
| WO | 2017198815 | A1 | 11/2017 |
| WO | 2017198848 | A1 | 11/2017 |
| WO | 2017201530 | A1 | 11/2017 |
| WO | 2017202641 | A1 | 11/2017 |
| WO | 2017209465 | A1 | 12/2017 |
| WO | 2017211045 | A1 | 12/2017 |
| WO | 2017213330 | A2 | 12/2017 |
| WO | 2017213423 | A1 | 12/2017 |
| WO | 2017215926 | A1 | 12/2017 |
| WO | 2017215988 | A1 | 12/2017 |
| WO | 2018004226 | A1 | 1/2018 |
| WO | 2018007218 | A1 | 1/2018 |
| WO | 2018014806 | A1 | 1/2018 |
| WO | 2018015695 | A1 | 1/2018 |
| WO | 2017077571 | A1 | 2/2018 |
| WO | 2018018670 | A1 | 2/2018 |
| WO | 2018023863 | A1 | 2/2018 |
| WO | 2018024781 | A1 | 2/2018 |
| WO | 2018024782 | A1 | 2/2018 |
| WO | 2018024783 | A1 | 2/2018 |
| WO | 2018026041 | A1 | 2/2018 |
| WO | 2018026906 | A1 | 2/2018 |
| WO | 2018026928 | A1 | 2/2018 |
| WO | 2018032540 | A1 | 2/2018 |
| WO | 2018032541 | A1 | 2/2018 |
| WO | 2018032542 | A1 | 2/2018 |
| WO | 2018032589 | A1 | 2/2018 |
| WO | 2018032648 | A1 | 2/2018 |
| WO | 2018037177 | A1 | 3/2018 |
| WO | 2018040250 | A1 | 3/2018 |
| WO | 2018041536 | A1 | 3/2018 |
| WO | 2018045643 | A1 | 3/2018 |
| WO | 2018050520 | A1 | 3/2018 |
| WO | 2018050838 | A1 | 3/2018 |
| WO | 2018058384 | A1 | 4/2018 |
| WO | 2018058569 | A1 | 4/2018 |
| WO | 2018058740 | A1 | 4/2018 |
| WO | 2018059994 | A1 | 4/2018 |
| WO | 2018060260 | A1 | 4/2018 |
| WO | 2018060273 | A1 | 4/2018 |
| WO | 2018060331 | A1 | 4/2018 |
| WO | 2018065424 | A1 | 4/2018 |
| WO | 2018068376 | A1 | 4/2018 |
| WO | 2018068425 | A1 | 4/2018 |
| WO | 2018068976 | A1 | 4/2018 |
| WO | 2018076164 | A1 | 5/2018 |
| WO | 2018076166 | A1 | 5/2018 |
| WO | 2018076415 | A1 | 5/2018 |
| WO | 2018082131 | A1 | 5/2018 |
| WO | 2018090287 | A1 | 5/2018 |
| WO | 2018093004 | A1 | 5/2018 |
| WO | 2018095247 | A1 | 5/2018 |
| WO | 2018095420 | A1 | 5/2018 |
| WO | 2018095949 | A1 | 5/2018 |
| WO | 2018099233 | A1 | 6/2018 |
| WO | 2018102128 | A1 | 6/2018 |
| WO | 2018104351 | A1 | 6/2018 |
| WO | 2018107522 | A1 | 6/2018 |
| WO | 2018107973 | A1 | 6/2018 |
| WO | 2018116056 | A1 | 6/2018 |
| WO | 2018116057 | A1 | 6/2018 |
| WO | 2018120561 | A1 | 7/2018 |
| WO | 2018121166 | A1 | 7/2018 |
| WO | 2018121199 | A1 | 7/2018 |
| WO | 2018122652 | A1 | 7/2018 |
| WO | 2018133993 | A1 | 7/2018 |
| WO | 2018137832 | A1 | 8/2018 |
| WO | 2018140954 | A1 | 8/2018 |
| WO | 2018147640 | A1 | 8/2018 |
| WO | 2018165698 | A1 | 9/2018 |
| WO | 2018191960 | A1 | 10/2018 |
| WO | 2018197720 | A1 | 11/2018 |
| WO | 2018207221 | A1 | 11/2018 |
| WO | 2018212473 | A1 | 11/2018 |
| WO | 2018220659 | A1 | 12/2018 |
| WO | 2018223713 | A1 | 12/2018 |
| WO | 2019032876 | A1 | 2/2019 |
| WO | 2019032878 | A1 | 2/2019 |
| WO | 2019064319 | A1 | 4/2019 |
| WO | 2019066747 | A2 | 4/2019 |
| WO | 2019082210 | A1 | 5/2019 |
| WO | 2019097545 | A1 | 5/2019 |
| WO | 2019104818 | A1 | 6/2019 |
| WO | 2019110340 | A1 | 6/2019 |
| WO | 2019129598 | A1 | 7/2019 |
| WO | 2019130011 | A1 | 7/2019 |
| WO | 2019132150 | A1 | 7/2019 |
| WO | 2019136785 | A1 | 7/2019 |
| WO | 2019141207 | A1 | 7/2019 |
| WO | 2019153512 | A1 | 8/2019 |
| WO | 2019153807 | A1 | 8/2019 |
| WO | 2019183755 | A1 | 10/2019 |
| WO | 2019185321 | A1 | 10/2019 |
| WO | 2019207325 | A1 | 10/2019 |
| WO | 2019219018 | A1 | 11/2019 |
| WO | 2019227766 | A1 | 12/2019 |
| WO | 2019238605 | A1 | 12/2019 |
| WO | 2019238794 | A1 | 12/2019 |
| WO | 2019243093 | A1 | 12/2019 |
| WO | 2019243922 | A1 | 12/2019 |
| WO | 2020000046 | A1 | 1/2020 |
| WO | 2020002064 | A1 | 1/2020 |
| WO | 2020010513 | A1 | 1/2020 |
| WO | 2020016084 | A1 | 1/2020 |
| WO | 2020016085 | A1 | 1/2020 |
| WO | 2020029519 | A1 | 2/2020 |
| WO | 2020029520 | A1 | 2/2020 |
| WO | 2020030462 | A1 | 2/2020 |
| WO | 2020052010 | A1 | 3/2020 |
| WO | 2020062651 | A1 | 4/2020 |
| WO | 2020070198 | A1 | 4/2020 |
| WO | 2020071590 | A1 | 4/2020 |
| WO | 2020074178 | A1 | 4/2020 |
| WO | 2020074476 | A1 | 4/2020 |
| WO | 2020078010 | A1 | 4/2020 |
| WO | 2020078403 | A1 | 4/2020 |
| WO | 2020078836 | A1 | 4/2020 |
| WO | 2020080738 | A1 | 4/2020 |
| WO | 2020082329 | A1 | 4/2020 |
| WO | 2020082854 | A1 | 4/2020 |
| WO | 2020091531 | A1 | 5/2020 |
| WO | 2020093417 | A1 | 5/2020 |
| WO | 2020094293 | A1 | 5/2020 |
| WO | 2020098748 | A1 | 5/2020 |
| WO | 2020098749 | A1 | 5/2020 |
| WO | 2020099339 | A1 | 5/2020 |
| WO | 2020099355 | A1 | 5/2020 |
| WO | 2020108375 | A1 | 6/2020 |
| WO | 2020108917 | A1 | 6/2020 |
| WO | 2020127334 | A1 | 6/2020 |
| WO | 2020134318 | A1 | 7/2020 |
| WO | 2020148164 | A1 | 7/2020 |
| WO | 2020148187 | A1 | 7/2020 |
| WO | 2020163711 | A1 | 8/2020 |

(56) References Cited

FOREIGN PATENT DOCUMENTS

OTHER PUBLICATIONS

U.S. Appl. No. 16/402,029, filed May 2, 2019, Cooking Device and Components Thereof.
U.S. Appl. No. 16/402,035, filed May 2, 2019, Cooking Device and Components Thereof.
U.S. Appl. No. 16/559,174, filed Sep. 3, 2019, Cooking Device and Components Thereof.
U.S. Appl. No. 16/678,628, filed Nov. 8, 2019, Cooking Device and Components Thereof.
U.S. Appl. No. 16/925,866, filed Jul. 10, 2020, Cooking Device and Components Thereof.
U.S. Appl. No. 17/324,716, filed May 19, 2021, Cooking Device and Components Thereof.
U.S. Appl. No. 17/331,175, filed May 26, 2021, Cooking Device and Components Thereof.
Civil Action No. 19-cv-24114, U.S. District Court, Southern District of Florida; Complaint; Plaintiff *SharkNinja Operating LLC* for Complaint for Patent Infringement and Demand for Jury Trial against Defendants *Tristar Products, Inc. and Emeril Lagasse*, (Entered: Oct. 4, 2019), pp. 1-194.
Civil Action No. 19-cv-24114, U.S. District Court, Southern District of Florida; Defendant Emeril Lagasse's Motion to Dismiss for Improper Venue; *SharkNinja Operating LLC* (Plaintiff) v. *Tristar, Products, Inc. and Emeril Lagasse* (Defendants); Document 24 (Entered: Nov. 29, 2019), pp. 1-6.
Civil Action No. 19-cv-24114, U.S. District Court, Southern District of Florida; Defendant Tristar Products Inc.'S Answer to Plaintiff's Complaint and Counterclaims; *SharkNinja Operating LLC* (Plaintiff) v *Emeril Lagasse* (Defendant) and *Tristar Products, Inc.* (Defendant/Counterclaim Plaintiff) v *SharkNinja Operating LLC, Daniel R. Gibson, Cantor Colburn LLP, Pedro Lopez-Baldrich* (Counterclaim Defendants); Document 25 (Entered: Nov. 29, 2019), pp. 1-36.
De'Longhi, "FH1163 FH1363 MultiFry", [online]; [retrieved on Mar. 18, 2019]; retrieved from the Internet https://www.delonghi.com/en-us/products/kitchen/kitchen-appliances/low-oil-fryer-and-multicooker/multifry-fh11631bk-0125392006?TabSegment=support#supportDeLonghi; DeLonghi Instruction Manual, www.delonghi.com, 5712511041/05.15, pp. 1-11.
Hip Cooking, "Pressure Cooker PSI FAQ: The Stuff You Didn't Think to Ask about Pressure," [online]; [retrieved on Nov. 25, 2019]; retrieved from the Internethttps://www.hippressurecooking.com/pressure-cooker-psi-faq-the-stuff-you-didnt-think-to-ask/ Laura Pazzaglia, Apr. 7, 2013, pp. 1-26.

* cited by examiner

COOKING DEVICE AND COMPONENTS THEREOF

CROSS-REFERENCE TO RELATED APPLICATIONS

This application is a continuation of and claims priority under 35 U.S.C. § 120 to U.S. patent application Ser. No. 16/402,023, filed on May 2, 2019 which claims the benefit of U.S. Provisional Application Ser. No. 62/810,249, filed Feb. 25, 2019, which is incorporated herein by reference in its entirety.

BACKGROUND

Embodiments of the present disclosure relate generally to a cooking system, and more specifically, to a countertop air grilling system operable in a plurality of distinct cooking modes.

SUMMARY

According to an embodiment, a cooking system includes a housing having a hollow interior including a cooking zone for receiving food to be cooked, a heating element associated with said housing, and a grill plate having a support surface for supporting food within said hollow interior. The grill plate has a thermal mass sufficient to maintain a temperature required to achieve a Maillard reaction of said food At least a portion of said cooking zone is disposed between said support surface and said heating element. Said heating element is operable to heat said support body to impart contact cooking from said support surface to food supported thereby in said cooking zone.

In addition to one or more of the features described above, or as an alternative, in further embodiments a bottom of said cooking zone is defined by said support surface.

In addition to one or more of the features described above, or as an alternative, in further embodiments said support surface in integral with said support body.

In addition to one or more of the features described above, or as an alternative, in further embodiments said support surface is located separately from said support body.

In addition to one or more of the features described above, or as an alternative, in further embodiments a top of said cooking zone is defined by said heating element.

In addition to one or more of the features described above, or as an alternative, in further embodiments comprising a guard positioned between said heating element and said cooking container, said top of said cooking zone being defined by said guard.

In addition to one or more of the features described above, or as an alternative, in further embodiments a side of said cooking zone is defined by said housing.

In addition to one or more of the features described above, or as an alternative, in further embodiments comprising an accessory mounted within said cooking container in contact with said support body, wherein a side of said cooking volume is defined by said accessory.

In addition to one or more of the features described above, or as an alternative, in further embodiments said heating element is operable to heat said support body via radiation.

In addition to one or more of the features described above, or as an alternative, in further embodiments said heating element is operable to heat said support body via convection.

In addition to one or more of the features described above, or as an alternative, in further embodiments comprising an air movement device operable to circulate an air flow through said hollow interior to impart non-contact cooking to said food.

In addition to one or more of the features described above, or as an alternative, in further embodiments said non-contact cooking and said contact cooking occur simultaneously.

In addition to one or more of the features described above, or as an alternative, in further embodiments comprising a lid movable relative to said housing, wherein said lid and said housing cooperate to define a cooking volume of the cooking system, said food being receivable within said cooking volume.

In addition to one or more of the features described above, or as an alternative, in further embodiments said heating element is positioned within said lid adjacent an upper extent of said housing.

In addition to one or more of the features described above, or as an alternative, in further embodiments including a food container receivable in said hollow interior, wherein said support body is positioned within an interior of said food container.

In addition to one or more of the features described above, or as an alternative, in further embodiments said heating element is positioned adjacent an upper extent of said housing.

In addition to one or more of the features described above, or as an alternative, in further embodiments said support body includes a grill plate.

In addition to one or more of the features described above, or as an alternative, in further embodiments said support body has a thermal mass between about 200 g and about 3 kg.

In addition to one or more of the features described above, or as an alternative, in further embodiments said support surface includes a diffusing structure.

In addition to one or more of the features described above, or as an alternative, in further embodiments said contact cooking includes conductive cooking.

In addition to one or more of the features described above, or as an alternative, in further embodiments said contact cooking includes inductive cooking.

In addition to one or more of the features described above, or as an alternative, in further embodiments comprising a second heating element operably coupled to said support body, said second heating element being operable independently of said heating element.

In addition to one or more of the features described above, or as an alternative, in further embodiments the cooking system is operable in a plurality of modes including a first cooking mode and a second cooking mode, wherein in said first cooking mode the cooking system is operable as an air grill and in said second cooking mode, the cooking system is operable as a convection cooker.

In addition to one or more of the features described above, or as an alternative, in further embodiments the support body includes a plurality of openings through which a fluid is configured to flow.

According to an embodiment, a method of cooking food using a cooking system includes heating a support surface of a support body arranged within a hollow interior of a housing of the cooking system using a heating element located remotely from said support body, positioning a food item in said hollow interior such that the food is supported by said support surface between at least a portion of said support surface and at least a portion of said heating element, and imparting contact cooking to the food via said support surface.

In addition to one or more of the features described above, or as an alternative, in further embodiments positioning a support body within said hollow interior of said housing.

In addition to one or more of the features described above, or as an alternative, in further embodiments positioning said support body within said hollow interior of said housing further comprises positioning said support body in contact with a cooking container arranged within said hollow interior.

In addition to one or more of the features described above, or as an alternative, in further embodiments imparting non-contact cooking to the food via said heating element.

In addition to one or more of the features described above, or as an alternative, in further embodiments imparting non-contact cooking to the food via said heating element and imparting contact cooking to the food via said support surface occur simultaneously.

In addition to one or more of the features described above, or as an alternative, in further embodiments heating said support body arranged within said hollow interior of said housing via a second heating element, said second heating element being independently operable from said heating element.

In addition to one or more of the features described above, or as an alternative, in further embodiments maintaining a temperature of said support surface above a minimum threshold for achieving a Maillard reaction with the food.

In addition to one or more of the features described above, or as an alternative, in further embodiments maintaining a temperature of said support surface below a maximum threshold where smoking of the food occurs.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 2:
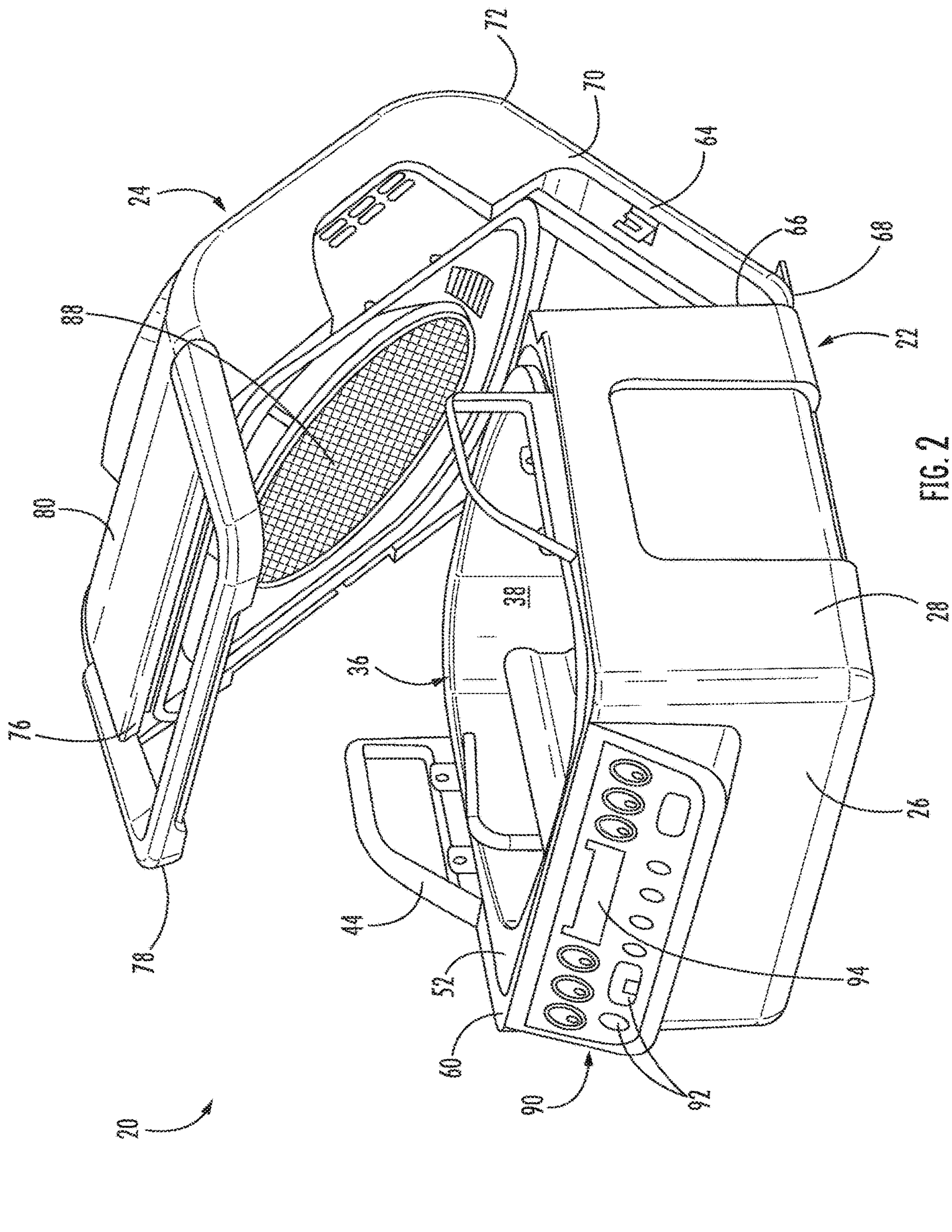
FIG. 2 is a front perspective view of the cooking system with the lid in an open position according to an embodiment.

With reference now to the FIGS., a cooking system is illustrated at numeral 20. As shown, the cooking system 20 includes a base 22 and a lid 24. The base 22 includes a housing 26 having an exterior, heat resistant or non-conductive surface 28 and an interior surface 30 that defines a hollow interior 32. The housing 26 may be made of any suitable material, such as glass, aluminum, plastic, or stainless steel for example. A liner 34 may be disposed within the hollow interior 32 of the housing 26. The liner 34 may be formed from any suitable conductive material, such as aluminum for example. In an embodiment, best shown in FIG. 2, the liner 34 forms the interior surface 30 of the housing 26 (see FIG. 4) and thereby defines the hollow interior 32 of the housing 26. Alternatively, the liner 34 may be offset form the interior surface 30 of the housing 26. However, it should be understood that other components of the cooking system 20, or surfaces thereof, may also define the hollow interior 32.

In an embodiment, a cooking container 36 is receivable inside the hollow interior defined by the liner 34. Although the cooking container 36 is described herein as being removable from the housing 26 of the base 22, embodiments where the cooking container 36 is integrally formed with the housing 26 are also contemplated herein. The cooking container 36, best shown in FIGS. 2 and 4-6, has an interior 38 designed to receive and retain food support structures for supporting one or more consumable products, such as food products for example, therein. Examples of food products suitable for use with the cooking system 20, include but are not limited to, meats, fish, poultry, bread, rice, grains, pasta, vegetables, fruits, and dairy products, among others. The cooking container 36 may be a pot formed from a ceramic, metal, or die cast aluminum material. In an embodiment, an interior surface 40 of the cooking container 36 includes a nano-ceramic coating and an exterior surface 42 of the cooking container 36 includes a silicone epoxy material. However, any suitable material capable of withstanding the high temperatures required for cooking food products is contemplated herein.

One or more handles 44 may be associated with the cooking container 36 to allow a user to easily grasp and manipulate the cooking container 36. In the illustrated, non-limiting embodiment, the cooking container 36 includes two handles 44 extending from opposing sidewalls 46 of the cooking container 36. The handles 44 may be movable or removably connected thereto, such as via one or more fasteners for example, or alternatively, may be integrally formed with a sidewall 46 of the cooking container 36. Although the cooking container 36 illustrated and described herein has two handles 44, embodiments having a single handle, more than two handles, or no handles are also contemplated herein. Further, any suitable configuration of the cooking container 36 and/or handles 44 is within the scope of the disclosure.

The cooking container 36 and/or the liner 34 may be configured to properly position the cooking container 36 within the liner 34. In an embodiment, best shown in FIG. 4 and FIG. 6, one or more bumpers 48 extend inwardly from the liner 34 to engage the exterior surface 42 of the cooking container 36. The bumpers 48 may be spaced equidistantly about the inner periphery of the liner 34 to center the cooking container 36. However, embodiments where the bumpers 48 are not equidistantly spaced, or embodiments having only a single bumper 48 are also contemplated herein.

Alternatively, or in addition, the cooking container 36 may be contoured to facilitate positioning of the cooking container 36 within the liner 34. In an embodiment, a cross-sectional area of the cooking container 36 varies over the height of the cooking container 36. For example, a step 50 may be formed in a central portion of the sidewall 46 of the cooking container 36. Accordingly, a first portion of the cooking container 36 extends between an upper surface 52 of the cooking container 36 and the step 50, and a second portion of the cooking container 36 extends between the step 50 and a bottom 54 of the cooking container 36. As a result of the horizontal offset created by the step 50, the diameter of the first portion of the cooking container 36 is larger than the diameter of the second portion of the cooking container 36. In an embodiment, the step 50 is located near, but offset from, the bottom 54 of the cooking container 36. Further, the step 50 may extend over the entire inner periphery of the cooking container 36, or alternatively, over only select portions thereof.

In an embodiment, the step 50 is sized and shaped to cooperate, for example overlap or mate with, another component of the cooking system 20 to position the cooking container 36 relative to the base 22. For example, a spacer 56 (best shown in FIG. 6) may be mounted within the hollow interior 32 defined by the liner 34, and the step 50 may directly engage the spacer 56 when the cooking container 36 is installed within the liner 34. Alternatively, a ledge 58 as shown in FIG. 7, complementary to the step 50, may be affixed to or integrally formed with the liner 34 such that when the cooking container 36 is inserted into the liner 34, the step 50 and ledge 58 align to seat the cooking container 36 in a desired manner.

One or more accessories or support bodies (to be described in more detail below), may be compatible for use with the cooking system 20. In such embodiments, the accessories or support bodies may be receivable within the hollow interior 32 of the liner 34, or alternatively, within the interior of the cooking container 36. In an embodiment, an accessory or support body compatible for use with the cooking container 36 is supported by the step 50 of the cooking container 36 rather than the bottom 54 thereof. However, other accessories or support bodies that may be supported by the bottom 54 of the cooking container 36 are also within the scope of the disclosure. Any accessory or support body as discussed herein may include a support surface for supporting food thereon. The support surface will generally be the upper surface of the support body, and will be exposed to the cooking zone (more on this below).

Referring with more detail to the lid 24, it should be noted that the lid 24 is connectable to a surface of the cooking container 36 and/or housing 26 to close off entry to the interior 38 of the cooking container 36. Accordingly, a cooking volume may be defined between the interior 38 of the cooking container 36 and heating element 82 or an end of the closed lid 24 operable to engage the base 22, or alternatively, between the hollow interior 32 defined by the liner 34 and the heating element 82 or the end of the closed lid 24 operable to engage the base 22. In an embodiment, a diameter of the lid 24 is generally complementary to a diameter of the housing 26 such that the lid 24 covers not only the cooking container 36, but also an upper surface 60 of the housing 26.

The lid 24 is movable relative to the base 22 between an open position and a closed position to selectively cover the hollow interior 32. For example, the lid 24 may be distinct and separable from the base 22, or the lid 24 may be movably connected to the base 22. One or more fastening mechanisms (not shown) may, but need not be used to secure the lid 24 to the base 22 when the lid 24 is in the closed position. Any suitable type of fastening mechanism capable of withstanding the heat associated with the cooking system 20 is considered within the scope of the disclosure.

In the illustrated, non-limiting embodiment, the lid 24 is pivotable or rotatable relative to the base 22 about a pivot axis P. As shown, the lid 24 may be rotatable about a pivot axis P positioned adjacent a lower surface 62 of the housing 26. In some embodiments, the base 22 includes a rigid pivot arm 64 positioned adjacent a back surface 66 of the housing 26 and having a first end 68 connected to the housing 26 about a pivot axis P. A second, opposite end 70 of the pivot arm 64 is connected to a back surface 72 of the lid 24. Accordingly, as the pivot arm 64 is rotated about the pivot axis P in a first direction, indicated by arrow O, the lid 24 is rotated away from or out of engagement with an upper surface 60 of the housing 26 to expose the hollow interior 32. Similarly, as the pivot arm 64 is rotated about the pivot axis P in a second direction, indicated by arrow C, the lid 24 is rotated toward or into engagement with the upper surface 60 of the housing 26 or the upper surface 52 of the cooking container to seal or cover the cooking container 36. By positioning the pivot axis P near a lower surface 62 of the housing 26, the sizing envelope of the cooking system 20 when the lid 24 is in the open position may be limited. However, in other embodiments, the pivot axis P and connection of the lid 24 to the base 22 may be arranged at or near the upper surface 60 of the base 22.

Figure 4:
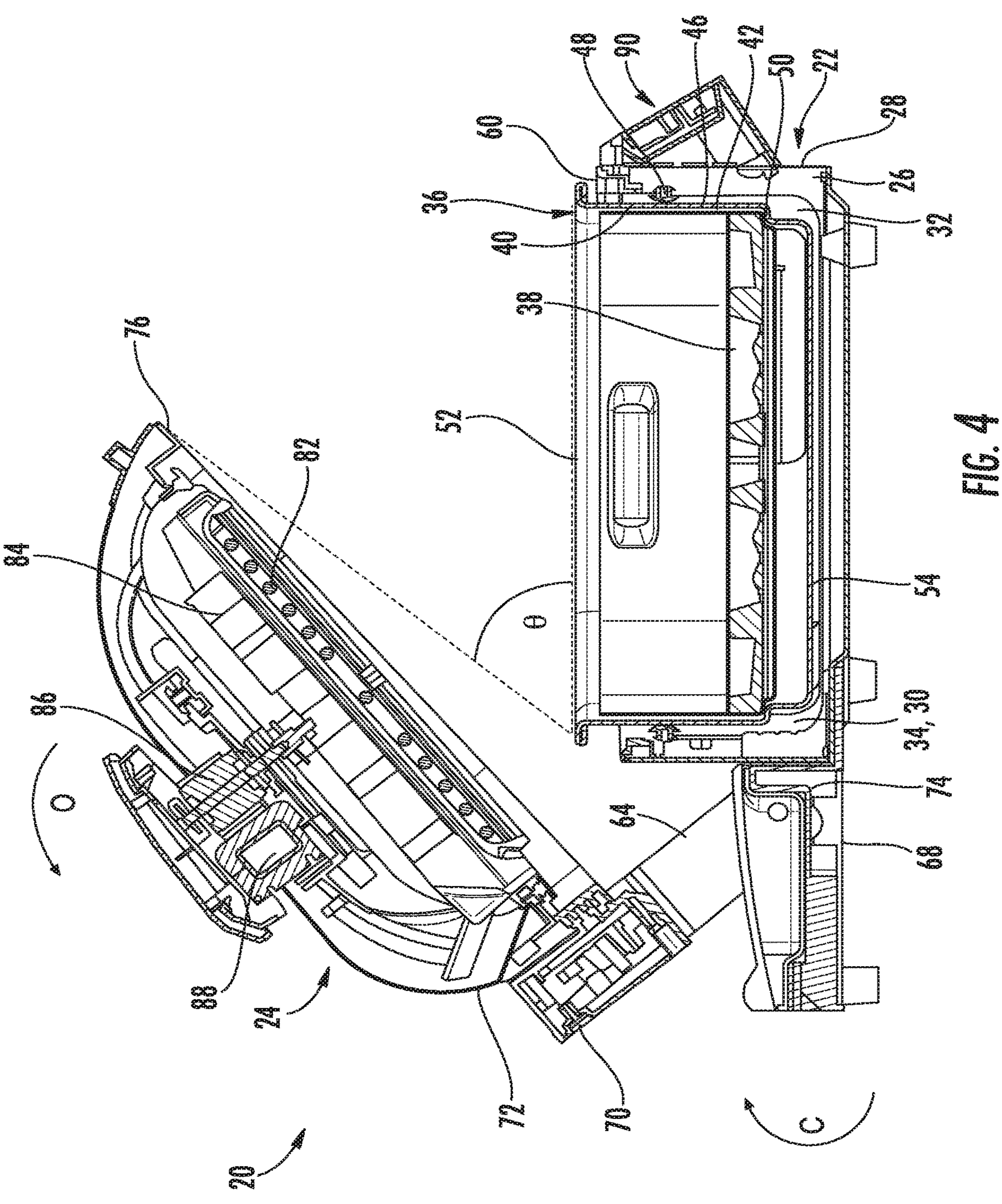
FIG. 4 is a cross-sectional view of the cooking system with the lid in an open position according to an embodiment.

In an embodiment, the base 22 of the cooking system 20 may additionally include a support 74 extending from the housing 26. The support 74 may be mounted to the side of the housing 26 about which the lid 24 is positioned when in the open configuration, to further stabilize the cooking system 20 when the lid 24 is open. In embodiments including both a support 74 and a pivot arm 64, the first end 68 of the pivot arm 64 may be coupled to the support 74, as shown in FIG. 4, rather than to the housing 26. Accordingly, in such embodiments, the pivot axis P is laterally offset from the housing 26. In an embodiment, the lid 24 is rotatable about the pivot axis P between about 40 degrees and about 80 degrees, between about 50 degrees and about 70 degrees, and more specifically about 62 degrees for example, to achieve a desirable angle θ (see FIG. 4) between an end 76 of the lid 24 opposite the pivot arm 64 and the upper surface 60 of the housing 26. In an embodiment, the angle θ is between about 65 degrees and about 95 degrees, between about 70 degrees and about 90 degrees, and more specifically, about 80 degrees.

In the illustrated, non-limiting embodiment, one or more handles 78 extend outwardly from a housing 80 of the lid 24 to provide a user with a location to easily grasp the lid 24 for movement between the open and closed position. Although a single handle 78 mounted generally near a front of the lid 24 is shown, embodiments having multiple handles, or alternatively, no handles are also within the scope of the disclosure. The housing 80 and/or the one or more handles 78 may be integrally or separately formed, such as from a molded plastic material for example.

To enhance a user's access to the hollow interior 32 of the housing 26 or the interior 38 of the cooking container 36, in an embodiment, the housing 26 is configured to move, for example translate and/or rotate, relative to a supporting surface, such as a countertop for example. In an embodiment, the base 22 includes a track defining a path of movement of the housing 26. The housing 26 may include a component complementary to and engaged with the track. Movement of the housing 26 relative to the supporting surface may be driven by the lid 24. For example, as the lid 24 is transformed from a closed position to an open configuration, such as via rotation about the pivot axis P, the housing 26 may similarly move relative to the supporting surface from a retracted position to an extended position. Movement of the lid 24 from an open position to a closed position will similarly cause the housing 26 to move from an extended position to a retracted position. In an embodiment, this movement of the housing 26 may occur as a result of engagement between a portion of the pivot arm 64 and a corresponding portion of the housing 26.

Figure 3:
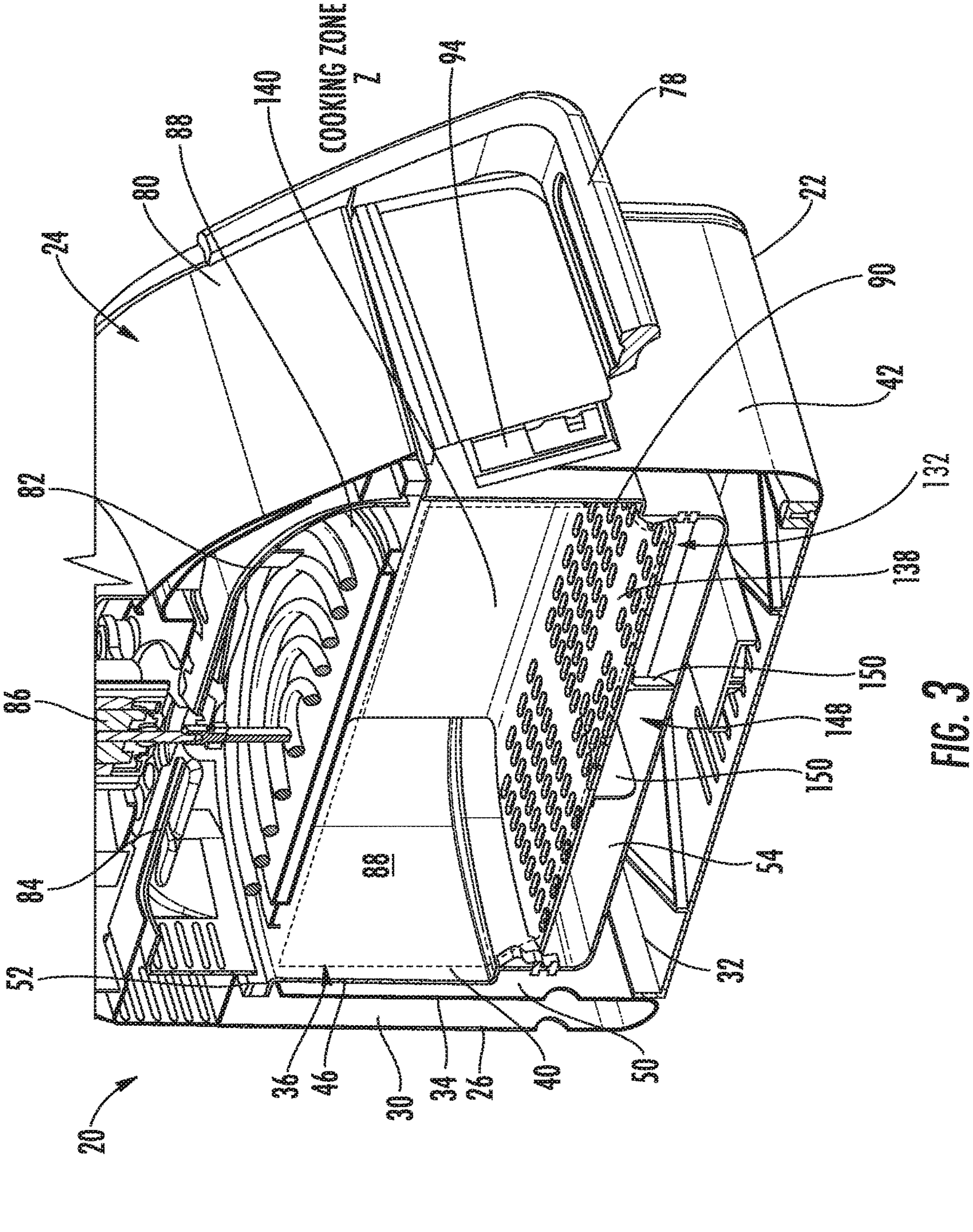
FIG. 3 is a cross-sectional view of the cooking system according to an embodiment.
Figure 10:
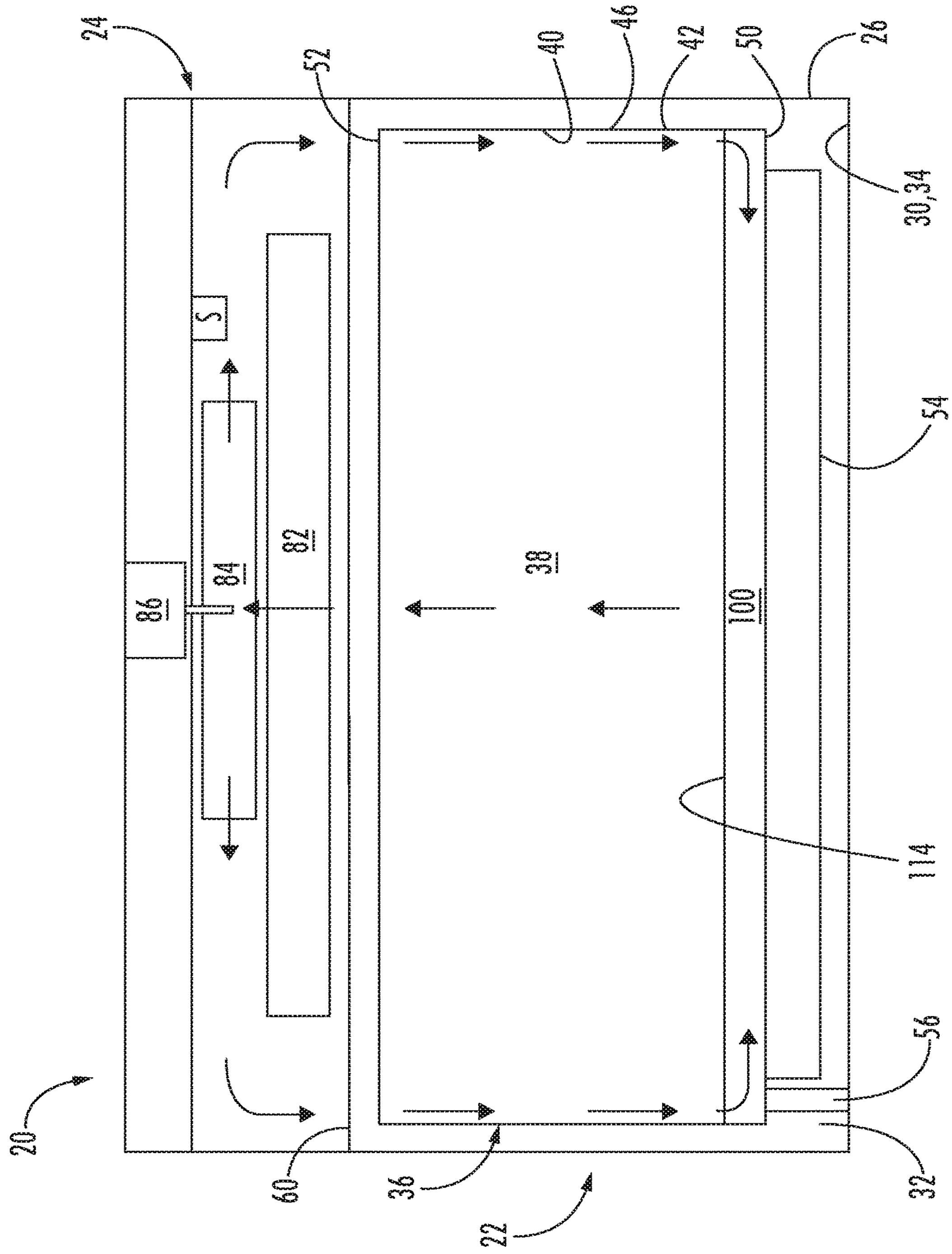
FIG. 10 is a schematic diagram of the cooking system according to an embodiment.

Referring now to FIG. 3 and FIG. 10, the cooking system 20 includes at least one heating element 82 operable to impart heat to the cooking volume during one or more modes of operation of the cooking system 20. In the illustrated, non-limiting embodiment, the at least one heating element 82 is positioned generally at or above an upper extent or surface 52 of the cooking container 36, such as proximate a center of the interior 38 of the cooking container 36 for example. In the embodiment as shown the at least one heating element 82 is mounted within the lid 24, and therefore completely outside of the cooking container 36, and vertically offset from the upper extent or surface 52 thereof. However, it should be understood that a heating element located at any suitable location is within the scope of the disclosure.

The at least one heating element 82 may be capable of performing any suitable type of heat generation. For example, a heating element 82 configured to heat the cooking container 36 or one or more food items located within the interior 38 of the cooking container 36 via conduction, convection, radiation, and induction are all within the scope of the disclosure. In the illustrated, non-limiting embodiment, the heating element 82 is a convective heating element, and the cooking system 20 additionally includes an air movement device 84, such as a fan for example, operable to circulate air within the cooking volume. The air is heated as it flows along its path of circulation, such as by flowing over a portion of the at least one heating element 82. In the illustrated, non-limiting embodiment, the air movement device 84 is driven by a motor 86 having a separate cooling mechanism coupled thereto. Further, the cooking system 20 may include a vent for exhausting hot air generated by operation of at least one of the air movement device 84, the motor 86, and the separate cooling mechanism to the exterior of the cooking system 20. Although the vent is illustrated as being formed in the lid 24, embodiments where the vent is formed in the base 22 of the cooking system 20 are also contemplated herein. In an embodiment, a guard 88 (see FIG. 2) for restricting projectile matter, such as oil for example, from contacting the heating element 82 is positioned directly adjacent the heating element, between the heating element and the interior 38 of the cooking container 36.

As previously mentioned, a support body 100 having a support surface for supporting food thereon is removably mounted within the interior 38 of the cooking container 36. In an embodiment, the support body 100 is a grill plate, which will be described in more detail below.

Figure 6:
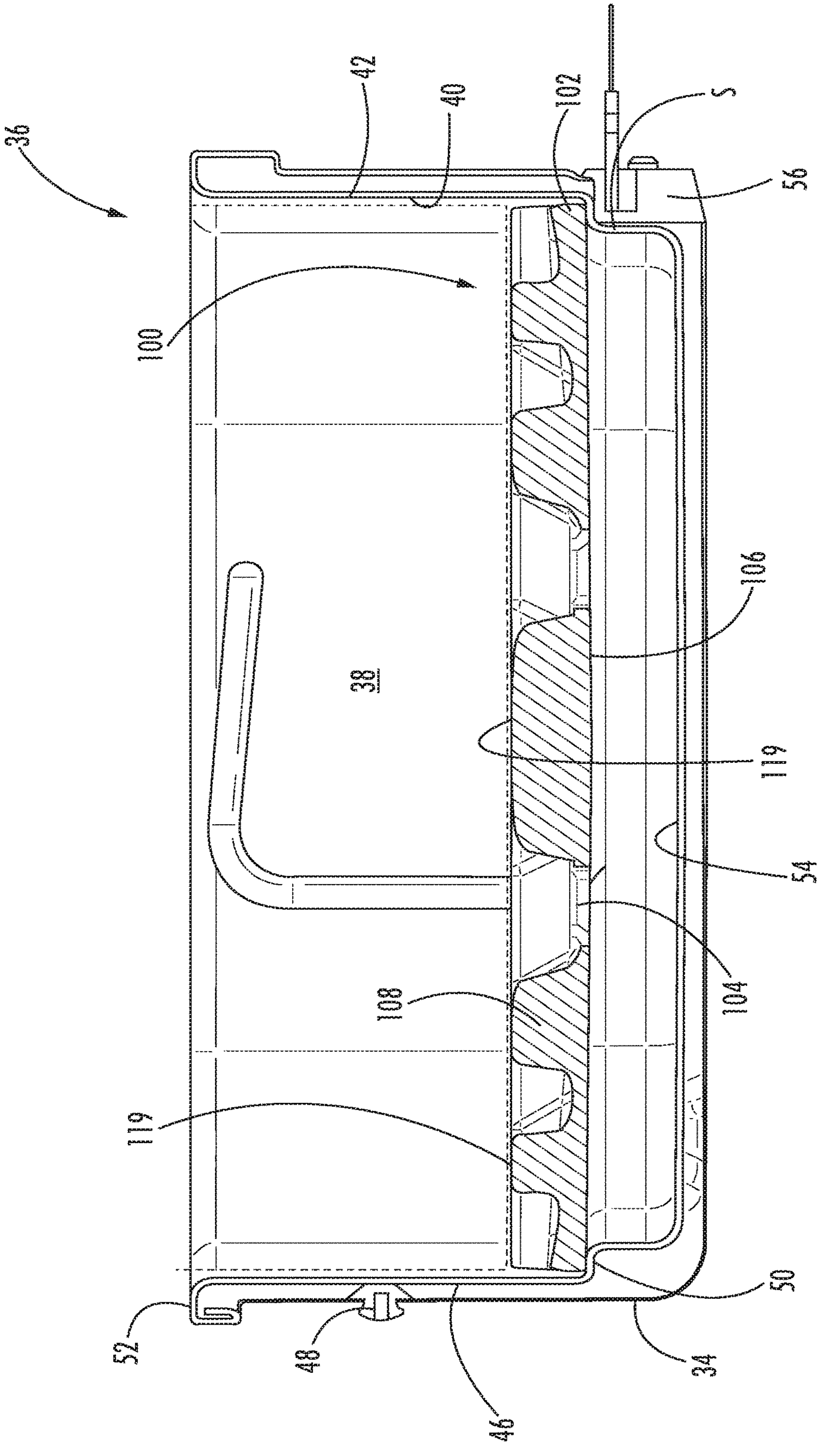
FIG. 6 is a cross-sectional view of a cooking container having an accessory located therein according to another embodiment.
Figure 7:
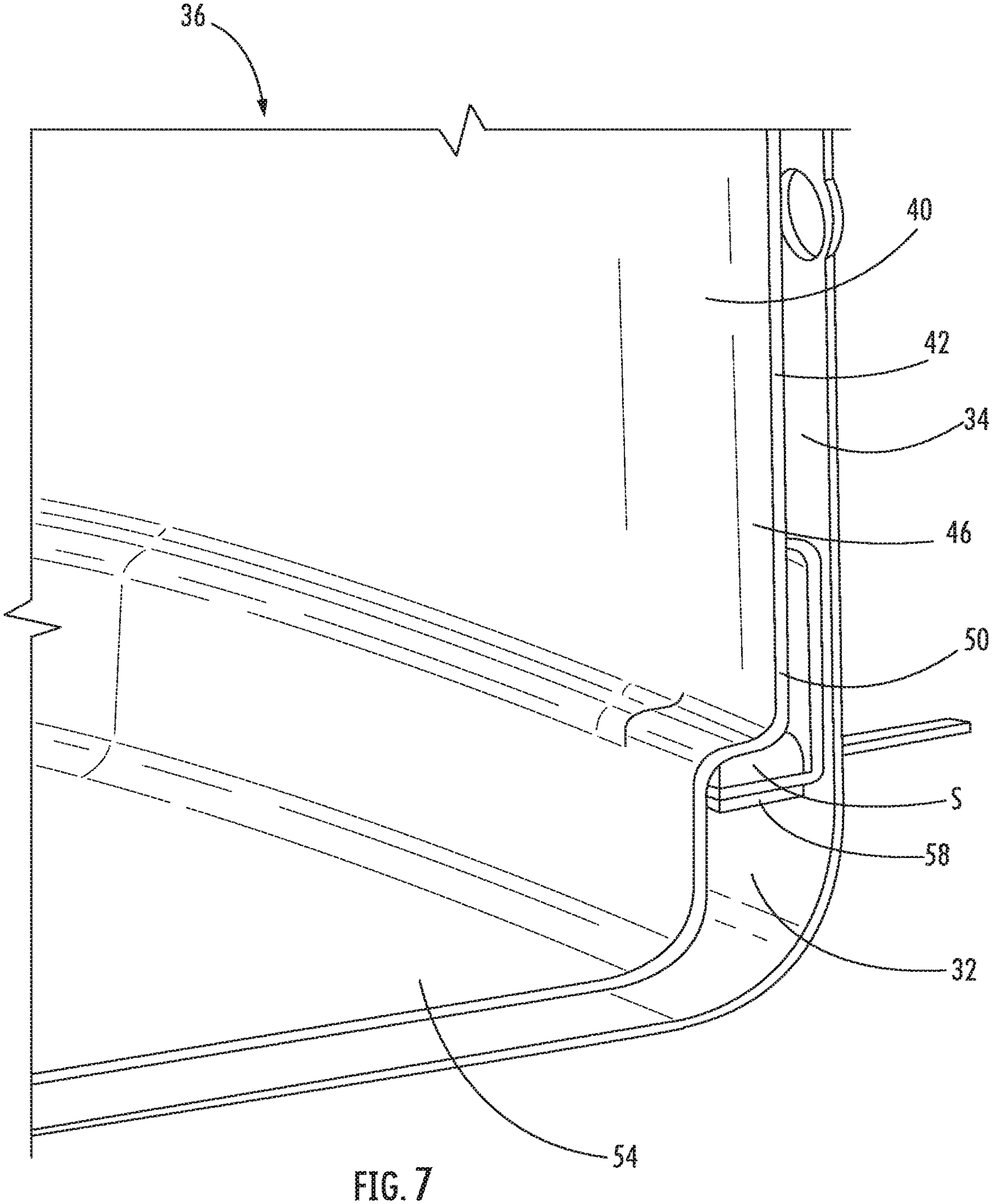
FIG. 7 is a detailed cross-sectional view of an interface between a cooking container and a liner including a sensor according to an embodiment.
Figure 16:
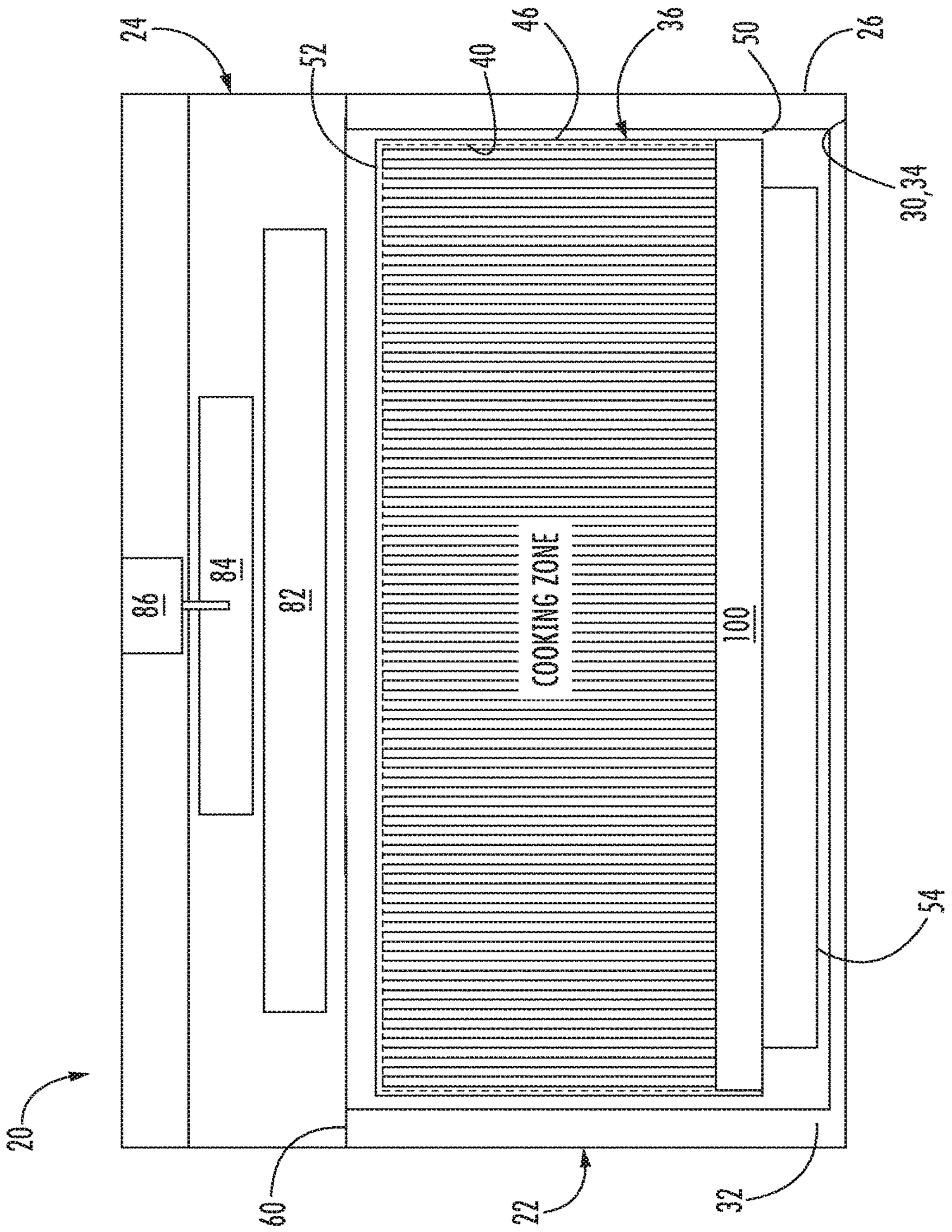
FIG. 16 is a schematic diagram of a cooking zone of the cooking system according to an embodiment.

With continued reference to FIGS. 3 and 6, and further reference to FIG. 16, in an embodiment, the support body 100 positioned within the interior 38 of the cooking container 36 at least partially defines a cooking zone Z within the cooking volume. An upper surface of the support body 100 defines a bottom or lower end of the cooking zone Z. One or more accessories, to be described in more detail below, may be installed in place of the grill plate 100 (as a support body themselves) or in overlapping arrangement with the upper surface of the grill plate 100. In embodiments where a non-grill plate accessory is installed within the cooking container 36, a support surface of the uppermost accessory on which food is receivable, defines the bottom of the cooking zone Z. The cooking zone Z is further defined by one or more sidewalls of the accessory and/or the interior 38 of the cooking container 36. In addition, the cooking zone Z extends from the cooking surface of the grill plate 100 or accessory mounted thereon to either the heating element 82, or alternatively, to the guard 88.

Figure 1:
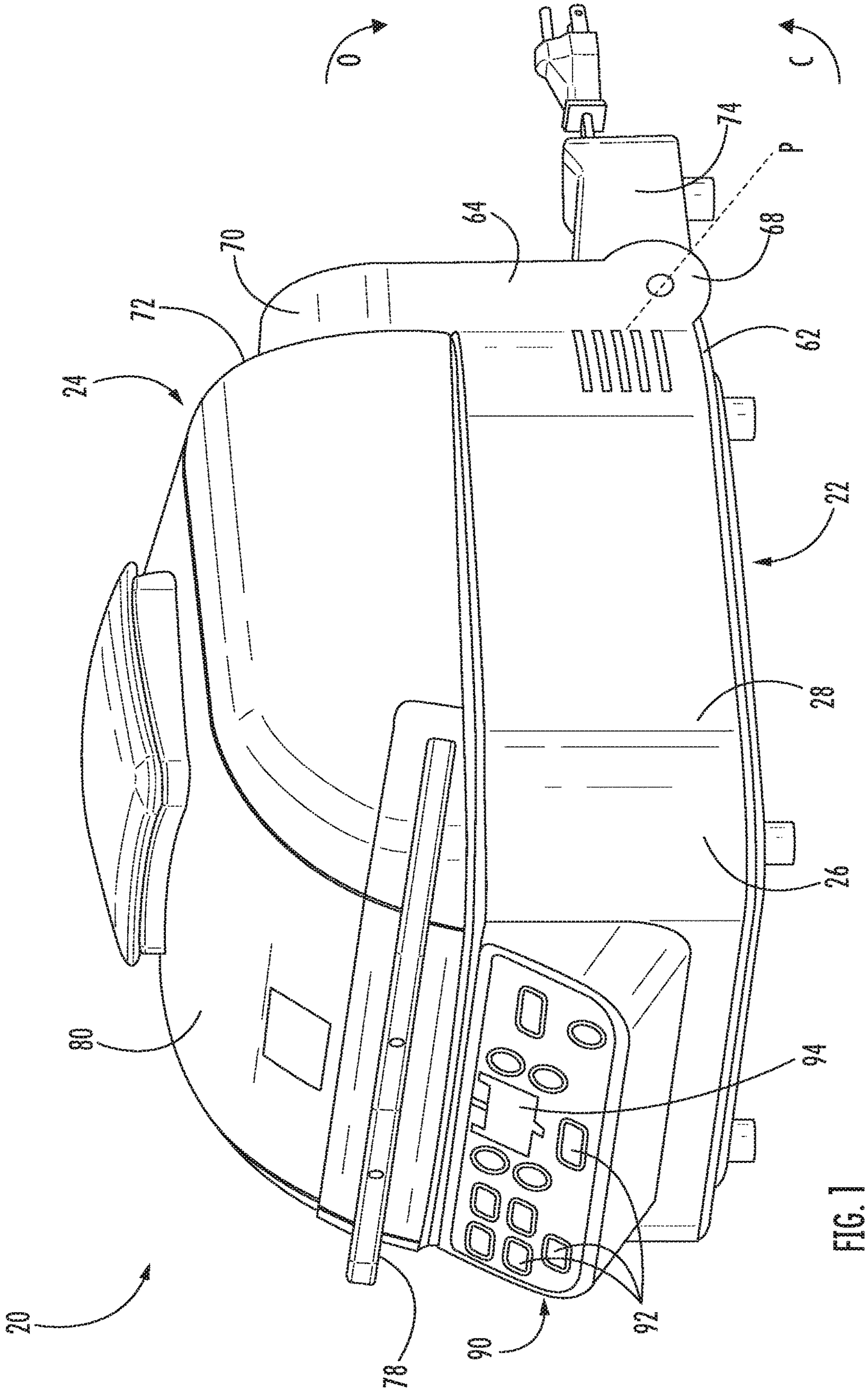
FIG. 1 is a front perspective view of the cooking system according to an embodiment.

With reference again to FIG. 1, a control panel or user interface 90 of the cooking system 20 is positioned adjacent one or more sides of the housing 26 of the base 22 or one or more sides of the housing 80 of the lid 24. The control panel 90 includes one or more inputs 92 associated with energizing the heating element 82 of the cooking system 20 and for selecting various modes of operation of the cooking system 20. One or more of the inputs 92 may include a light or other indicator to show that the respective input has been selected. The control panel 90 may additionally include a display 94 separate from and associated with the at least one input 92. However, embodiments where the display 94 is integrated into the at least one input 92 are also contemplated herein.

Figure 11:
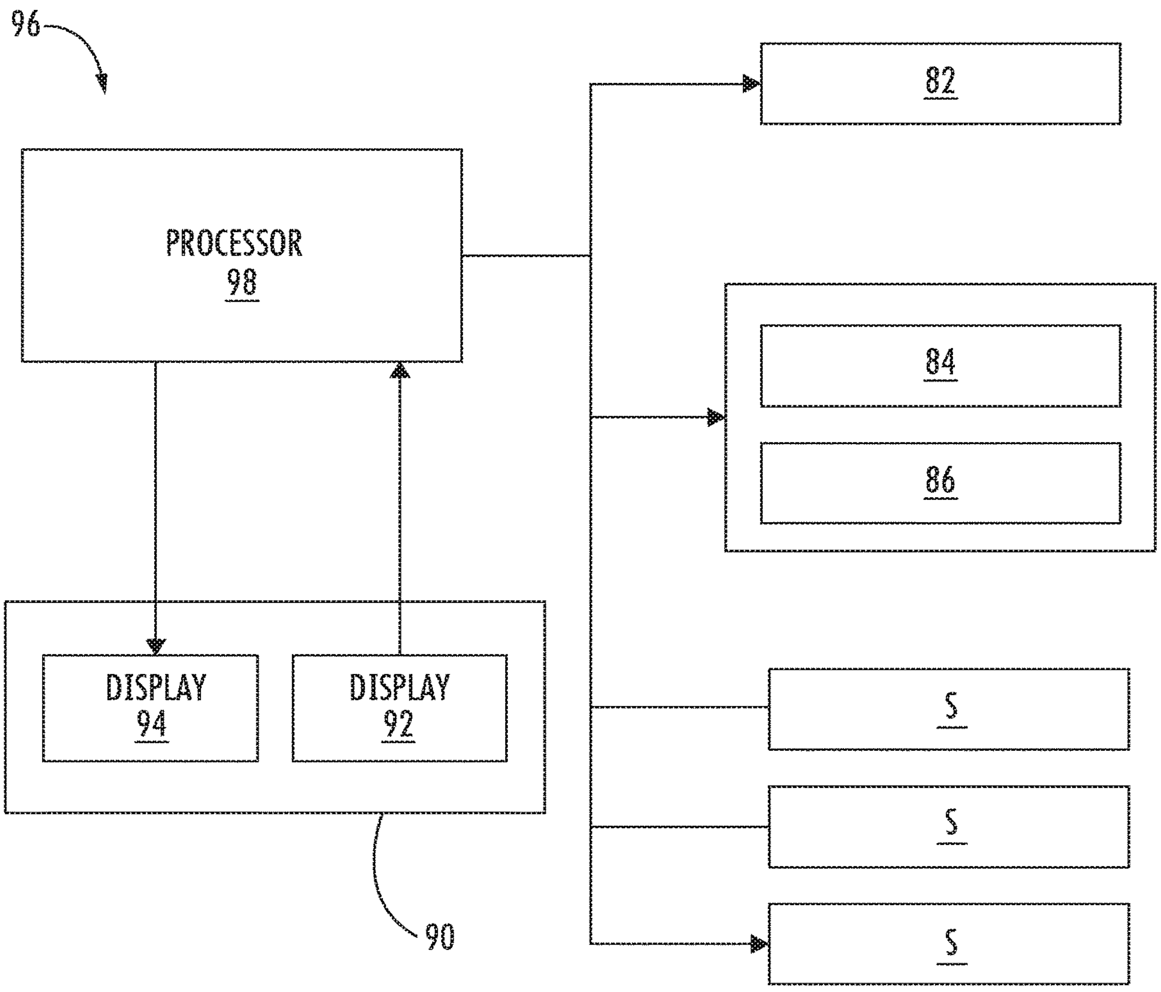
FIG. 11 is a schematic diagram of a control system of the cooking system according to an embodiment.

Operation of the one or more inputs 92 will be described in more detail below. As shown in FIG. 11, a control system 96 of the cooking system 20 includes a controller or processor 98 for controlling operation of the heating element 82 (and air movement device 84 including the motor 86 and/or fan associated therewith), and in some embodiments for executing stored sequences of heating operation. The processor 98 is operably coupled to the control panel 90 and to the heating element 82 and the air movement device 84. In an embodiment, the processor 98 and/or another portion of the control system 96 is mounted adjacent the back surface 66 of the housing 26, and in some embodiments within the support 74.

In addition, the cooking system 20 may include one or more sensors S for monitoring one or more parameters associated with airflow temperature the heating element 82, the lid 24, the cooking volume, the grill plate 100, and/or an accessory mounted within the cooking volume during a cooking operation. Accordingly, operation of the cooking system 20, and in particular of the one or more heating elements 82, may be regulated in response to the parameters sensed by the one or more sensors S. In an embodiment, the one or more sensors S includes a temperature sensor arranged in communication with the processor 98. In an embodiment, the temperature sensor(s) S, such as a thermistor of thermistors for example, are positioned in one or both of the liner 34 and the cooking container 36 (or there between), such as adjacent the step 50 formed in the cooking container 36 for example. In embodiments where a temperature sensor S is hardwired to the control system 96, one or more wires connecting the temperature sensor S to the processor 98 may be embedded within the housing 26, such as between the housing 26 and the liner 34 for example.

The temperature sensor(s) S may directly contact the exterior surface 42 of the cooking container 36 to determine the temperature of the cooking container 36, or alternatively, may extend through body of the cooking container 36 for engagement with the support body 100, i.e. the grill plate in the embodiment shown in FIG. 6, or with an accessory arranged within the interior 38 of the cooking container 36 in other embodiments. As is best shown in FIG. 6, the temperature sensor S may be coupled to or at least partially supported by the spacer 56. Alternatively, in embodiments where the cooking system 20 includes a ledge 58, the temperature sensor S may be supported at least partially by the ledge 58, as shown in FIG. 7.

Figure 8:
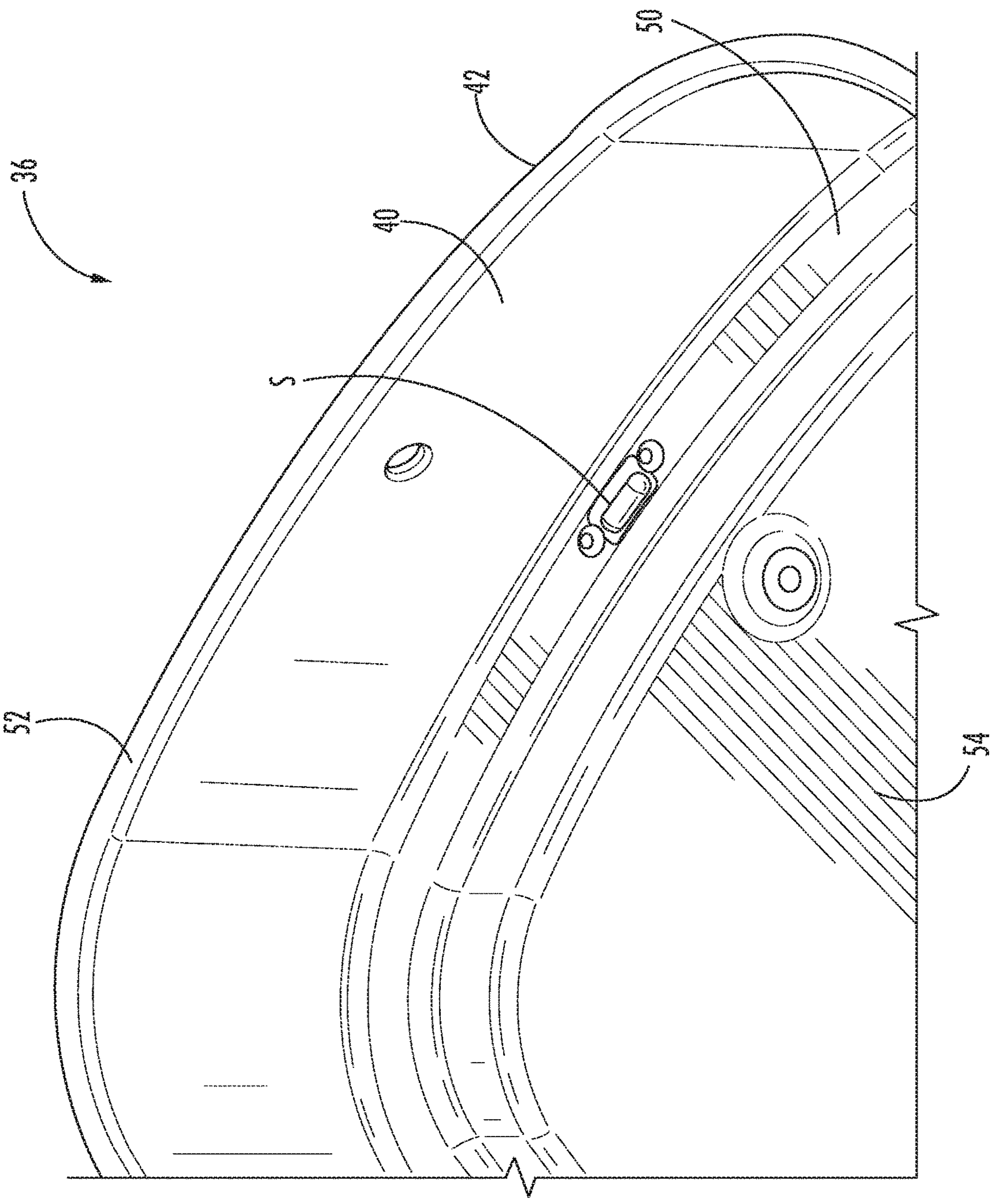
FIG. 8 is a perspective view of a cooking container having a temperature sensor according to an embodiment.
Figure 9:
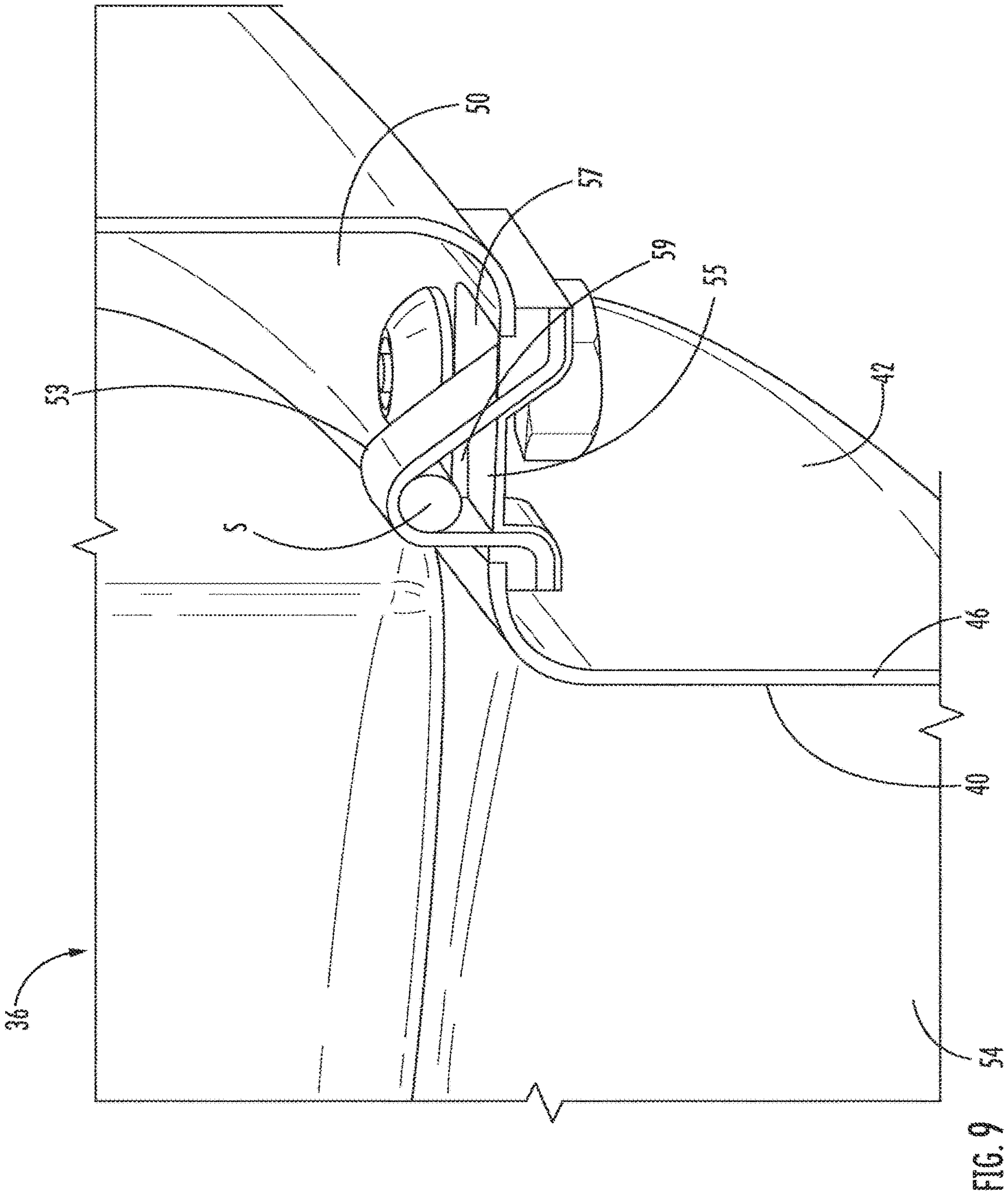
FIG. 9 is a cross-sectional view of the cooking container of FIG. 8 according to an embodiment.

In yet another other embodiment, best shown in FIGS. 8 and 9, the temperature sensor S is integrated into the cooking container 36 and is operable to contact and sense the temperature of the support body 100 (such as the grill plate). As shown, the temperature sensor S may be mounted upwardly adjacent the step 50, within the interior 38 of the cooking container 36 via an aluminum plate 53 and a metal bracket 55 for example. A seal 57, such as formed from silicone for example, may seal the plate 53 to the cooking container 36. The temperature sensor S may be located at a position offset from the metal bracket 55 to prevent overheating of the temperature sensor S. In such embodiments, the gap 59 between the temperature sensor S and the metal bracket 55 may be filled with a thermal paste. It should be understood that the various configurations of the temperature sensor S illustrated and described herein are intended as an example only and that other configurations suitable for monitoring and communicating (to the control system 96) a temperature of at least one of the cooking container 36, the support body 100, i.e. the grill plate in the embodiment shown in FIG. 6, or an accessory positioned within the interior 38 of the cooking container 36 are also contemplated herein.

In addition to the temperature sensor(s) S used to monitor the temperature of the support body 100, the cooking system 20 may also employ a further temperature sensor or sensors (also indicated as S) to sense the temperature of the air provided to the interior 38 of the cooking container 36. In such embodiments, a first temperature sensor or sensors may be mounted as previously described, for example to contact a bottom or lower surface of the grill plate 100, and a second temperature sensor or sensors may be located within the lid 24, generally adjacent the air movement device 84, such that the temperature sensor is located directly within the heated airflow expelled from air movement device 84. One or more operating parameters of the cooking system 20 may be adjusted via, for example, a control algorithm accessible by the processor 98 in response to the temperature detected by the one or more temperature sensors S. In an exemplary embodiment, the speed of the air movement device 84 may be adjusted, or alternatively, the power provided to the heating element 82 may be increased or decreased to achieve a desired temperature.

In embodiments of the cooking system 20 including temperature sensors S positioned in different locations, adjustment of an operating parameter, such as operation of the heating element 82 for example, may be performed using the control algorithm in response to the temperature of the heated airflow, measured by the temperature sensor S disposed in the heated airflow. For example, power provided to the heating element 82 may be increased if the sensed airflow temperature is below a set point, and the power provided to the heating element 82 may be reduced or ceased completely if the sensed airflow temperature is above a set point, thereby allowing the interior 38 of the cooking container 36 to cool. In an embodiment, the temperature sensor S positioned proximate the support body 100 is operable to provide smoke control and indicate when the temperature of the grill plate 100 is approaching a temperature associated with the generation of smoke (also known as the smoke point). The smoke point will vary based on the type of food and/or fat positioned within the interior 38. An example of the smoke point of common foods is shown below:

| Fat | Smoke Point ° F. | Smoke Point ° C. |
|---|---|---|
| Unrefined canola oil | 225° F. | 107° C. |
| Unrefined flaxseed oil | 225° F. | 107° C. |
| Unrefined safflower oil | 225° F. | 107° C. |
| Unrefined sunflower oil | 225° F. | 107° C. |
| Unrefined corn oil | 320° F. | 160° C. |
| Unrefined high-oleic sunflower oil | 320° F. | 160° C. |
| Extra virgin olive oil | 320° F. | 160° C. |
| Unrefined peanut oil | 320° F. | 160° C. |
| Semirefined safflower oil | 320° F. | 160° C. |
| Unrefined soy oil | 320° F. | 160° C. |
| Unrefined walnut oil | 320° F. | 160° C. |
| Hemp seed oil | 330° F. | 165° C. |
| Butter | 350° F. | 177° C. |
| Semirefined canola oil | 350° F. | 177° C. |
| Coconut oil | 350° F. | 177° C. |
| Unrefined sesame oil | 350° F. | 177° C. |
| Semirefined soy oil | 350° F. | 177° C. |
| Vegetable shortening | 360° F. | 182° C. |
| Lard | 370° F. | 182° C. |
| *Macadamia* nut oil | 390° F. | 199° C. |
| Refined canola oil | 400° F. | 204° C. |
| Semirefined walnut oil | 400° F. | 204° C. |
| High quality (low acidity) extra virgin olive oil | 405° F. | 207° C. |
| Sesame oil | 410° F. | 210° C. |
| Cottonseed oil | 420° F. | 216° C. |
| Grapeseed oil | 420° F. | 216° C. |
| Virgin olive oil | 420° F. | 216° C. |
| Almond oil | 420° F. | 216° C. |
| Hazelnut oil | 430° F. | 221° C. |
| Peanut oil | 440° F. | 227° C. |
| Sunflower oil | 440° F. | 227° C. |
| Refined corn oil | 450° F. | 232° C. |
| Refined high-oleic sunflower oil | 450° F. | 232° C. |
| Refined peanut oil | 450° F. | 232° C. |
| Refined Safflower oil | 450° F. | 232° C. |
| Semirefined sesame oil | 450° F. | 232° C. |
| Refined soy oil | 450° F. | 232° C. |
| Semirefined sunflower oil | 450° F. | 232° C. |
| Olive pomace oil | 460° F. | 238° C. |
| Extra light olive oil | 468° F. | 242° C. |
| Soybean oil | 495° F. | 257° C. |
| Safflower oil | 510° F. | 266° C. |
| Avocado oil | 520° F. | 271° C. |

Operation of the cooking system 20 is impacted by the temperature sensor S proximate the grill plate 100 if the sensed temperature of the grill plate 100 is above a threshold stored within a memory embedded within or accessible by the processor 98, for example associated with a smoke point. All of the above smoke points may be stored in the processor memory and used as a set threshold. In addition, modes of operation are contemplated. For example, in a low mode of operation, the temperature threshold of a surface of the grill plate 100 is about 345° F., in a medium mode of operation, the temperature threshold of a surface of the grill plate 100 is about 375° F., and in a high mode of operation, the temperature threshold of a surface of the grill plate 100 is about 410° F. The thresholds indicated herein are intended as an example only, and it should be understood that other temperatures may be selected for any of the various modes of operation.

In at least one mode of operation, such as a maximum temperature mode of operation, the cooking system 20 is configured to ignore or disregard the temperature of the grill plate 100 detected by the temperature sensor S proximate thereto. As a result, in the maximum temperature mode, the temperature of the grill plate 100 may exceed the smoke point. Although operation is described herein with respect to use of the temperature sensor proximate the grill plate 100 to monitor the temperature of the grill plate 100, similar control of the cooking system 20 may be performed in embodiments where this temperature sensor S is operable to monitor the temperature of either the cooking container 36 or the temperature of an accessory mounted within the interior 38 of the cooking container 36.

In an embodiment, at least one input 92 on the control panel 90 is an on/off button which allows the user to activate or deactivate the control panel 90. When the control panel 90 is deactivated, none of the one or more heating elements 82 are energized. In an exemplary embodiment, the at least one input 92 is operable to select one or more manual modes of operation of the heating element 82. Alternatively, or in addition, at least one input 92 is operable to select a stored sequence of operation of the heating element 82. In some cases, the stored sequences may be particularly well suited for a given method of food preparation and/or for particular ingredients or types of ingredients. The plurality of stored sequences associated with the at least one input 92 may be stored within a memory accessible by the processor 98. Alternatively, the plurality of stored sequences may be stored remotely from the cooking system 20, and may be accessed by the processor 98, such as via wireless communication for example.

In addition, a user may be able to enter a time associated with operation of the cooking system 20 in a desired manual mode. The time may be entered via the same input 92 or a separate input 92 as used to select a mode of operation. Further in embodiments where the cooking system 20 is in a mode configured to perform a stored sequence in response to selection of one of the inputs 92, the display 94 may indicate a time remaining on the display 94. Temperature or other parameters may also be entered via inputs 92.

The at least one input 92 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input 92 has been selected and any necessary information has been provided to the control panel 90. Alternatively, one or more of the other inputs 92, such as the knob for example, may be operable, such as by pushing the knob towards the control panel 90, to start and stop operation of the cooking system 20, regardless of whether the cooking system 20 is following a stored sequence or is in a manual mode.

The one or more inputs 92 are operable to initiate operation of the cooking system 20 in a plurality of cooking modes. In an embodiment, a first cooking mode of the cooking system 20 is operable to cook a food item located within the cooking volume via both a non-contact cooking operation and a contact cooking operation. As used herein, the term "non-contact cooking operation" includes any cooking operation where a heating element or heat source is not arranged in direct or indirect contact with a food item, such as, but not limited to, convective and radiant heating. Similarly, the term "contact cooking operation" includes a cooking operation where heat is transmitted via direct or indirect contact between a heating element or heat source and a food item, such as, but not limited to, conductive and inductive cooking. For example, the first cooking mode may cook a food item via a combination of both convection and conduction cooking: however, it should be understood that any combination of non-contact and contact cooking operations are contemplated herein.

Figure 12:
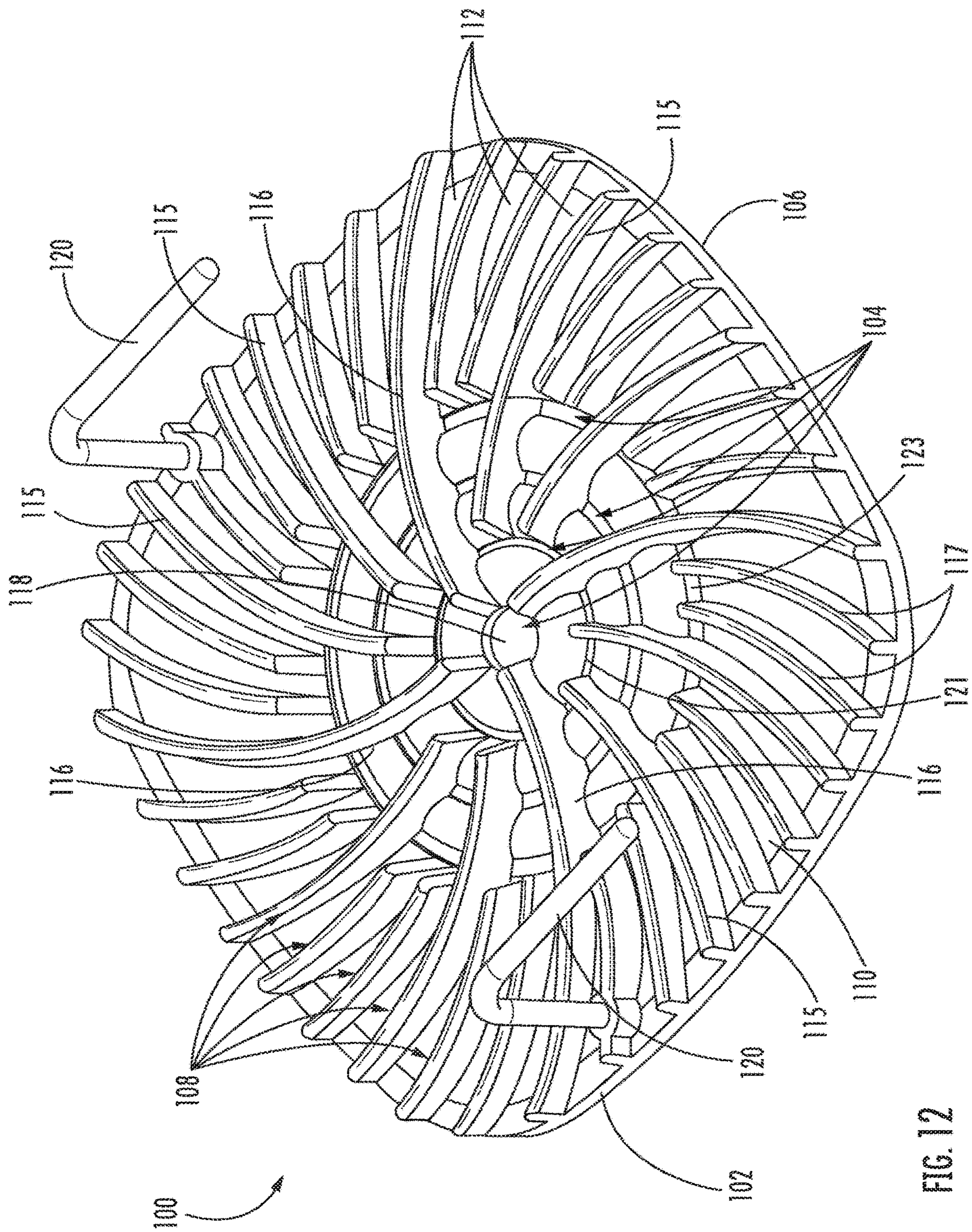
FIG. 12 is a perspective view of support body receivable within a cooking container of the cooking system according to an embodiment.

Operation in the first cooking mode involves the use of various components, such as the heating element 82 and support body 100, such as the grill plate for example, receivable within the interior of the liner 34, or alternatively, within the interior 38 of the cooking container 36. With reference now to FIG. 12, an example of the grill plate 100 is shown in more detail. The grill plate 100 includes a body 102 having a plurality of through holes or openings 104 formed therein. The body 102 of the grill plate 100 is sized such that the grill plate 100, when installed within the interior 38 of the cooking container 36, is in contact with and supported by the step 50 (See FIG. 10). Accordingly, a clearance is defined between the bottom 106 of the grill plate 100 and the bottom 54 of the cooking container 36. Grease, oil, and other runoff liquids generated during a cooking operation may flow through the openings 104 formed in the body 102, to collect beneath the grill plate 100, at the bottom 54 of the cooking container 36. In an embodiment, the diameter of the grill plate 100 is substantially equal to the inner diameter of the first portion of the cooking container 36. As a result, when installed within the cooking container 36, an outer perimeter of the grill plate 100 generally abuts or is minimally offset from (about 1 mm of less) the interior surface 40 of the cooking container 36.

As shown best in FIG. 12, a plurality of ribs 108 may extend from an upper surface 110 of the body 102. The ribs 108 are spaced apart from one another to define a plurality of channels 112 formed between adjacent ribs 108. The ribs 108 may be integrally formed with the upper surface 110, or alternatively, may be affixed thereto. Accordingly, when one or more food items are positioned on the food supporting surface 114 defined by the ribs 108, the food is offset from the upper surface 110 of the body 102. Each of the plurality of ribs 108 may be identical, or alternatively, may vary in size or shape based on the position of the rib 108 relative to the body 102. In the illustrated, non-limiting embodiment, the plurality of ribs includes longer ribs 116, intermediate ribs 115, and shorter ribs 117. The longer ribs 116 extend radially outwardly from a center opening 118 formed in the body 102. The intermediate ribs 115 and shorter ribs 117 also extend radially outwardly from areas disposed closer to the edges of the body 102 (the intermediate ribs 115 extending from concentric opening 121 and the shorter ribs 117 extending from concentric opening 123), with all of the ribs 108 generally extending to the outermost edges of the body 102.

In an exemplary embodiment, some or all of the ribs 108 create a diffusing structure operable to diffuse an air flow provided thereto. The diffusing structure described herein functions not only to slow the speed of an air flow, but also to reduce the rotation of the airflow as is passes through the diffusing structure. As shown in FIG. 12, each of the ribs 108 of the grill plate 100 forms a portion of the diffusing structure. However, in other embodiments only a portion of the ribs 108, for example only the longer ribs 116, or alternatively, the longer ribs 116 and the intermediate ribs 117, cooperate to diffuse an air flow provided to the grill plate.

One or more handles 120 may be associated with the grill plate 100 to allow a user to easily grasp and manipulate the grill plate 100. In the illustrated, non-limiting embodiment, the grill plate 100 has two handles 120 extending from the upper surface 110 of the base 102, adjacent opposing sides of the grill plate 100. The handles 120 may be connected to a rib 108 or directly to the body 102 of the grill plate 100. Although the handles 120 are illustrated as being integrally formed with the grill plate 100, embodiments where the one or more handles 120 are affixed to the grill plate 100 are also within the scope of the disclosure.

The grill plate 100 may be made of any suitable metal material, such as iron, steel, aluminum or any suitable ferromagnetic material. Further, in some embodiments, at least a portion of the grill plate 100 may be coated with a non-stick material, such as Teflon for example, to prevent food items from sticking to the grill plate 100.

Figure 10A:
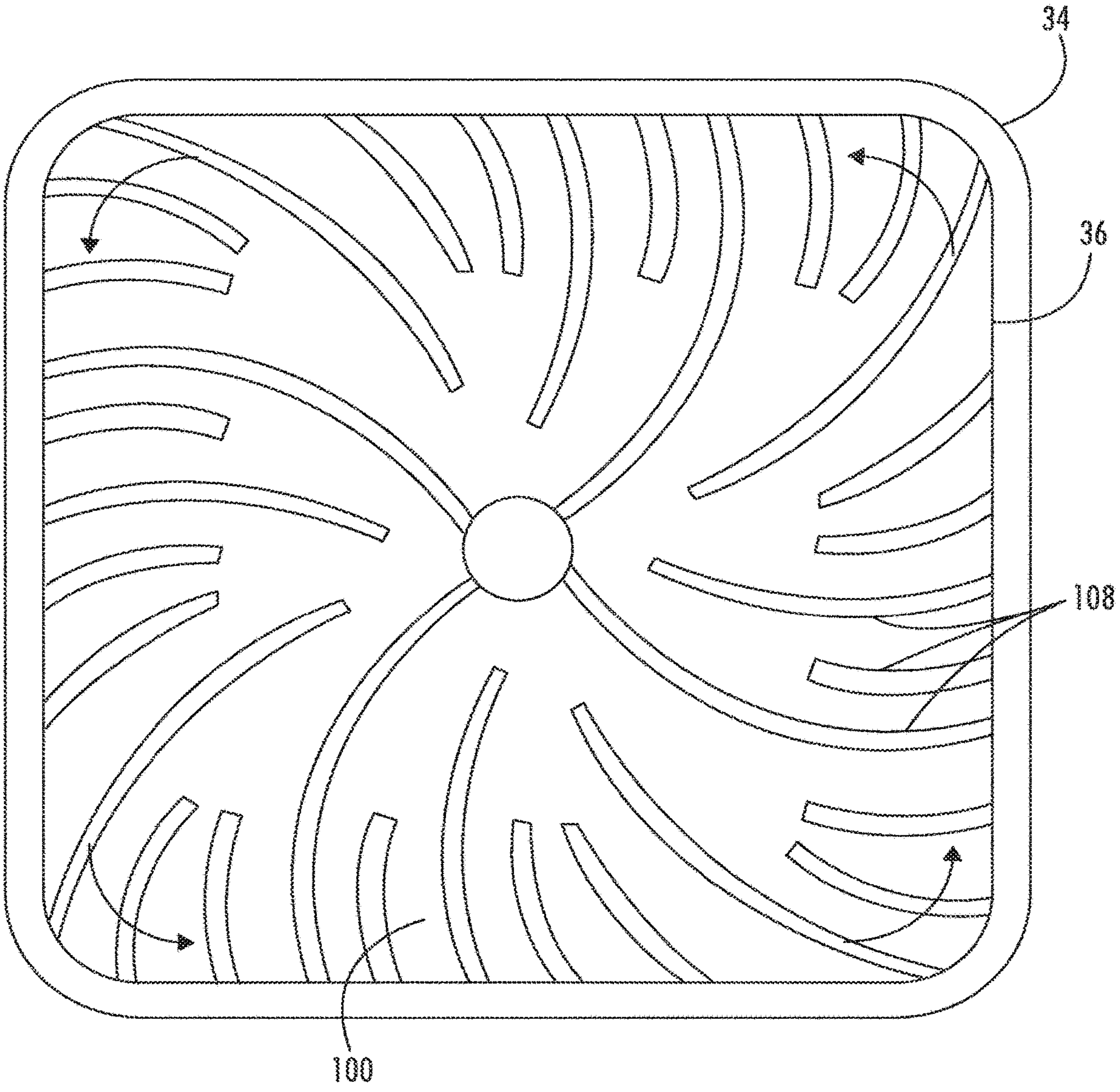
FIG. 10A is a top view of the base of the cooking illustrated a flow of the air provided to the cooking volume according to an embodiment.

With continued reference to FIG. 12 and to the first cooking mode, at the start of the first cooking mode, the grill plate 100 is mounted within the cooking container 36 and the lid 24 covers the upper extent or surface 52, 60 and hollow interior 32, 38 of the housing 26 and the cooking container 36, respectively. When utilizing the cooking system 20 in the first cooking mode, the processor 98 initiates operation of the heating element 82 located remotely from the grill plate 100 to heat the grill plate 100. In an embodiment, the air movement device 84 is also operated to circulate the hot air within the cooking volume as represented by arrows in FIG. 10. As shown, the air output from the air movement device 84 is drawn through the heating element 82 and into the air movement device 84 from a center of the cooking volume. The heated air is exhausted radially and has a circular flow or spin, best shown in FIG. 10A, similar to the rotation of the air movement device 84. Due in part to the spin of the heated air and deflection thereof by interior surfaces of the lid 24, the air flows downwardly into the cooking volume along the interior surface 40 of the cooking container 36.

As the air flow approaches the step 50 formed in the cooking container 36, the air flow is received generally adjacent the outer periphery of the grill plate 100. The diffusing structure of the grill plate 100 halts the downward movement of the air flow and directs the air flow radially inwardly through the plurality of channels 112 defined between the ribs 108. The curved configuration of the ribs 108 and channels 112 of the diffusing structure slows the rotation to the air flow while simultaneously directing the air flow generally horizontally towards the center of the grill plate 100 where one or more food items are typically positioned. As a result, rotation of the flow of air output from the plurality of channels at a relative center of the grill plate 100 is stopped altogether or at least less than the rotation of the flow of air that enters the plurality of channels 112 at the outer periphery of the grill plate 100. The flow of air exiting the channels 112 flows upwardly from beneath a food item and, around an exterior surface of the food item before being drawn back up and through the heating element 82 by the air movement device 84. This movement of the air through the cooking volume to convectively cook the food items (i.e. non-contact cooking) may be facilitated in part by the configuration of the diffusing As the heated air flows through the channels 112 and over the surface of the grill plate 100, heat from the air is transferred to the grill plate 100, thereby increasing the temperature of the grill plate 100. As previously described, the grill plate 100 is formed from a conductive, metal material.

In an embodiment, the mass of the grill plate 100 is selected such that during operation in the first cooking mode, the grill plate 100 achieves and maintains a temperature, after an initial "preheating" period, sufficient to cause a Maillard reaction in the food located within the cooking volume. The temperature of the grill plate 100 necessary to achieve the Maillard reaction is at least 285° F. In an embodiment, the preheating period is a period of time required to heat the grill plate 100 to a temperature where the Maillard reaction will occur, i.e. 285° F. or warmer. In embodiments where the preheating period increases the temperature of a grill plate 100 initially at room temperature to a temperature where the Maillard reaction will occur is less than about 20 minutes, less than about 15 minutes, or less than about 10 minutes. In an embodiment, a temperature sensor S of the cooking system 20 is operable to monitor the temperature of the cooking container 36 and/or the temperature of the grill plate 100. Accordingly, the display 94 may indicate to a user that the "preheat" operation is complete and that food is ready to be received within the cooking volume in response to the determining that the temperature of the grill plate 100 as detected by the temperature sensor S has reached a minimum temperature necessary to achieve the Maillard reaction.

Because weight and cost are typically directly proportional, it is desirable to minimize the weight of the grill plate 100. As a result, the thermal mass of grill-like elements, such as burners used in a stove for example, are insufficient to achieve and maintain a temperature required to initiate the Maillard reaction, specifically when heated via convection or radiation. In an embodiment, the mass of the grill plate 100 is between about 200 grams and about 3 kg, and more specifically, between about 300 g and about 3 kg, about 400 grams and about 3 kg, about 500 g and about 3 kg, about 600 g and about 3 kg, about 700 g and about 3 kg, about 800 g and about 3 kg, about 900 g and about 3 kg, about 1000 g and about 3 kg, about 1.1 kg and about 3 kg, about 1.2 kg and about 3 kg, about 1.3 kg and about 3 kg, about 1.4 kg and about 3 kg. 1.5 kg and about 3 kg. 1.6 kg and about 3 kg. 1.7 kg and about 3 kg, 1.8 kg and about 3 kg, 1.9 kg and about 3 kg. 2.0 kg and about 3 kg, about 2.1 kg and about 3 kg, about 2.2 kg and about 3 kg, about 2.3 kg and about 3 kg, about 2.4 kg and about 3 kg, about 2.5 and about 3 kg, about 2.6 and about 3 kg, about 2.7 and about 3 kg, about 2.8 and about 3 kg, or about 2.9 kg and about 3 kg.

During the first cooking mode, after the preheating period is completed, one or more food items are positioned within the cooking volume, in direct contact with the support surface 114 of the grill plate 100 to perform a grilling operation. Heat from the grill plate 100, and more specifically from the ribs 108, is transferred to the food items, such as via conduction (i.e. contact cooking). Because the temperature of the grill plate 100 is above 285° F., and therefore the Maillard reaction occurs, browning in the form of grill or sear marks is formed at the surfaces of the food arranged in direct contact with the ribs 108 of the grill plate 100. It should be understood that in embodiments where only a portion of the ribs 108 form part of the diffusing structure, the ribs 108 that are not part of the diffusing structure are operable to transfer heat to the food. Further, the ribs 108 that define the diffusing structure transfer heat to the food.

During operation in the first cooking mode, including after the grill plate 100 has preheated to a desired temperature, the temperature sensor S may continuously or selectively sample the temperature of the cooking volume or of the grill plate 100 and adjust operation of the cooking system 20 accordingly. For example, upon determining that the temperature of the grill plate 100 is approaching a maximum threshold, the processor 98 may de-energize the heating element 82 until the temperature has fallen to an acceptable level. In such embodiments, the maximum threshold may be smoking point of the food positioned within the cooking volume. Similarly, upon determining that the temperature of the grill plate 100 is approaching a minimum threshold, such as a lowest possible temperature to achieve a Maillard reaction, the processor 98 will adjust one or more operating parameters of the cooking system 20, such as the speed of the air circulation, and/or the power provided to the heating element 82.

Figure 13:
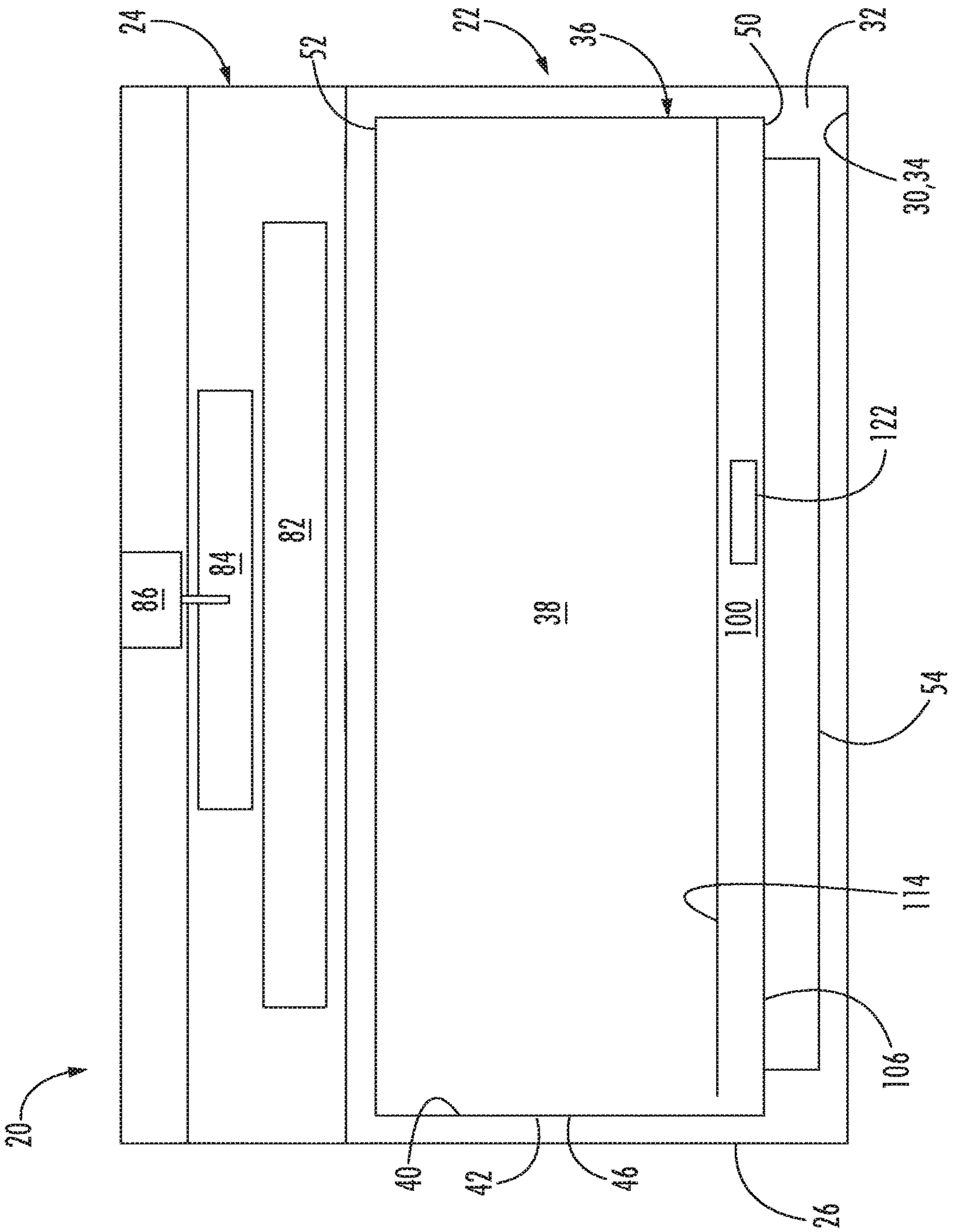
FIG. 13 is a schematic diagram of a control system of the cooking system according to another embodiment.

Although the grill plate 100 is illustrated and described as being heated in the first cooking mode by a heating element 82 located remotely therefrom (i.e. within the lid) such that the food items being cooked are disposed between the at least a portion of the heating element 82 and at least a portion of the grill plate 100, in other embodiments, the cooking system 20 may include another heating element 122 (see FIG. 13), distinct from the heating element 82, and operably coupled to the grill plate 100. The first and second heating elements 82, 122 are operable independently or in combination to apply one or more predetermined power settings to cook the food products within the cooking container 36. In an embodiment, the heating element 122 is embedded within the grill plate 100. Alternatively, the heating element 122 may be embedded within the housing 26 and operably coupled to the grill plate 100 when the grill plate 100 is installed within the hollow interior 32 of the liner 34 or the interior 38 of the cooking container 36. Accordingly, in an embodiment, during operation in the first cooking mode, both the heating element 82 and the heating element 122 are operational and impart heat to the cooking volume.

Figure 17:
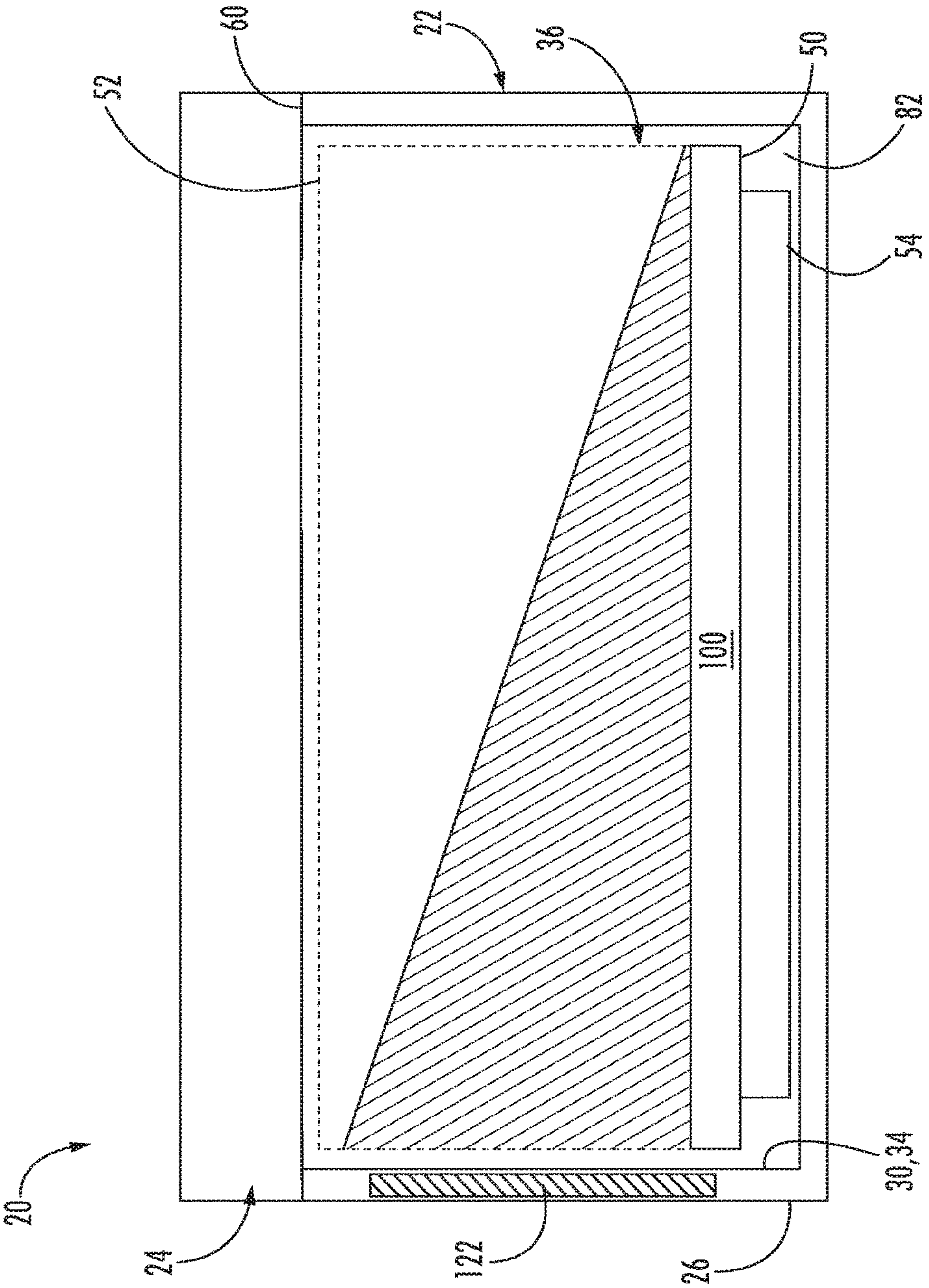
FIG. 17 is a schematic diagram of a cooking zone of the cooking system according to an embodiment.

In embodiments where a heating element 122 is embedded within the housing 26 adjacent a sidewall 46 of the cooking container 36, the heating element 122 may define a portion of the cooking zone Z. Accordingly, because the bottom of the cooking zone Z is defined by the cooking surface 114 of the grill plate 100 or an uppermost surface of an accessory, at least a portion of the cooking zone Z, illustrated in the shaded region of FIG. 17, and any food in contact with the surface 114 is disposed between a portion of the food support surface 114 and a portion of the heating element 122.

Figure 5:
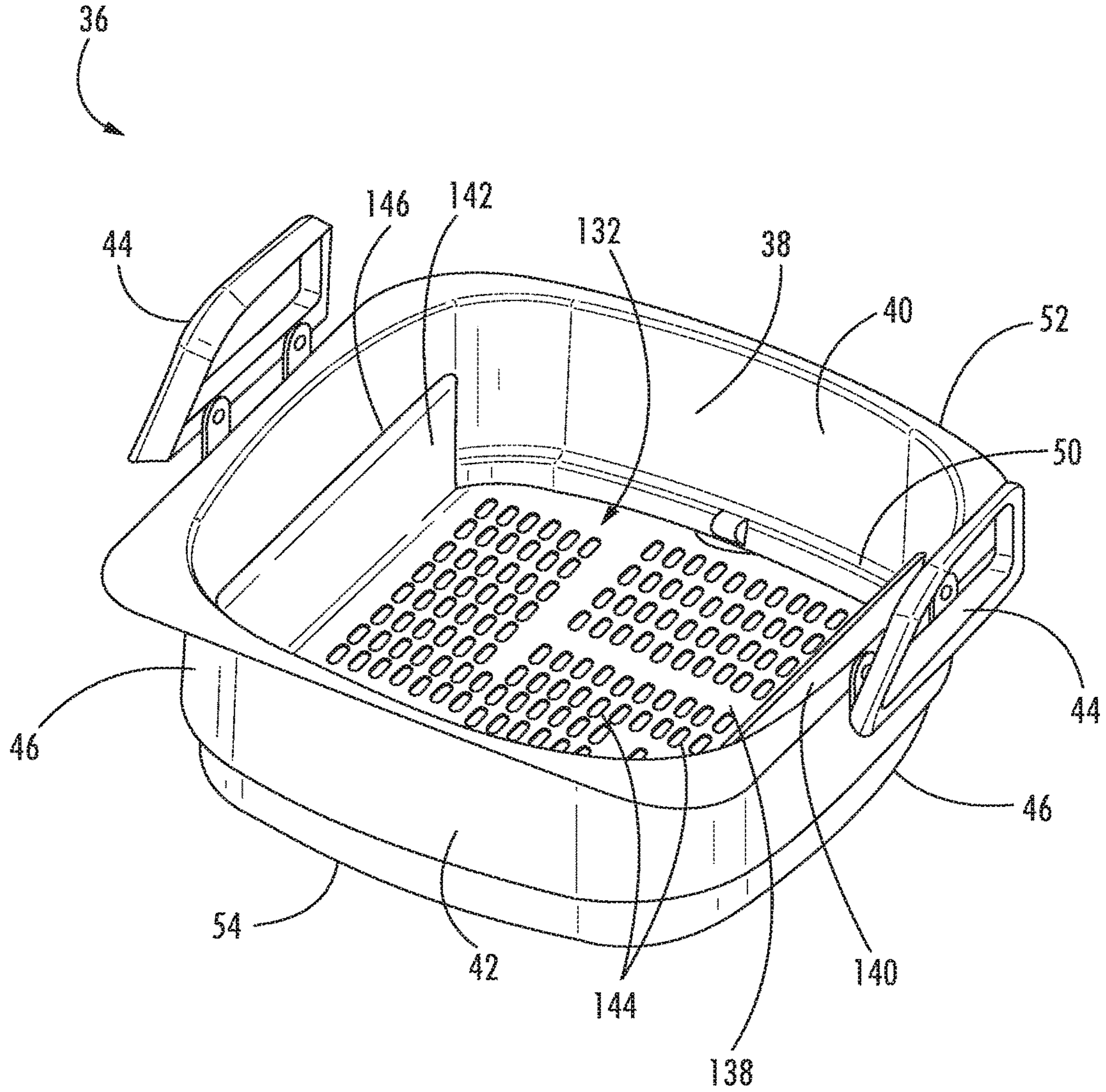
FIG. 5 is a perspective view of a cooking container having an accessory located therein according to an embodiment.
Figure 14:
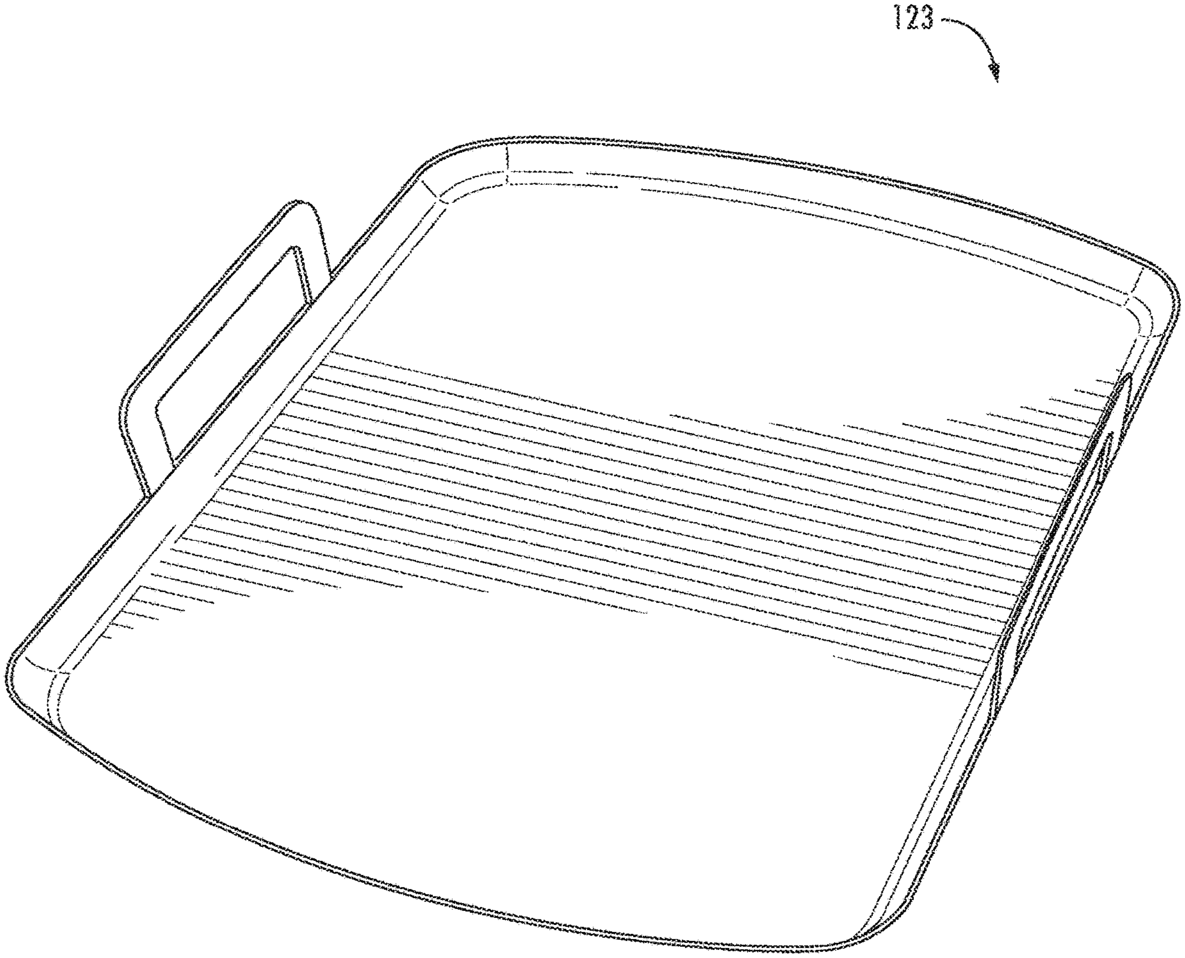
FIG. 14 is a perspective view of another accessory receivable within a cooking container of the cooking system according to an embodiment.
Figure 15:
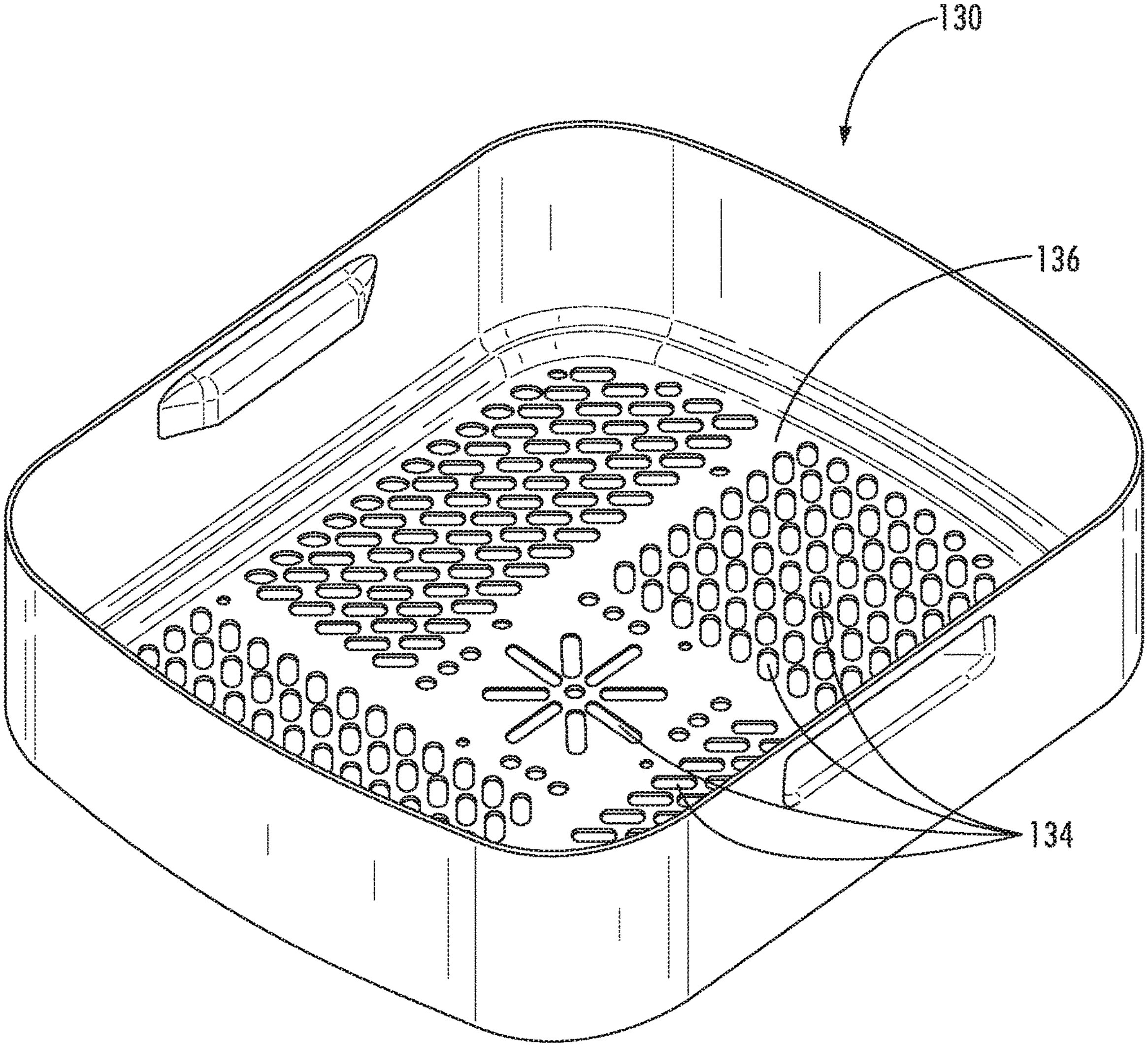
FIG. 15 is a perspective view of another support body receivable within a cooking container of the cooking system according to an embodiment.

Further, the first cooking mode may additionally be used to perform cooking operations other than "grilling." As previously described, an accessory may be mounted in overlapping arrangement with the upper surface 114 of the grill plate 100 such that heat is transferred from the grill plate 100 to the accessory. Alternatively, the accessory may be mounted within the interior 38 of the cooking container 36 absent the grill plate 100, such that the accessory functions as a support body as described herein. Examples of such accessories include a griddle 123 as shown in FIG. 14, a crisping basket 130 shown in FIG. 15, and crisping plate 132 (FIGS. 3 & 5).

In an embodiment, the cooking system 20 is additionally operable in a second cooking mode where the heating element 82 is employed to perform a non-contact heating operation, such as a convective or radiative heating operation. Accordingly, in embodiments where the cooking system 20 additionally includes heating element 122, in the second cooking mode, heating element 122 is not operable. Suitable cooking operations in the second cooking mode may include, but are not limited to air frying, broiling, baking/roasting, and dehydrating. In the second cooking mode, the grill plate 100 is typically not positioned within the interior 38 of the cooking container 36. However, embodiments where the grill plate 100 is disposed within the interior 38 of the cooking container 36 in the second mode are also contemplated herein.

In the second cooking mode, in embodiments absent the grill plate 100, any suitable accessory may be mounted within the cooking container 36 to define the support surface of the cooking zone Z. For example, the crisping basket 130 is positionable within the interior 38 of the cooking container 36, and may be supported by the step 50, or alternatively, by the bottom 54 of the cooking container 36. One or more dimensions of the crisping basket 130 are smaller than the interior 38 of the cooking container 36 such that an annulus is defined between a sidewall of the crisping basket 130 and an interior surface 40 of the cooking container 36. A plurality of openings 134 formed in a bottom 136 of the crisping basket 130 allow a flow of air to circulate there through.

The crisping plate 132 (FIGS. 3 and 5) may have a configuration similar to the crisping basket 130. As shown, the crisping plate 132 includes a base 138 having a first side 140 and a second side 142 extending from the base 138, and a plurality of openings 144 formed in the base 138. An annulus 146 may similarly be formed between the first and second sides 140, 142 of the crisping plate 132 and an interior surface 40 of the cooking container 36.

In the embodiment of FIG. 3, a diffuser 148 having one or more vanes 150 is positioned adjacent or integrated with the crisping plate 132. As shown, the vanes 150 extend generally perpendicular from the bottom of the base 138. In instances including a plurality of vanes 150, the vanes 150 may have similar or different configurations. Further, the plurality of vanes 150 may be spaced about the base 138 of the crisping plate 132 and may have similar or have varying orientations. In the illustrated, non-limiting embodiment, the crisping plate 132 includes four vanes 150, and adjacent vanes 150 are spaced equidistantly about a center of the base 138 and are rotated ninety degrees relative to one another. However, it should be understood that in other embodiments, the crisping plate 132 need not have a diffuser 148 associated therewith.

During operation in the second cooking mode, the air movement device 84 may be operable to circulate a heated air flow through the cooking volume. As previously described, the air movement device 84 is operable to draw air upwards, through the adjacent heating element 82 and expel the hot air outwardly, where it is redirected downwardly toward the cooking volume. The hot air flows to the bottom 54 of the cooking container 36, such as through an annulus formed between an accessory, such as the crisping plate 132 or the crisping basket 130 and the cooking container 36. The hot air is deflected off the bottom 54 of the cooking container 36, and drawn by the air movement device 84 through the openings formed in the accessory. In some embodiments where the accessory includes a lower diffuser, such as the crisping plate 132 for example, the hot air may flow over the vanes of the diffuser, and a rotational motion may be imparted to the hot air, thereby creating a vortex as the air passes through the openings of the accessory. After flowing over an exterior of the food items within the cooking container 36, the air is drawn back through the heating element 82 and into the air movement device 84 for further circulation.

In an embodiment, the air movement device 84 of the cooking system 20 is a variable speed fan operable at a plurality of rotational speeds. In an embodiment, the operational speed of the air movement device 84 may vary based on the cooking mode selected. For example, the speed of the air movement device 84 during operation in a first cooking mode may be different than the speed of the air movement device 84 during operation in a second air-fry mode. The operational speed of the air movement device 84 may be controlled by the processor 98 in response to one or more inputs 92, including selection of a cooking mode. However, the processor 98 may also be configured to adjust the operational speed of the air movement device 84, or alternatively, the power supplied to the one or more heating elements 82, 122, to control the temperature and/or pressure within the interior 38 of the cooking container 36.

In some embodiments, the cooking system 20 is operable in more than two cooking modes. For example, in embodiment where the cooking system 20 includes a heating element 122 operably coupled to the grill plate 100 and separate from heating element 82, the cooking system 20 may be operable in a third cooking mode. In the third cooking mode, the heating element 122 is operational and the heating element 82 is generally de-energized. In the third cooking mode, the heating element 122 is operable to perform a contact heating operation, such as slow cooking, searing, and sautéing for example. In such embodiments, the heating element 122 may be operable to a heat the cooking container 36 absent the grill plate 100, and alternatively or in addition, heat one or more accessories positioned in overlapping arrangement with the grill plate 100.

The cooking system 20 illustrated and described herein provides an enhanced user experience by combining the functionality of several conventional household products into a single user-friendly device.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system, comprising:
- a housing having a rectangular cooking volume therein defined by an interior surface of a plurality of sidewalls and a bottom wall, at least one sidewall of the plurality of sidewalls including at least one protrusion arranged thereon, and the cooking volume having a top opening;
- a plurality of legs arranged on a bottom exterior surface of the housing, the plurality of legs being configured to support the housing;
- a temperature sensor arranged within the cooking volume and configured to measure a temperature of the cooking volume, the temperature sensor being disposed on the at least one sidewall including the at least one protrusion;
- a heating element in the housing configured to heat the cooking volume;
- an air movement device in the housing configured to direct air across the heating element and around a food product within the cooking volume in a plurality of directions;
- a vent arranged on the housing and configured to vent air from the housing;
- a cooking container receivable in the cooking volume and configured to be supported by the at least one protrusion, the cooking container including a plurality of ribs extending upward and a plurality of channels positioned between the plurality of ribs, the plurality of ribs being configured to receive a food product thereon;
- a lid pivotably coupled to the housing and movable between an open position in which the cooking volume is accessible and a closed position in which the lid covers the cooking volume; and
- a user interface arranged on an exterior surface of the housing, the user interface comprising a first plurality of inputs for selecting a low mode of operation, a medium mode of operation, a high mode of operation, and a maximum mode of operation, wherein each mode of operation is associated with operating the heating element and the air movement device to heat the cooking container to a predetermined temperature.

2. The cooking system of claim 1, wherein the heating element is operable to heat the cooking volume via radiation or convection.

3. The cooking system of claim 1, wherein the cooking container includes a grill plate, and wherein the plurality of ribs and the plurality of channels are arranged on the grill plate.

4. The cooking system of claim 3, wherein the grill plate comprises metal.

5. The cooking system of claim 3, wherein the grill plate has a rectangular shape with rounded corners.

6. The cooking system of claim 3, wherein a clearance is defined between a bottom surface of the grill plate and the bottom wall of the cooking volume.

7. The cooking system of claim 1, further comprising a basket having one or more sidewalls.

8. The cooking system of claim 1, wherein the cooking container includes a plurality of openings configured for fluid flow therethrough.

9. The cooking system of claim 8, wherein the plurality of openings are positioned on a bottom surface of the cooking container such that fluid generated during operation of the cooking system flows through the plurality of openings and collects beneath the cooking container.

10. The cooking system of claim 1, wherein the cooking container includes:

a first handle connected to a first side of the cooking container, and a second handle connected to a second side of the cooking container, the second side being opposed to the first side.

11. The cooking system of claim 1, wherein the cooking system is operable in a plurality of cooking modes including a first cooking mode and a second cooking mode, wherein in the first cooking mode the cooking system is operable as a grill and in the second cooking mode the cooking system is operable as a convection cooker.

12. The cooking system of claim 11, wherein in the second cooking mode, the cooking system is configured to perform cooking operations including air frying, baking, roasting, or dehydrating.

13. The cooking system of claim 11, wherein the user interface comprises a second plurality of inputs for selecting a cooking mode of the plurality of cooking modes.

14. The cooking system of claim 1, wherein the user interface comprises a third plurality of inputs for selecting a value corresponding to time or temperature.

15. The cooking system of claim 1, wherein the user interface is configured to indicate a selected time or temperature.

16. The cooking system of claim 1, wherein the user interface is configured to indicate a preheating operation.

17. A cooking system comprising:

a substantially rectangular housing having a hollow interior, wherein the housing comprises a sidewall defining at least a portion of the hollow interior, the sidewall including a protrusion arranged thereon;

a heating element disposed in the housing and configured to heat the hollow interior;

a lid pivotably coupled to the housing and configured to selectively cover a top opening of the hollow interior in a closed position, wherein the lid is substantially parallel to the heating element when the lid is in the closed position;

a cooking container receivable in the hollow interior and configured to receive a food product on a cooking surface of the cooking container, the cooking surface having one or more openings for fluid flow therethrough, wherein the cooking surface is substantially parallel to the heating element when the cooking container is received within the hollow interior;

a temperature sensor disposed on the sidewall adjacent the protrusion arranged thereon and configured to measure a temperature of the hollow interior, wherein the temperature sensor is proximate to the cooking surface when the cooking container is received within the hollow interior;

an air movement device disposed within the housing and configured to direct air across the heating element and within the hollow interior in a plurality of directions before exiting via a vent arranged on the housing; and a user interface arranged on the housing, the user interface comprising a plurality of inputs for selecting a low temperature setting, a medium temperature setting, a high temperature setting, and a maximum temperature setting, wherein each temperature setting is associated with operating the heating element and the air movement device to heat the cooking surface to a predetermined temperature.

18. The cooking system of claim 17, wherein a bottom wall of the housing is substantially parallel to the heating element, the lid, and the cooking surface.

19. The cooking system of claim 17, wherein the heating element is positioned between a bottom wall of the housing and the cooking surface.

20. The cooking system of claim 1, wherein the first plurality of inputs includes a first button configured to be pressed to select a mode of operation from among the low mode of operation, the medium mode of operation, the high mode of operation, and the maximum mode of operation.

21. The cooking system of claim 1, wherein the first plurality of inputs includes a second button configured to be pressed to activate the heating element.

22. The cooking system of claim 11, wherein in the first cooking mode, the cooking system is configured to perform a preheating operation comprising heating the cooking container to a predetermined temperature.

23. The cooking system of claim 22, further comprising a display configured to indicate that the preheating operation is complete when a temperature of the cooking container is greater than or equal to the predetermined temperature.

24. The cooking system of claim 13, wherein the second plurality of inputs includes a button configured to initiate a cooking operation in the selected cooking mode.

* * * * *